(12) United States Patent
Greimann et al.

(10) Patent No.: US 10,139,306 B2
(45) Date of Patent: Nov. 27, 2018

(54) METHOD AND SYSTEM FOR BRIDGE DAMAGE DETECTION

(71) Applicant: Iowa State University Research Foundation, Inc., Ames, IA (US)

(72) Inventors: Lowell Greimann, Ames, IA (US); Yaohua Deng, Ames, IA (US); Brent Matthew Phares, Ankeny, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 255 days.

(21) Appl. No.: 14/596,023

(22) Filed: Jan. 13, 2015

(65) Prior Publication Data

US 2015/0226633 A1    Aug. 13, 2015

Related U.S. Application Data

(60) Provisional application No. 61/927,215, filed on Jan. 14, 2014.

(51) Int. Cl.
*G01M 5/00*    (2006.01)

(52) U.S. Cl.
CPC ........ *G01M 5/0008* (2013.01); *G01M 5/0033* (2013.01)

(58) Field of Classification Search
CPC ..................... G01M 5/0008; G01M 5/0033
USPC ......................................................... 73/786
See application file for complete search history.

(56) References Cited

PUBLICATIONS

Zhao, Jian, and Sri Sritharan. "Modeling of strain penetration effects in fiber-based analysis of reinforced concrete structures." ACI structural journal104.2 (2007): 133.*

Agerskov, Henning. "Fatigue in steel structures under random loading."Journal of Constructional Steel Research 53.3 (2000): 283-305.*

Cardini, A. J., and John T. DeWolf. "Long-term structural health monitoring of a multi-girder steel composite bridge using strain data." Structural Health Monitoring 8.1 (2009): 47-58.*

* cited by examiner

*Primary Examiner* — Walter L Lindsay, Jr.
*Assistant Examiner* — Philip Marcus T Fadul
(74) *Attorney, Agent, or Firm* — McKee, Voorhees & Sease, PLC

(57) ABSTRACT

Methods and systems for bridge damage detection using, for example, one or more strain range methods are provided. One exemplary embodiment provides a computer-implemented methods and systems for determining bridge damage from strain sensor data, for example, by collecting a batch of strain data from one or more sensor pairs. From the batch of strain data one or more sets of strain data may be extracted comprising a quasi-static response of the bridge under ambient traffic loads. A relationship may be established between the one or more sets of strain data extracted from the one or more sensor pairs by orthogonal regression. Bridge damage may be detected by generally isolating a damage indicator between the one or more sensor pairs by monitoring changes in a statistical $F_{shm}$ value over time.

15 Claims, 42 Drawing Sheets

METHOD AND SYSTEM FOR BRIDGE DAMAGE DETECTION

CROSS REFERENCE TO RELATED APPLICATIONS

This application claims priority under 35 U.S.C. § 119 to provisional applications U.S. Ser. No. 61/927,215 filed Jan. 14, 2014, herein incorporated by reference in its entirety.

GRANT REFERENCE

This invention was made with government support under Grant No. TPF5219 awarded by Federal Highway Administration. The government has certain rights in the invention.

BACKGROUND OF THE INVENTION

I. Field of the Invention

The present invention relates to methods and systems for bridge damage detection. More specifically, but not exclusively, the present invention relates to methods and systems for bridge damage detection using, for example, one or more strain range methods.

II. Description of the Prior Art

As the U.S. infrastructure continues to deteriorate and visual bridge inspections become more difficult and costly, alternative methods and systems for measuring the structural integrity of highway bridges, railroad bridges and like structures are of increasing interest. For example, determining that damage has occurred and determining the location and severity of the damage may not always be readily apparent, detectable or even feasible over time using existing inspection methods.

Therefore, it is an object, feature, or advantage of the present invention to provide improved methods and systems for bridge damage inspection and detection.

Detection systems may be based, for example, on vibration or pseudo-static characteristics. In general, data collected at some point in time may be compared to data taken from an earlier point in time.

Therefore, it is an object, feature, or advantage of the present invention to provide improved methods and systems for comparing measured data for detecting bridge or like structure damage.

It is another object, feature, or advantage of the present invention to provide improved statistical-based methods and systems for comparing data for detecting bridge or like structure damage.

A still further object, feature, or advantage of the present invention is to provide statistical-based methods and systems using one or more algorithms to evaluate data and identify data that occur outside a range that has been determined to represent normal behavior for a bridge or like structure.

Another object, feature, or advantage of the present invention is to provide methods and systems for inspecting a bridge or like structure that may only need performed once damage is detected.

One or more of these and/or other objects, features or advantages of the present invention will become apparent from the specification and claims that follow.

SUMMARY OF THE INVENTION

The present invention provides a methods and systems for bridge damage detection using, for example, one or more strain range methods.

One exemplary embodiment provides a computer-implemented method for determining bridge damage from strain sensor data, for example, by collecting a batch of strain data from one or more sensor pairs. From the batch of strain data one or more sets of strain data may be extracted comprising a quasi-static response of the bridge under ambient traffic loads. A relationship may be established between the one or more sets of strain data extracted from the one or more sensor pairs by orthogonal regression. Bridge damage may be detected by generally isolating a damage indicator between the one or more sensor pairs using a statistical $F_{shm}$ value.

Another embodiment provides a computer-implemented system for determining bridge damage from strain sensor data. One aspect includes a database having a batch of strain data from one or more sensor pairs. One or more sets of strain data from the batch of strain data comprise a quasi-static response of the bridge under ambient traffic loads. An orthogonal regression relationship may be established between the one or more sets of strain data. And, a bridge damage indicator between the one or more sensor pairs may be detected by an isolation protocol using a statistical $F_{shm}$ value.

Yet another embodiment provides a computer-implemented method for determining bridge damage from strain sensor data under ambient traffic loads. For example, by collecting a batch of strain data from one or more sensor pairs attached to a bridge support structure, one or more sets of strain data comprising a quasi-static response of the bridge independent of one or more bridge component responses may be extracted from the batch of strain data. An orthogonal regression relationship may also be established between the one or more sets of strain data extracted from the one or more sensor pairs. Beneficially, by isolating a bridge damage indicator between the one or more sensor pairs using a statistical $F_{shm}$ value from control chart bridge damage may be detected from the bridge damage indicator independent of the one or more bridge component responses.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE PREFERRED EMBODIMENTS

Figure 1A:
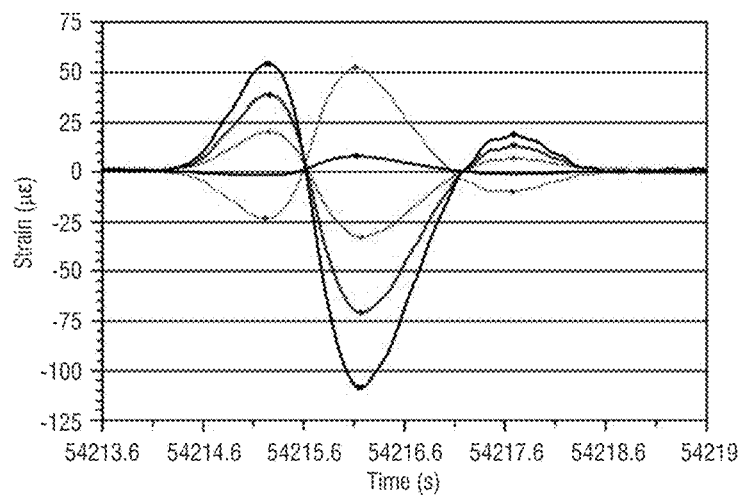
FIG. 1A-E is a pictorial representation of flowcharts showing the general procedure for each algorithm generation in accordance with an illustrative embodiment.
Figure 1A:
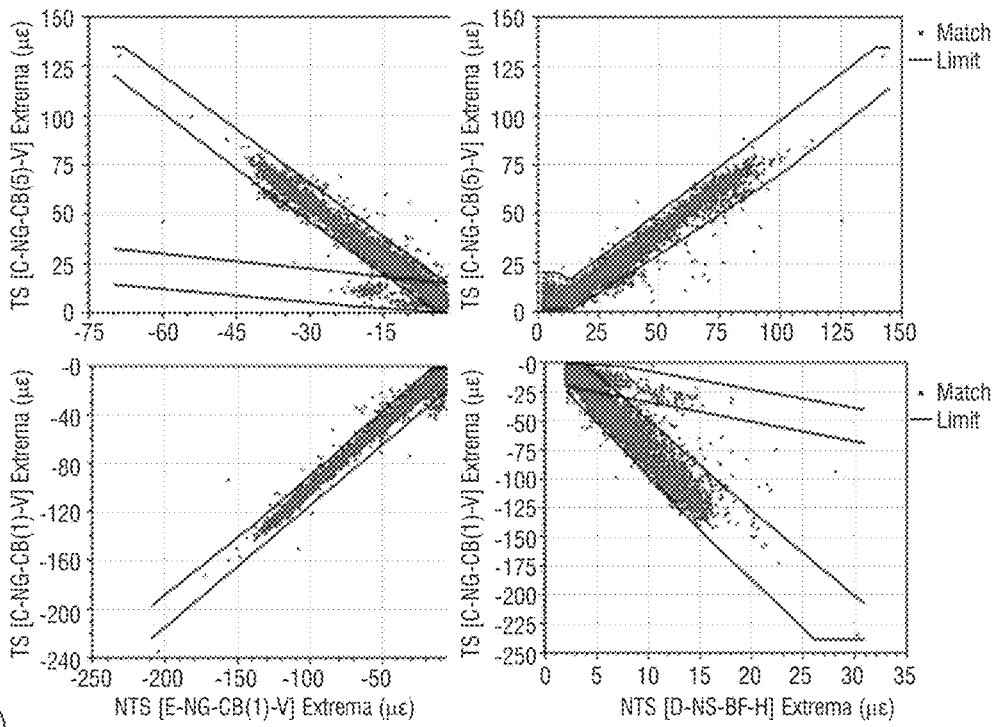
Figure 1B:
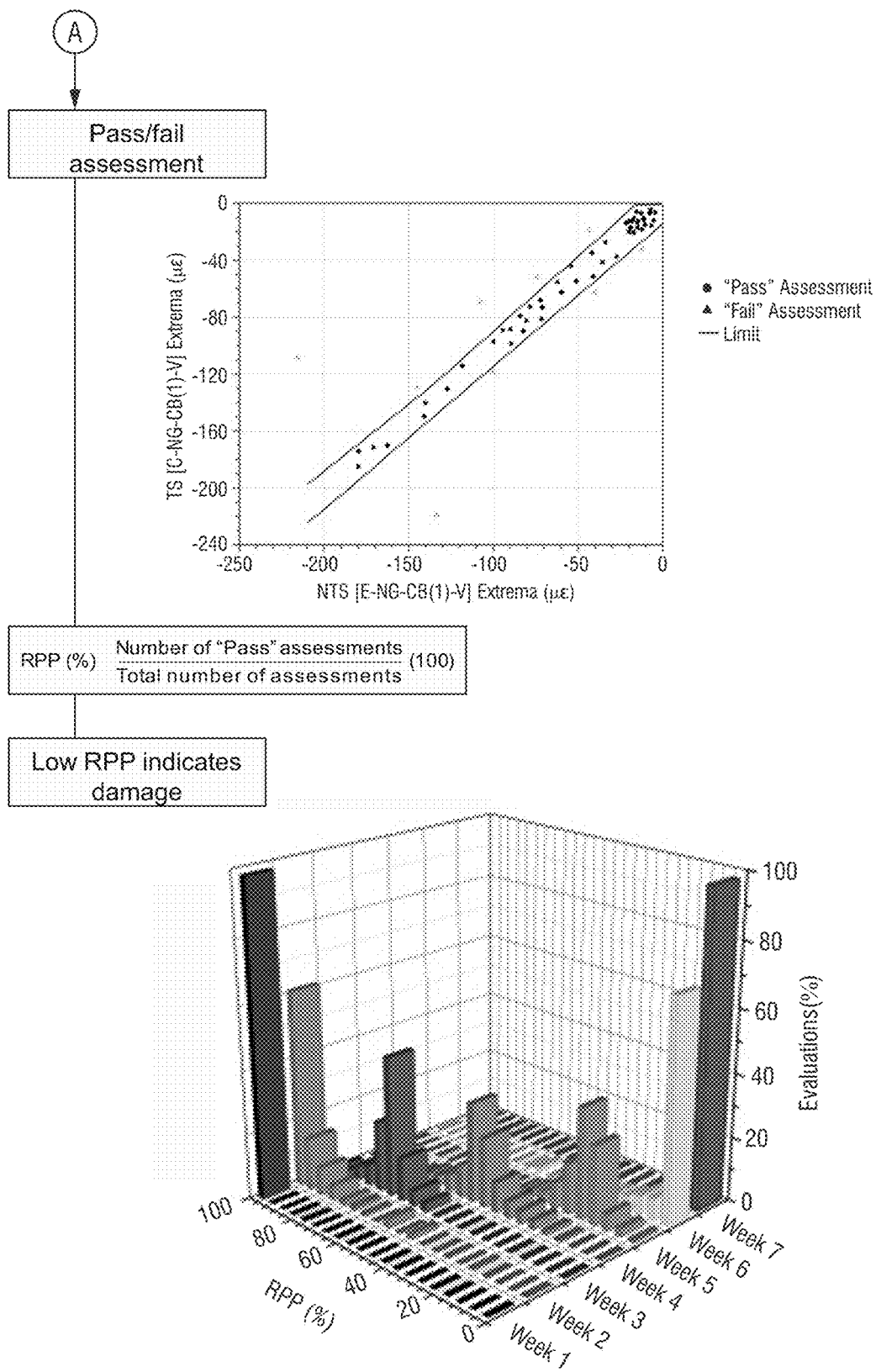
Figure 1C:
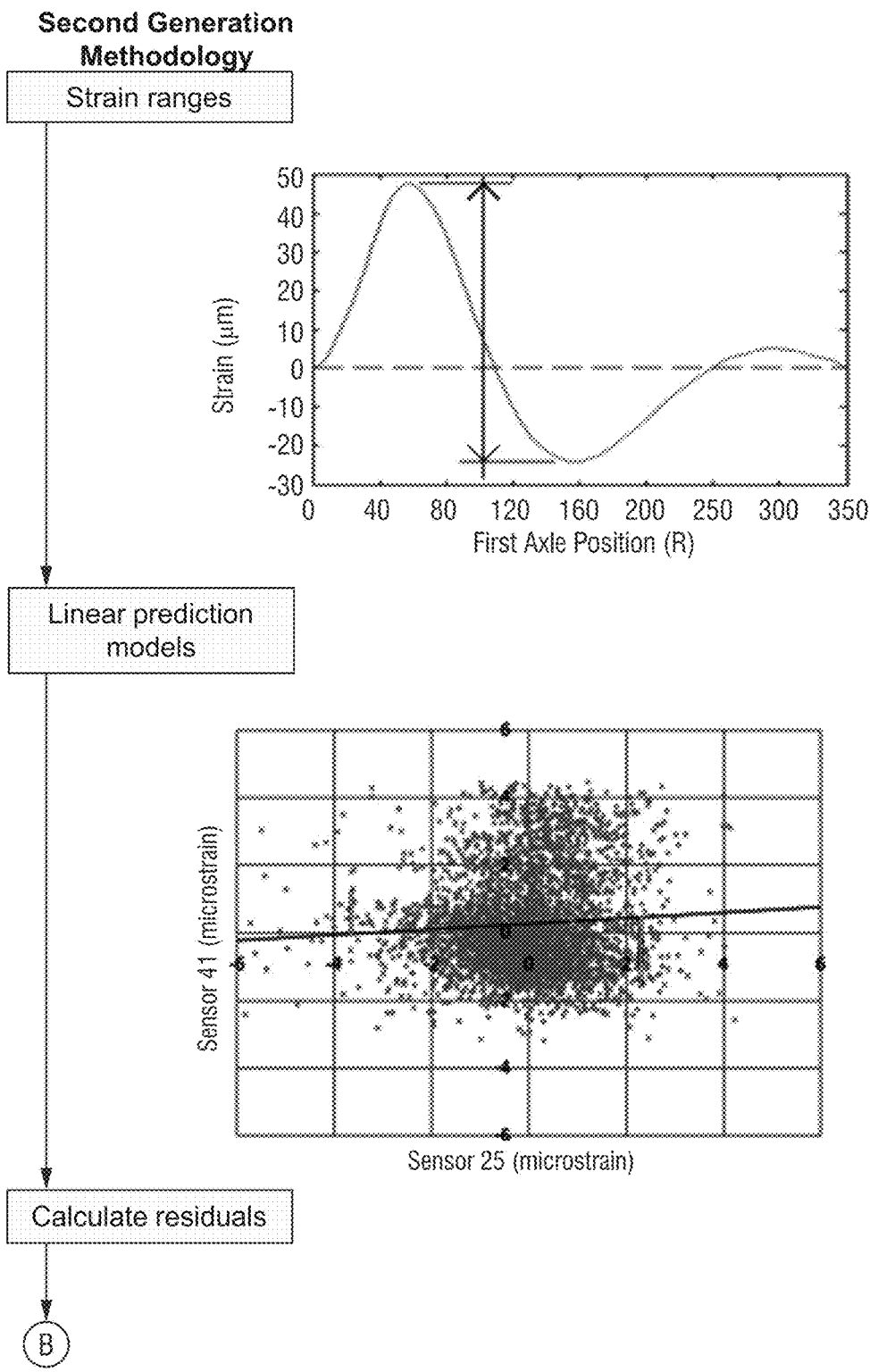
Figure 1D:
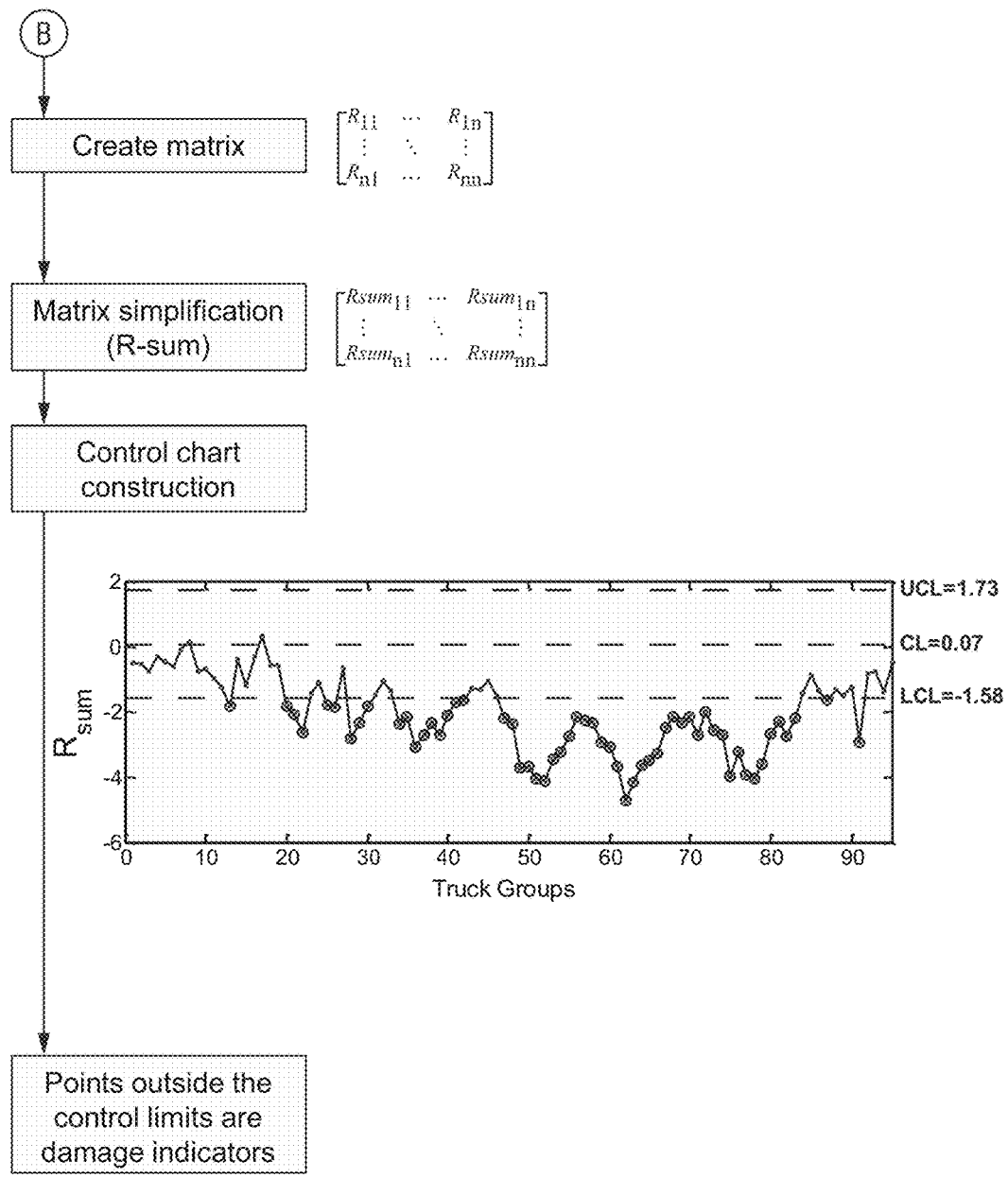
Figure 1E:
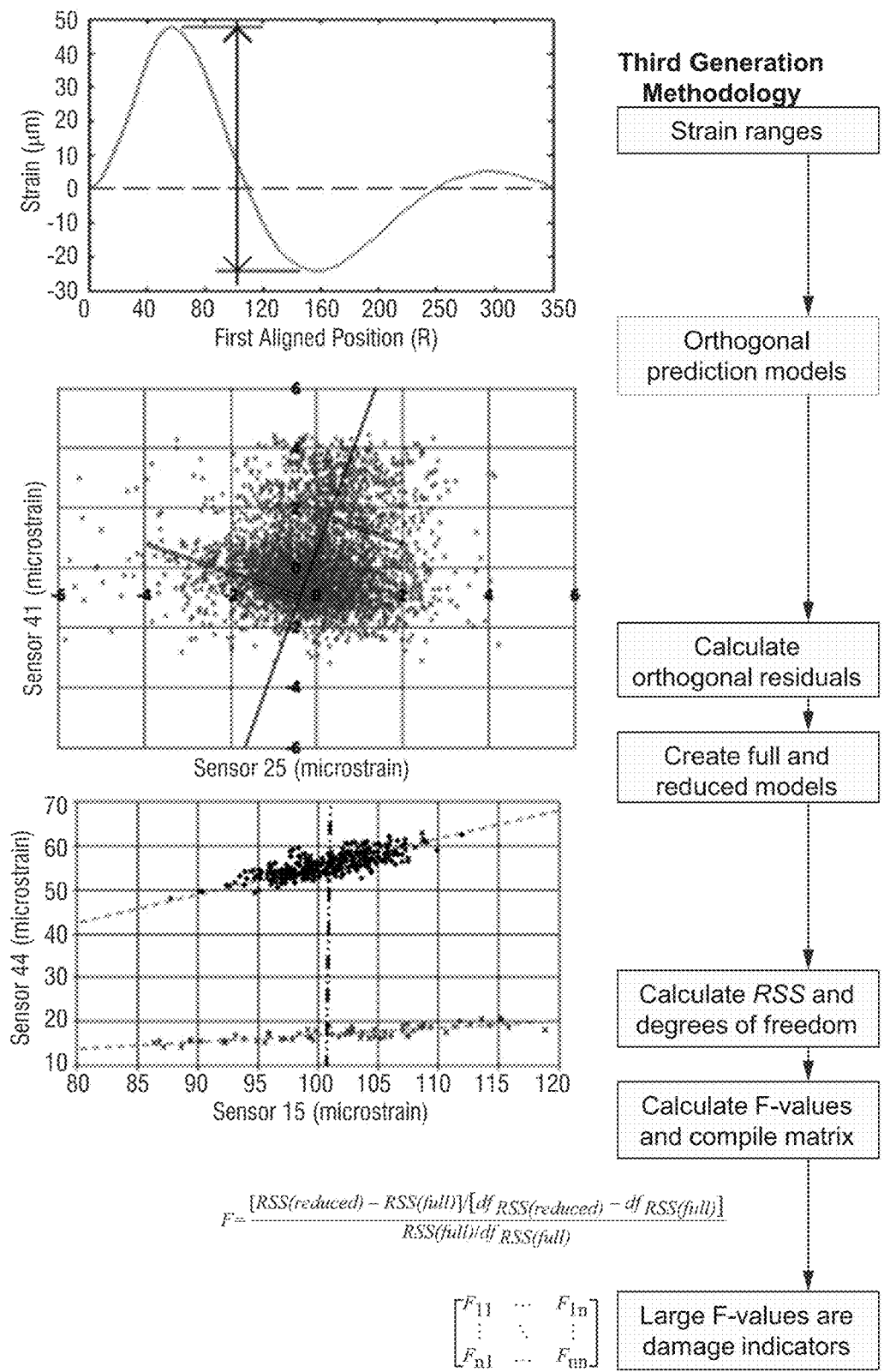
Figure 2A:
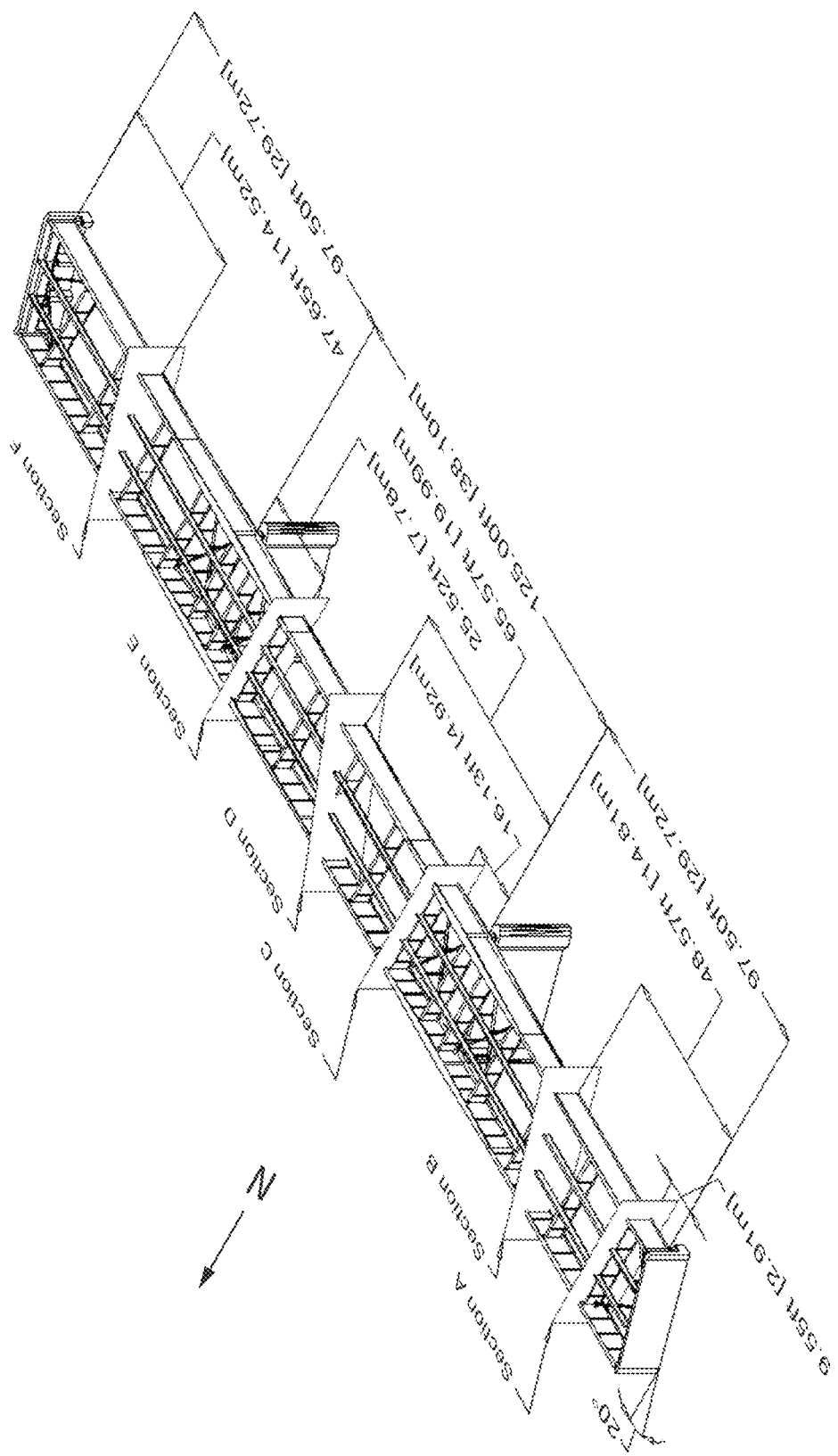
FIGS. 2A-G are pictorial representations of bridge framing plan showing location of instrumented cross-sections A through F in accordance with an illustrative embodiment.
Figure 2B:
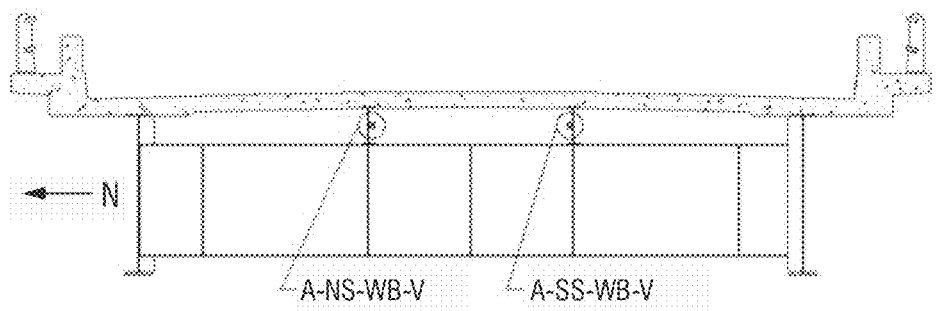
Figure 2C:
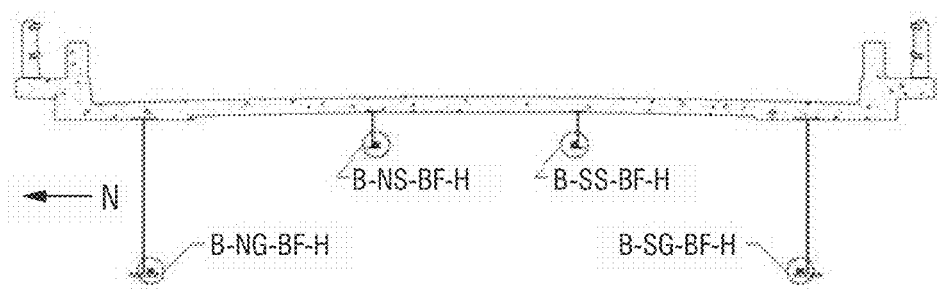
Figure 2D:
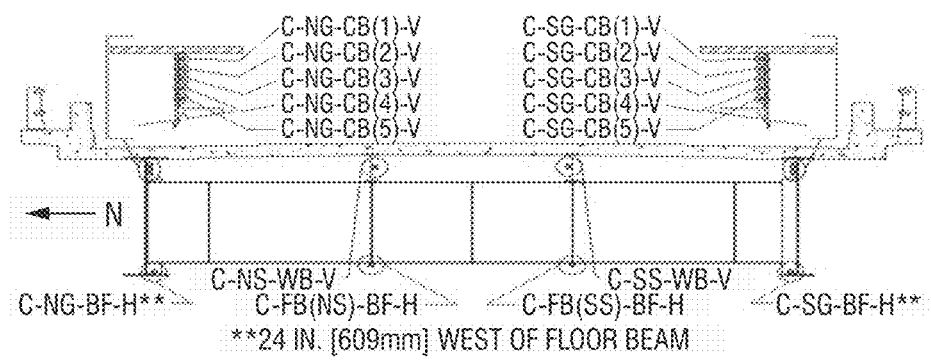
Figure 2E:
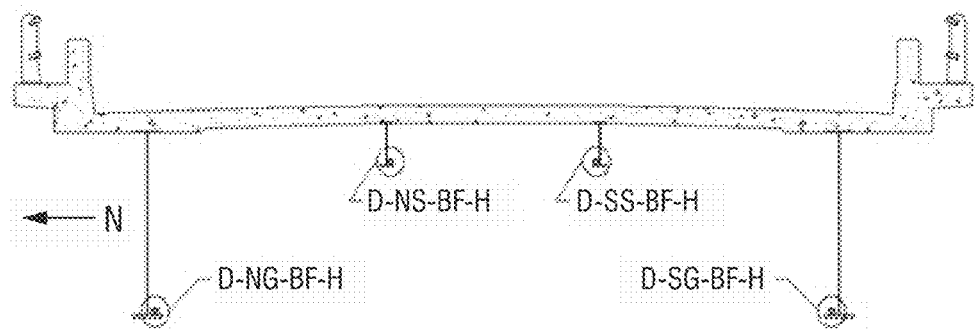
Figure 2F:
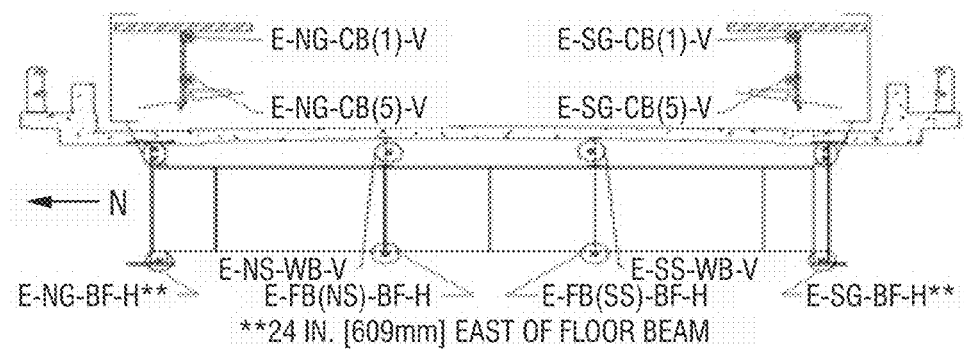
Figure 2G:
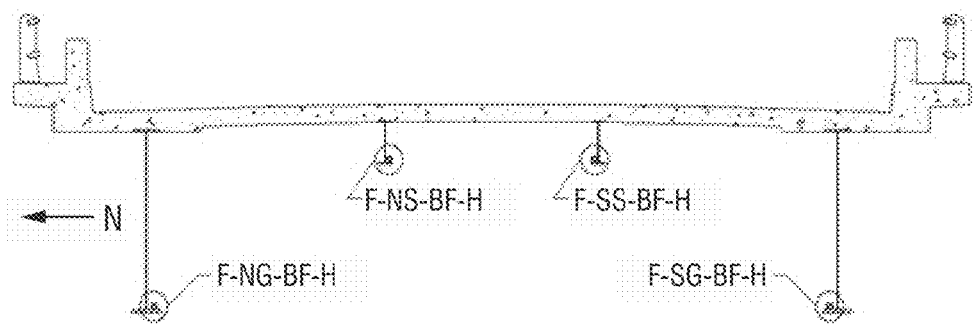

Systems and methods for bridge structural health monitoring/damage detection are disclosed, including steps required to develop one of the many pieces of the structural health monitoring (SHM) system. A need for development of the methods and systems of the present invention are driven by the transportation departments' desires to have a reliable damage detection system that can detect damage in bridges (e.g., interstate, state, county, railroad, or otherwise) with a specific interest in fatigue and other types of damage.

Introduction

As the U.S. infrastructure continue to deteriorate and visual bridge inspections become more difficult and costly, transportation departments are looking for other methods of measuring the structural integrity of highway and railroad bridges, including SHM systems. Wired and wireless SHM systems, which can autonomously and proactively assess the structural integrity of bridges and other structures, have been under development for many years and are becoming more prominent throughout the United States. For example, Guan, Karbhari, and Sikorsky describe a long-term SHM system installed on a modular bridge in Riverside Calif. Their system consisted of a combination of accelerometers, strain sensors, and potentiometers. A damage detection approach based upon direct mode shape comparisons was employed. Olund and DeWolf presented three SHM systems used on three types of bridges deemed critical to Connecticut's bridge system. Their system was configured to measure bridge response under ambient traffic—needing no closure to perform controlled load tests. Chintalapudi et al. described the implementation of coin-sized, wireless sensors. A relatively complex wireless SHM system was presented by Yuan et al. The system was configured using a parallel distributed concept. The system consists of different types of agents that sense, signal process, data fuse, sequence, etc.

A central component of a SHM system is damage detection. Damage-detection systems can be as simple as determining that damage has occurred somewhere in the structure or as complex as determining the location and severity of the damage. Damage-detection methods range from the analysis of direct readings to complex algorithms that analyze dynamic characteristics. All detection systems appear to have some commonalities. For example, they compare measured data from a bridge—such as changes in modal parameters, differences in strain, or other changes that may be related to damage—over time.

Many damage-detection systems are based on either vibration or pseudo-static characteristics. In general, they compare data collected at some point in time (i.e., evaluation or monitoring data) to data from the original undamaged structure (i.e., training data). Some damage-detection systems construct a theoretical model in lieu of the original undamaged bridge and compare data collected from the bridge under load to the model. The methods and systems of the present disclosure, including damage-detection systems, are based generally on statistical concepts. Statistical-based systems use an algorithm as one way to evaluate data and identify data that occur outside a range that has been determined to represent normal behavior. Outlier points on either side of the normal data set can be analyzed in various ways under various assumptions to define the abnormal behavior. Another method of structural damage detection is called the Local Damage Factor (LDF), which may be able to detect the location and severity of damage. The LDF takes two random vibration signals and finds the correlation between the two using auto-correlation. Another approach to damage detection uses a generic algorithm to solve an optimization procedure involving a residual force vector. After the objective function has been solved, it can then be related back to the physical properties of the structure.

Damage-Detection Algorithm

What follows is description for various iterations of methods and systems for a damage detection algorithm in accordance with one or more exemplary embodiments. Exemplary steps for each algorithm generation are pictorially represented in flowchart form in FIG. 1A-E.

Implementation

Hardware for an SHM system was initially installed on a two-girder, fracture-critical demonstration-bridge on a highway (i.e., U.S. Highway 30) to use real-world data for algorithm development, refinement, and validation. In another exemplary aspect, the bridge could be a railroad bridge. The exemplary bridge has three spans with two equal outer spans (29.7 m) and a longer middle span (38.1 m), a width of 9.1 m, and a skew of 20 degrees. The superstructure consists of two continuous welded steel plate girders, 19 floor beams, and 2 stringers that support a 184-mm thick, cast-in-place concrete deck.

One exemplary configuration includes forty-eight strain gauges installed on the bridge, including numerous gauges in the web gap regions, to monitor the strain caused by live loads (see FIG. 2). These web gap areas, generally located at the connection between the floor beams and the web of the welded plate girders, are generally fatigue sensitive. During construction, the connection plate welded to the web of the plate girder extended directly under, but was not welded to, the plate girder top flange. Thus, for example, as vehicles cross the bridge, the deflections of the girders vary due to the bridge skew; this causes a rotation of the floor beam, which is especially pronounced near the piers. Due to its stiffness, the deck restrains rotation of the plate girder top flange. Therefore, as the floor beam rotates, double curvature bending of the plate girder web occurs. This double curvature creates high levels of stress and has been linked to the formation of fatigue-related cracks.

First-Generation Algorithm

Figure 3A:
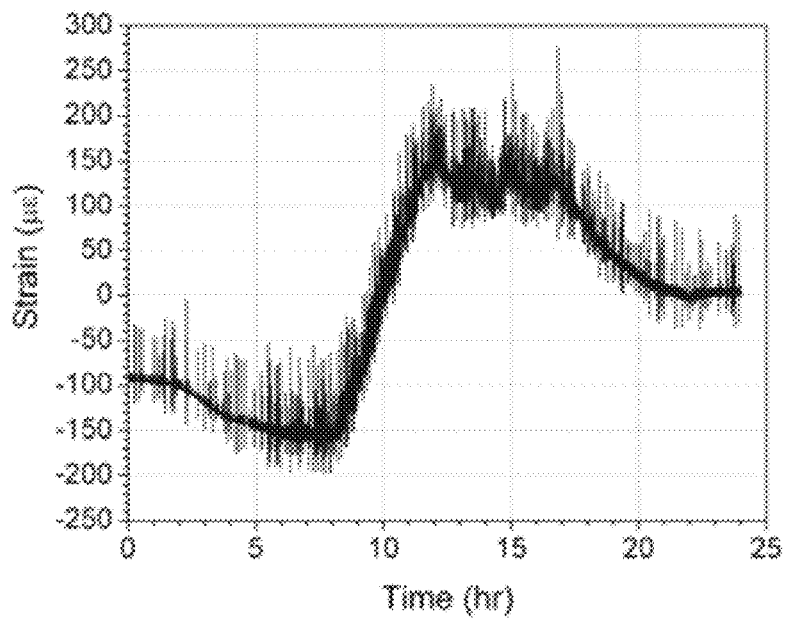
FIGS. 3A-B are pictorial representations of strain data in accordance with an illustrative embodiment.

Algorithm development has evolved over time. For example, at least one first-generation algorithm was developed by Wipf, Phares, Doornink and theoretically validated by Vis. Using strain as the operative metric, the SHM system collects data continuously, resulting in large volumes of raw data that would be impractical for an engineer to discretely analyze. Therefore, the system autonomously identifies and extracts only the useful sets of strain data—for example, the quasi-static response of the bridge under ambient traffic loads. Several factors affect bridge strain response. In a given 24-hour period, temperature variations create a cyclic strain response that is reflected in the raw strain data set. In FIG. 3A, the long rolling line reflects variations in strain due to temperature fluctuations and the short vertical "spikes" reflect strains resulting from ambient traffic. It was found that if the data were split into small segments, each corresponding to 27 seconds, temperature variations are negligible. Thus, a temperate baseline could be determined for each data set. This baseline is subtracted from all data in the 27-second set, thereby creating a data set devoid of temperature effects. After data zeroing, the data set contains three components: random noise, dynamic induced behaviors, and the quasi-static vehicular response. Given that the frequencies of the quasi-static vehicular events are much lower than those of dynamic responses and of noise, a low-pass frequency filter may be used to remove the noise and dynamic components, leaving the remaining quasi-static response.

Figure 3B:
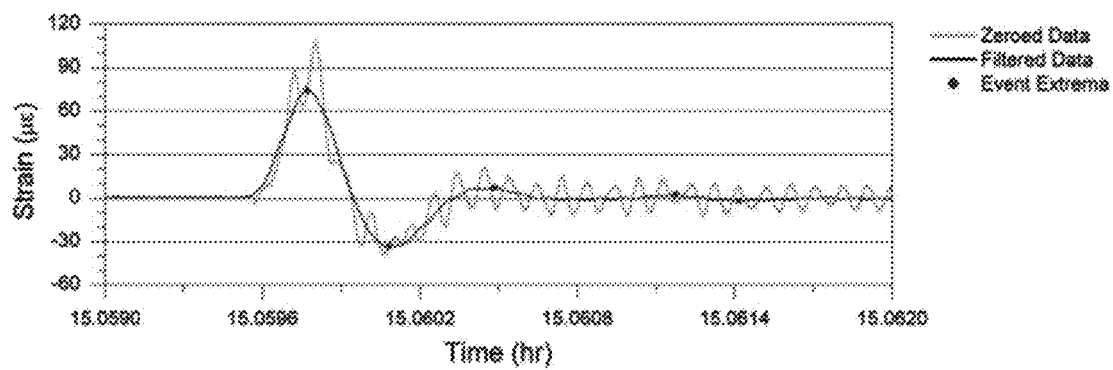

After the data is zeroed and filtered, vehicular events may be identified based on a statistical and structural evaluation of the response relative to the location of a sensor. Finally, maximum and minimum strain values, called event extrema, may be identified for each event. An example of a plot of strain data for a truck event after zeroing, filtering, and extrema identification is shown in FIG. 3B.

Strain sensors on the bridge may be assigned one of two designations: target sensor (TS) or non-target sensor (NTS). In most cases, structural damage is localized and, therefore, the TSs are placed near locations where damage might be expected. The NTSs are placed farther from the damage-sensitive areas and generally relate more to global structural behavior. In a first-generation algorithm, the event extrema from two sensors (one TS and one NTS) are matched to form x-y pairs that can be shown on a scatter plot (see FIG. 4)—note that all possible combinations of TS and NTS are matched. To be effective, the TS are preferably located in the vicinity of the area where damage is expected. The NTS are generally placed in locations on the bridge which capture the global response. Notwithstanding these preferences, there is no requirement on relative placement of TSs and NTSs.

Figure 4:
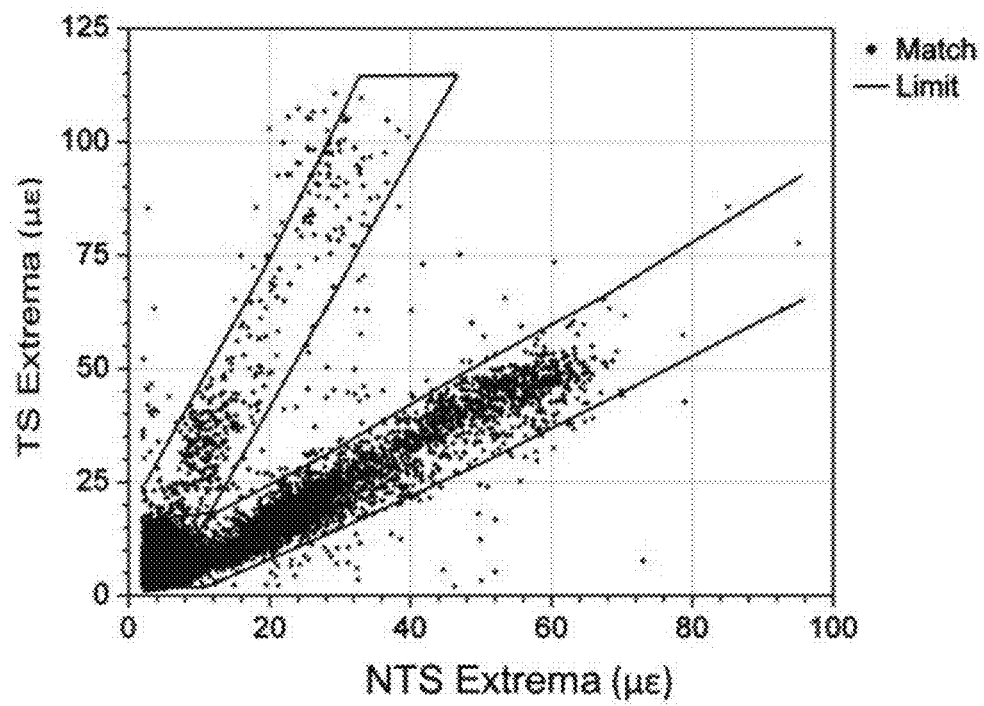
FIG. 4 is a pictorial representation of matched extrema data with defined limits in accordance with an illustrative embodiment.

Initial data may be collected during a "training" process, which defines a "normal" behavior. This process may be completed for all applicable and desired sensor pairs. Once all plots are created, limits indicating the normal response regions may be manually set. A typical set of defined limits is shown in FIG. 4.

Following training, new data may be collected, zeroed, and filtered using the above-described methods. The event extrema may then be paired and compared to the previously established limits. For test data points within the limits, a "pass" assessment may be assigned; for test data points outside the set limits, a "fail" assessment may be assigned. If damage gradually occurs, the number of "fail" assignments likely will increase over time. If damage occurs suddenly, the number of "fail" assignments will similarly and likely change rapidly.

Analytical Evaluation of First-Generation Algorithm

Finite Element (FE) models have been developed for a demonstration bridge with simulated damage to analytically verify that, if damage were to occur near a TS, the algorithm would detect the damage. FE models may be constructed using commercially available software and then verified using data obtained from a controlled load test. During a controlled test a known truck was driven across the bridge at crawl speed, and data was collected with strategically placed strain transducers. The position of the truck was recorded so that truck position could be aligned with the collected data. The global results from the FE model closely matched the global results obtained from the load test, verifying the FE model accuracy on a global scale. The strains from damage-sensitive locations were also compared, but did not agree as well as the global results did. Using the FE model, three variables impacting the TS-NTS relationships were identified: transverse vehicle location, vehicle configuration, and damage. Regarding the first variable, it was determined that a vehicle's transverse location on the bridge can cause distinct groupings of data on the scatter plots, two of which are delineated by the pairs dashed lines forming two "V"-shaped areas pictorially represented FIG. 5A.

Figure 5A:
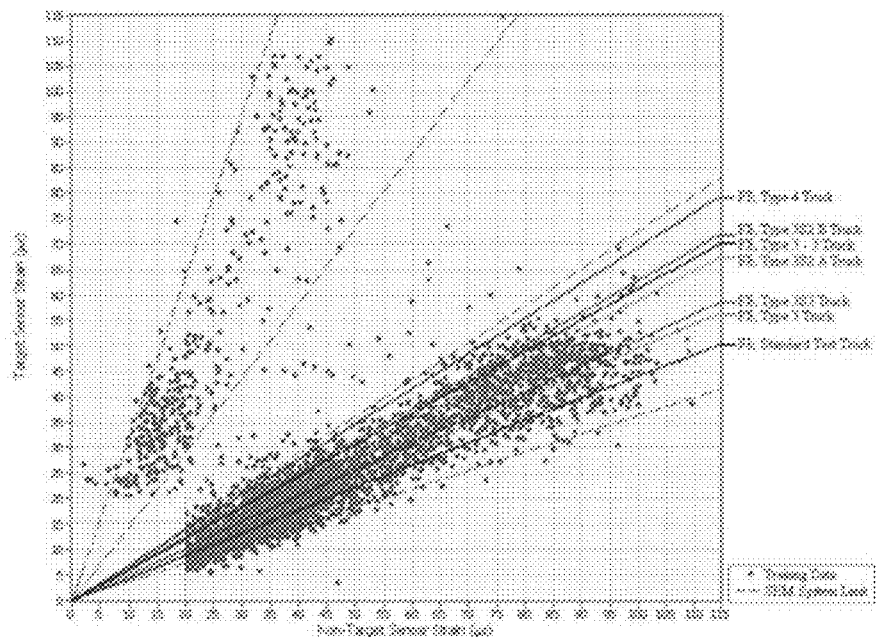
FIGS. 5A-B are pictorial representations of sample data showing the influence of truck position, type, and damage in accordance with an illustrative embodiment.
Figure 5B:
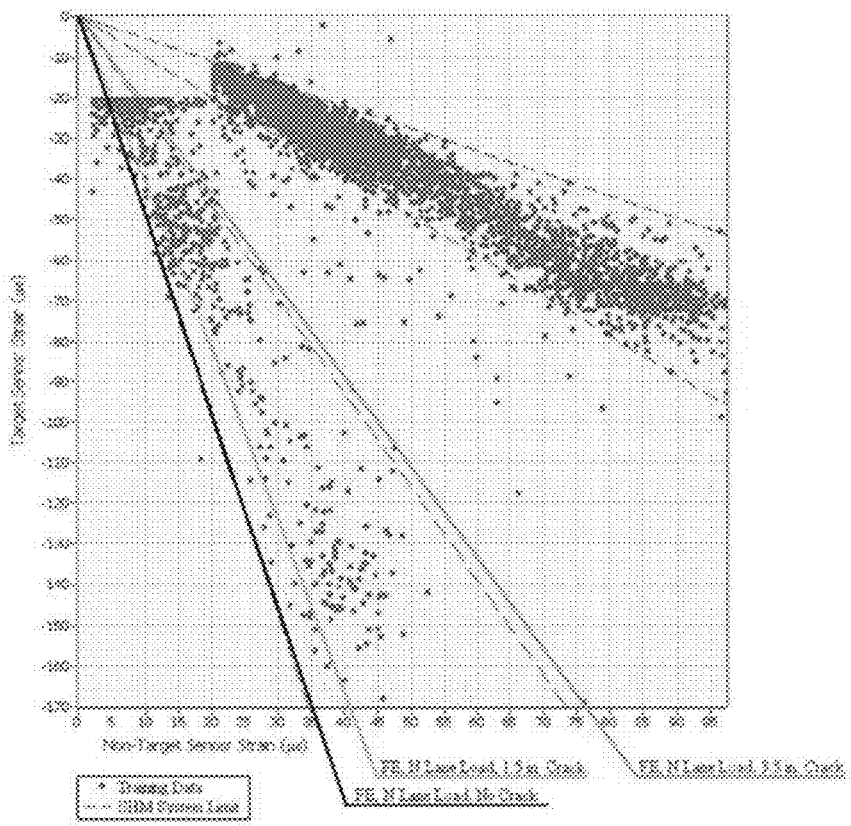

Regarding the second variable, seven truck configurations and loads were applied to the model to study the effects of differing configurations. The lines representing the trucks are shown pictorially in FIG. 5a, illustrating that vehicle configuration also may have an effect on the TS-NTS relationship but less of an effect than lateral truck position. Regarding the third variable, cracks of different sizes were analytically introduced at a damage-sensitive location to determine the effects of the cracks on the TS-NTS relationships. As damage was introduced, the slope of the lines changed as the crack length increased, as shown in FIG. 5B.

To recognize a change in the TS-NTS relationship indicative of damage, others have concluded that the change in TS-NTS ratio must pass beyond the range of ratios associated with both transverse vehicular location and different vehicular configurations. Based on these results, it was concluded that an SHM system could likely identify crack damage that has reached 1.6 mm in size if a sensor is located near or generally adjacent the crack.

Second-Generation Algorithm

Others have refined the data processing and damage detection algorithm to reduce sensitivity to vehicle characteristics and transverse position, and to automatically detect damage. For example, a second-generation algorithm utilizes event-based live load strain ranges (as opposed to the event extrema values) as the input data and statistical control chart philosophies as a damage-detection tool. Refinements to the first generation algorithm fall into two specific categories: (1) reduction of the number of utilized data sets by using data from only one type of truck, and (2) automatic creation and use of control charts for each sensor. For reference, a control chart is a statistical tool that can be used to determine if a process is in a state of controlled operation—in other words, if the process is operating within normal bounds.

The first refinement was necessary because trucks with different parameters (e.g., number of axles, transverse position, etc.) produce different bridge responses that are difficult to differentiate from changing responses due to structural damage. In view of this observation, it is important that the algorithm be able to filter out data related to all but one specific category of trucks. Three options for identifying truck position such that only those desired are considered in the developed algorithm: (1) use a commercial system, (2) use existing sensors, or (3) install additional sensors. The first option is quickly eliminated because commercially available systems are too expensive or they do not integrate into an existing sensor network. The second option is unsuitable because existing sensor networks detect tandem axle groups and the steering axle but do not reliably differentiate axles within a group. Therefore, in at least one preferred aspect, additional sensors in new locations were determined to be beneficial. After many trials, sensors placed on the bottom of the deck provided the data needed to characterize passing vehicles.

The relative ratio of strains measured at multiple girder locations could also be used to determine transverse position, multi-vehicle occurrence, and other features. For example, a sensor on the girder closest to the vehicle travel lane consistently determined the truck travel lane because the strains are largest. The deck bottom sensors nearest the left wheel line of the right lane truck and the right wheel line of the left lane truck consistently showed the best truck axle detection ability. With the captured data, other truck parameters, including speed and axle spacing, could be determined. By using data from multiple girders plus the deck bottom sensors, the algorithm may be able to select specific loading conditions for consideration in the damage detection portion of the algorithm. In the second-generation algorithm, only data from single, right-lane, five-axle heavy trucks (hereinafter called truck events) may be used.

Refinements to the second algorithm automated the development of control charts for each sensor. In the first-generation system, the data processing algorithm used matched-event extrema to create a scatter plot relationship between TS and NTS. Users then were able to define the range of strain limits outside of which plotted strain data indicated damage. The algorithm was further enhanced to automatically define the limits, generate control charts, and plot test data on control charts.

Using the second-generation algorithm the maximum and minimum strains produced by one truck event are used to calculate an event-based strain range for a specific sensor (i.e., the maximum minus the minimum). The use of strain range in the second-generation algorithm was determined to be equally sensitive to damage while at the same time required 25% less processing time. The strain ranges from pairs of sensors may be used to predict each other with linear prediction models. For example, $n^2$ prediction models can be created for a system with n sensors. Residuals, defined as the difference between the linear prediction models and the collected strain data may then be calculated for each of the $n^2$ prediction models. As a result, an n×n residual matrix for each truck event is created. The residual matrix may then be simplified into an n-degree vector using a simplification process. Multiple matrix simplification methods are contemplated. According to one aspect of the invention, a combined summation method (also known as the R-sum hereafter {which is calculated by subtracting the residual matrix column summation from the row summation}) may be used as a damage indicator given it was the most sensitive at detecting damage.

Once a condition indicator is obtained for a sufficient number of events, one control chart for each sensor may be constructed. For the second-generation approach, the condition indicator is each value in the previously mentioned vector of R-sum values. Note also that in an effort to reduce the influence of very atypical truck conditions, condition indicators for ten successive trucks may be averaged and used on the control charts. Each of these may be referred to as a truck group.

Figure 6:
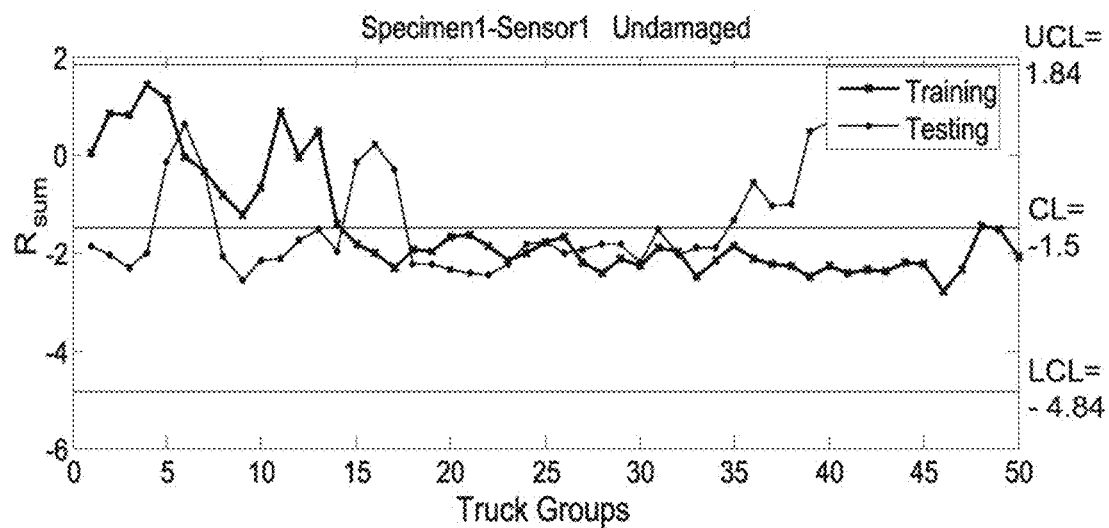
FIG. 6 is a pictorial representation of a sample control chart showing training and testing data in accordance with an illustrative embodiment.

In an effort to keep consistent with current bridge specifications in which beta (the safety index) is set to 3.5 (i.e., an out of limit rate of 1 out of 5000) for design/inventory ratings and beta is set to 2.5 (i.e., an out of limit rate of 6 out of 1000) for operating ratings, a target false alarm rate of 0.3% (i.e., an out of limit rate of 3 out of 1000) may be selected. As the residuals were assumed to be normally distributed, the corresponding upper control limit (UCL) and lower control limit (LCL) may be set at the mean plus or minus three times the standard deviation as this would result in a false alarm rate approximately equal to the target (0.3%). An example control chart is shown in FIG. 6. In this figure, the middle line represents the central line (CL) and the upper and lower horizontal lines represent the UCLs and LCLs, respectively. In one aspect, at least one fundamental assumption is that points above the UCL or below the LCL indicate that damage has occurred.

To test control limits for each sensor, some data sets may be withheld from the training data and used as initial control chart testing data. The resulting training and testing data are shown in FIG. 6. As can be seen, all points lie between the limits, indicating that the limits have likely been properly set.

As new data (known as test or monitoring data) are collected, a new residual matrix may be constructed, and the residuals plotted on previously constructed control charts. Any point outside the control limits may be termed a damage indicator and may indicate a change in behavior. Because each sensor is coupled with a single control chart, the control chart associated with the sensor closest to the damage will likely display the highest number of damage alarms.

Field Validation of Second-Generation Algorithm

According to aspect of the present disclosure, an experimental validation of the second-generation algorithm on a bridge (i.e., US 30 Bridge) was conducted. Validation ensures that the algorithm operates properly under real-world conditions. What follows are some exemplary tests and their descriptions.

Figure 7:
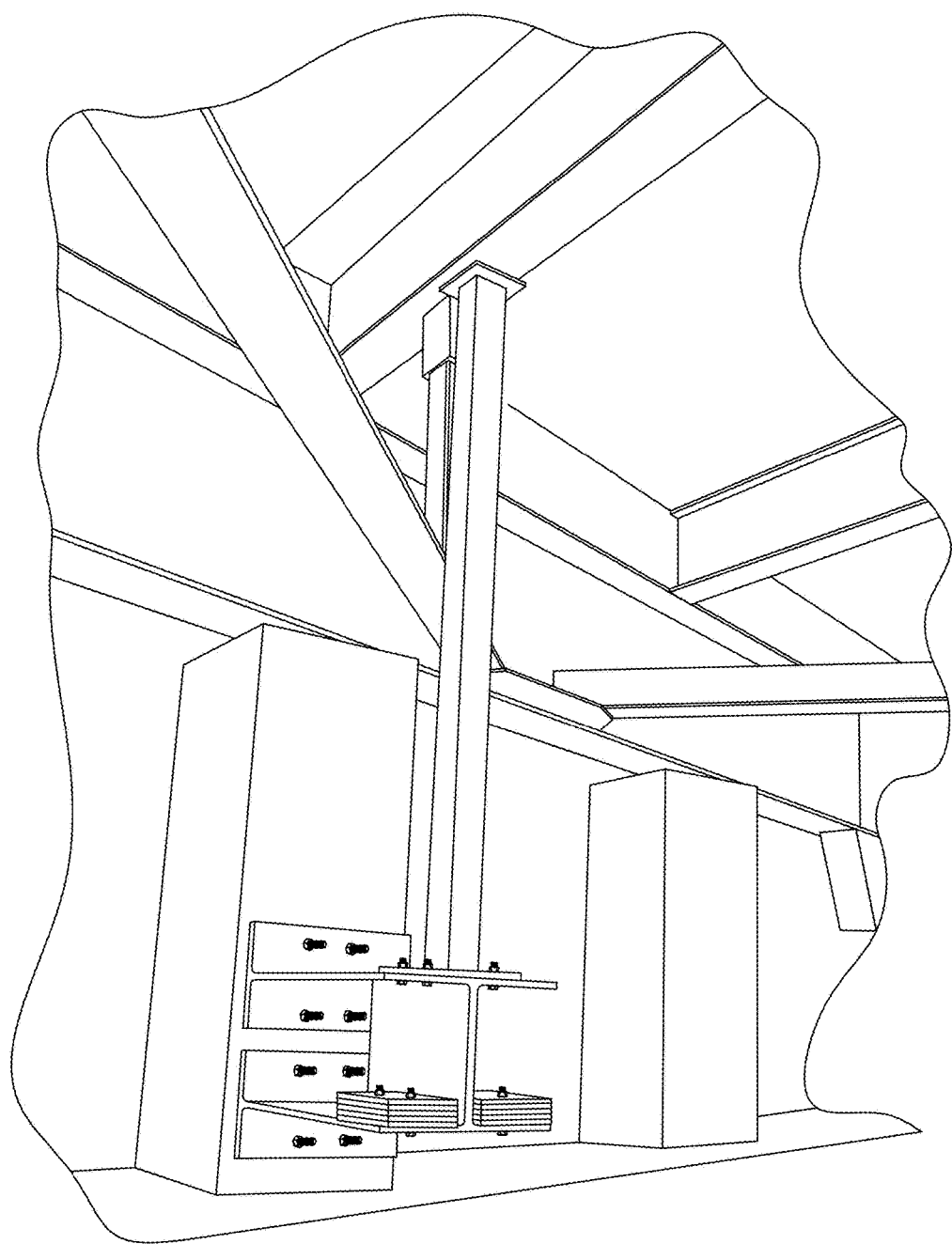
FIG. 7 is a pictorial representation of a photograph of installed sacrificial specimen in accordance with an illustrative embodiment.

In lieu of introducing damage to a bridge (e.g., US 30 Bridge), two sacrificial specimens were fabricated and installed on the bridge and damage was induced in the specimens. The sacrificial specimens were designed to simulate a damage-sensitive web gap area of the bridge, with similar dimensions and welds to encourage similar behaviors. The design consists of two simulated web gaps connected by a steel plate (simulating the floor-beam connection). In this configuration, each of the two web gaps undergoes double curvature bending similar to the actual bridge. The specimens were attached to the bridge by mounting their flanges to a concrete abutment pedestal. A steel strut was attached to both the specimen and a stringer to transfer loads from the bridge to the sacrificial specimen, inducing curvature bending in the specimens when the bridge was exposed to ambient traffic loadings (see, for example, FIG. 7).

In one web gap of each sacrificial specimen, a linear array of four strain sensors may be installed (subsequently referred to as Sensors 1 through 4). The shape/magnitude of the strain curve from the sacrificial specimens generally matched the shape of the strain curve from the actual bridge, confirming that the sacrificial specimens were adequate simulations of the bridge web gaps.

After specimen installation, training data (i.e., strain data collected before any damage was induced on the sacrificial specimens) was collected and the second-generation algorithm developed a control chart for each sensor on the bridge and on the specimens. Next, to determine if the algorithm could detect damage, various kinds and levels of damage were induced in the specimens and post-damage data plotted on the control charts. It was found that the algorithm correctly identified the damage in all cases. In Specimen 1, for example, because the induced damage was located closest to Sensor 4, it was expected that a large number of post-damage points for Sensor 4 would be outside the control limits. As expected, all of the damage indicator values (R-sum values) are outside the control limits. Also, every post-damage point from Sensors 2 and 3 was also outside the control limits. This result may indicate that the damage near Sensor 4 was quite severe (i.e., the farther away from the source that damage is detected, the more severe the damage).

It was surmised that, as damage becomes more severe, the damage indictor data (R-sum) will continue to shift until all data points are outside the control limits. To identify different levels of damage occurring in the web gap area, different crack sizes were produced in Specimen 2. First, an approximately 32 mm long crack was induced (similar to the cracking of Specimen 1), and test data gathered. The crack was extended to 38 mm, and test data collected. Finally, the length of the crack was extended to 44 mm, and test data collected. It was determined, for example, that there is a relationship between the damage indicator and damage severity.

Post-damage data for other sensors on the actual bridge itself (i.e., US 30 Bridge) and not on the specimens are also examined and found to be influenced to some extent by data from sensors close to the damage. For example, after cracking was induced on Specimen 1, all sensors on the bridge had at least one point outside the control limits, and four of the sensors had a large percentage of points (greater than 10%) outside the control limits. Thus, the post-damage results for the sensors on the bridge were likely influenced by the large indications of damage from the sensors on Specimen 1. Specifically, during the row- and column-sum calculations (i.e., resulting in R-sum values) needed to create a single control chart for each sensor, the largely-skewed values from the sensors close to where the damage occurred contributed a larger percentage to the R-sum values than the values by the other sensors. These results, in essence, revealed a higher than desired false-alarm rate (i.e., in excess of the 0.3% previously mentioned).

Algorithm Evaluation

Relatively high false-positive rates found from field testing the second-generation damage-detection algorithm were incurred resulting in a reassessment of the algorithm. The sub-algorithms and their underlying assumptions were evaluated, as were various issues related to the use of linear prediction models and the matrix simplification method. In the second-generation algorithm, a traditional linear regression model may be used to establish the relationship between data from sensor pairs. Traditional linear regression models minimize the square of the vertical distance between the best-fit line and the data points. The required assumption is that one "input" needs to be known to predict the "output." However, with the type of data utilized in the overall damage-detection algorithm, there are no predictor and response variables. Rather, each variable is independent. Therefore, it appears that such a linear regression may not be usable or a best fit.

In the second-generation approach, the strain residuals and the R-sum values are assumed to be taken from a normal distribution which is defined by the mean and standard deviation of the sample. The assumption of normally distributed data is critical to how the control charts are constructed. Specifically, the limits are set to achieve a specific false-positive rate, based on known characteristics of normal distributions related to the mean and multiples of the standard deviations.

To determine if a sample is taken from a population that is considered normally distributed, the chi-squared test for goodness of fit may be used. This test helps to determine at what significance level, $\alpha$, the data constitute a sample from a population with a distribution $f(x)$ for a sample that falls into r categories. If the calculated significance level is below the user-set target significance value, the null hypothesis that the sample is from a population with a distribution of $f(x)$ should be rejected.

In the second-generation approach, the residual data were assumed to be normally distributed in order to calculate the control limits based on a set false-positive rate. To evaluate this, residual values calculated from training data and from the first damage level data obtained from all the sensors on an actual bridge were evaluated for normalcy. Through these analyses, it was determined that a large percentage of the residual data were above the 0.85 significance level and, therefore could be considered to be a sample from a normally distributed population.

The residual data after the column- and row-summation procedure may also tested to determine whether or not the data sets were taken from a population that is normally distributed. Through analysis, it may be determined that a large percentage of the data was well below the 0.85 significance level and, therefore, the original null hypothesis was rejected. The algorithm's construction of the control charts may be based on an assumption that all data came from a population with a normal distribution; this represents, for example, a potential problem in the second-generation approach.

Due to the higher than desired false-positive rate and the apparent violation of several key assumptions, potential improvements to the second-generation algorithm and methodology were developed and evaluated hereinafter.

Alternative Linear Regression Technique

Figure 8:
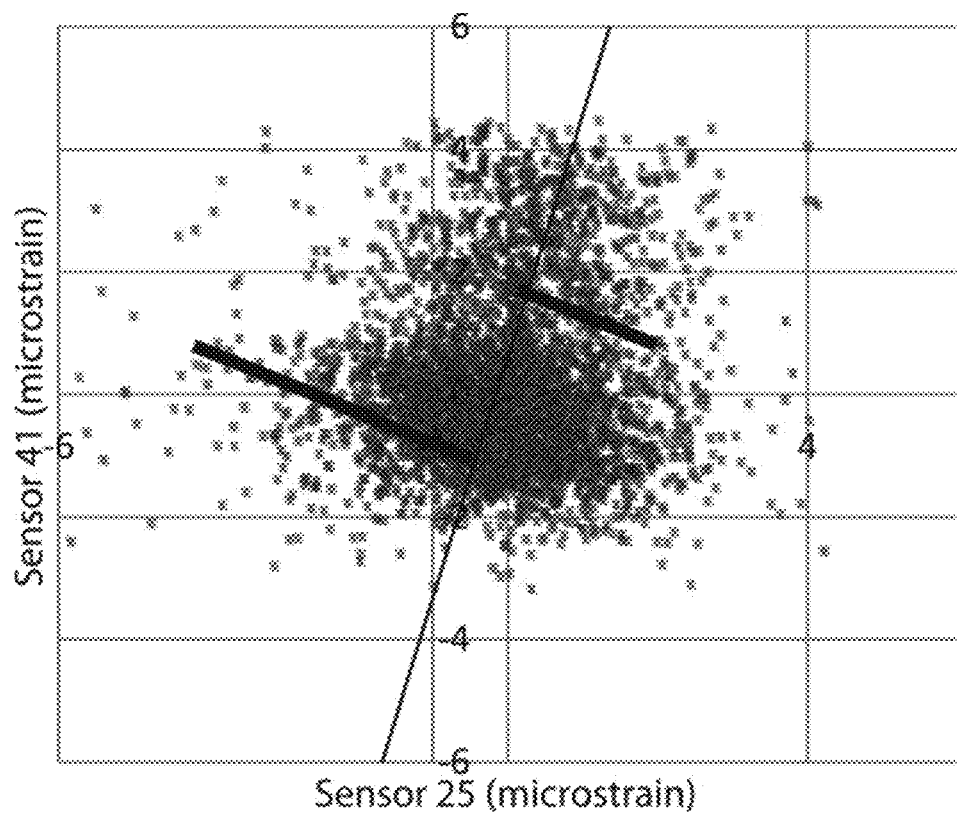
FIG. 8 is a pictorial representation of a sample orthogonal regression in accordance with an illustrative embodiment.

According to at least one preferred aspect of the present disclosure, an alternative linear regression technique is used, and specifically one that doesn't require one variable to be a predictor and one to be a response. One regression approach uses orthogonal regression, and an example is shown in FIG. 8 where the regressed line is illustrated by the thin sloping line and the orthogonal difference is shown by the thicker sloping lines.

An orthogonal regression may be appropriate when there is no natural distinction between predictor and response variables. Whereas traditional regression seeks to minimize the error in the response variable prediction, orthogonal regression generally minimizes the perpendicular distance of each x, y pair from the line called the orthogonal residuals as shown in FIG. 8.

Alternative Damage-Detection Approach

After evaluating several potential alternative approaches for assessing the presence of damage, an F-test was used. The F-test determines if a data set can be properly modeled with a simple (also known as a reduced) model or if a more complex (also known as a full) model is required. For application here, the null hypothesis may be as follows: if there is no damage, then the response during and after training can be modeled with a reduced (simple) model because the during-training and after-training responses will be the same. Therefore, when the full (more complex) model is used, it is postulated that damage has occurred because the behavior has changed. In short, if the error using the full and reduced models is statistically the same, likely no damage has occurred.

The full model was developed to be as follows:

$$Y = k_1(\alpha_1 + \alpha_3 x) + k_2(\alpha_2 + \alpha_4 x) \quad (1)$$

where $$k_1 = \begin{cases} 1 \text{ for training data} \\ 0 \text{ for test data} \end{cases}$$

and $$k_2 = \begin{cases} 0 \text{ for training data} \\ 1 \text{ for test data} \end{cases}$$

The reduced model, which must be a sub-model of the full model, may be given by $$Y = \gamma_1 + \gamma_3 x \quad (2)$$

In essence, the full model may be configured to use training and test data separately to create two lines that pass through both the training and post-training data separately. Although there are two lines, they may be considered one model, as shown by the dashed lines in both FIGS. 9A and 9B. The reduced model uses the training and test data together to create a single line that passes through both the training and test data collectively. The reduced model is shown as the dot-dot-dash lines in FIGS. 9A and 9B.

Figure 9A:
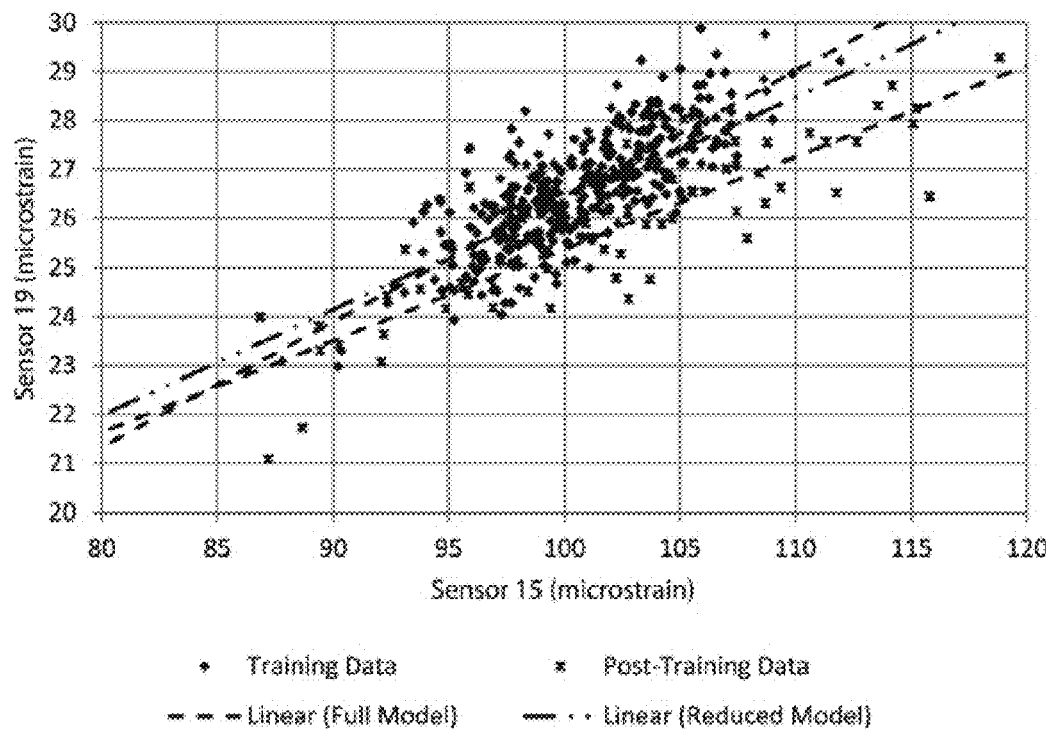
FIGS. 9A-B are pictorial representations of examples of damage assessment in accordance with an illustrative embodiment.
Figure 9B:
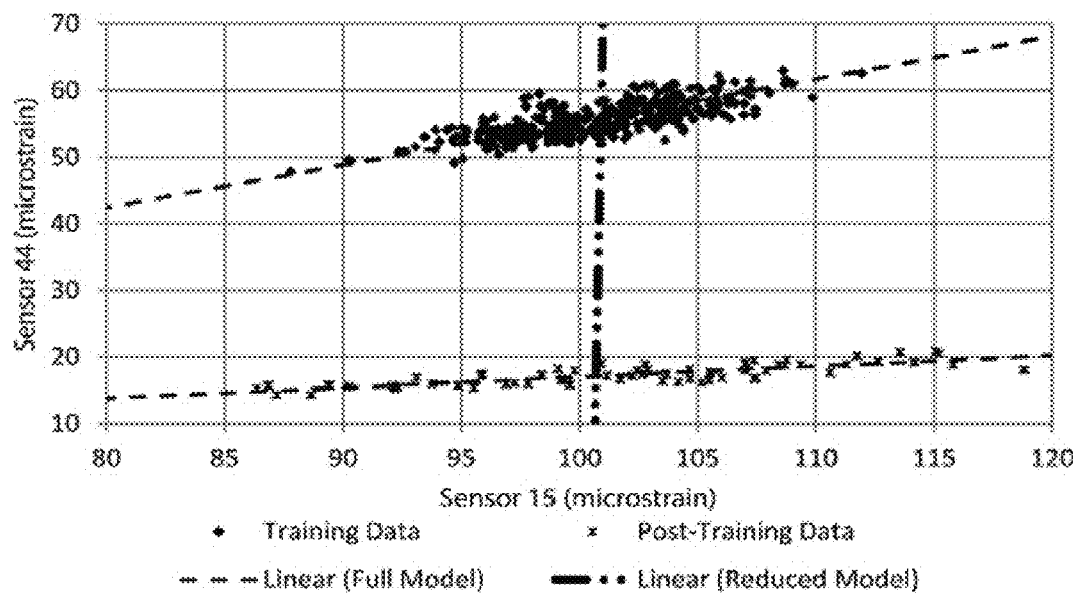

In FIG. 9A, the reduced model is statistically similar to the full model, leading to the conclusion that likely no damage has occurred at the two sensor locations. In FIG. 9B, on the other hand, the reduced model is different from the full model, indicating that damage has been detected.

To quantify these results, the F-test may be completed with a null hypothesis that the reduced model is able to fit the data set as well as the full model. When the training and post training portions of the combined data set are different (as in FIG. 9B), the null hypothesis may be rejected, which in turn may be an indication of damage. The F statistic is defined as:

$$F = \frac{[RSS(\text{reduced}) - RSS(\text{full})]/[df_{RSS(\text{reduced})} - df_{RSS(\text{full})}]}{RSS(\text{full})/df_{RSS(\text{full})}} \quad (3)$$

where RSS stands for residual sum of squares and df is the degrees of freedom associated with an RSS value. F-values can be calculated and a significance level can be found using the F distribution.

Evaluation of Revised Algorithm

To preliminarily evaluate the accuracy of the revised algorithm, the test data for the 32 mm crack on Specimen 2 was used in accordance with one example. Inspection of the F-test matrix revealed that the F-values for the sensors near the damage were significantly larger than all other F-values. This fact indicates that the revised algorithm may have a significantly reduced false-positive rate.

Orthogonal Regression and Statistical Evaluation Approach

Using orthogonal linear regression and a statistical F-test may be used to reduce false-detection rates associated with the various damage-detection methods.

Development of Orthogonal Regression and Orthogonal Residual

Figure 10A:
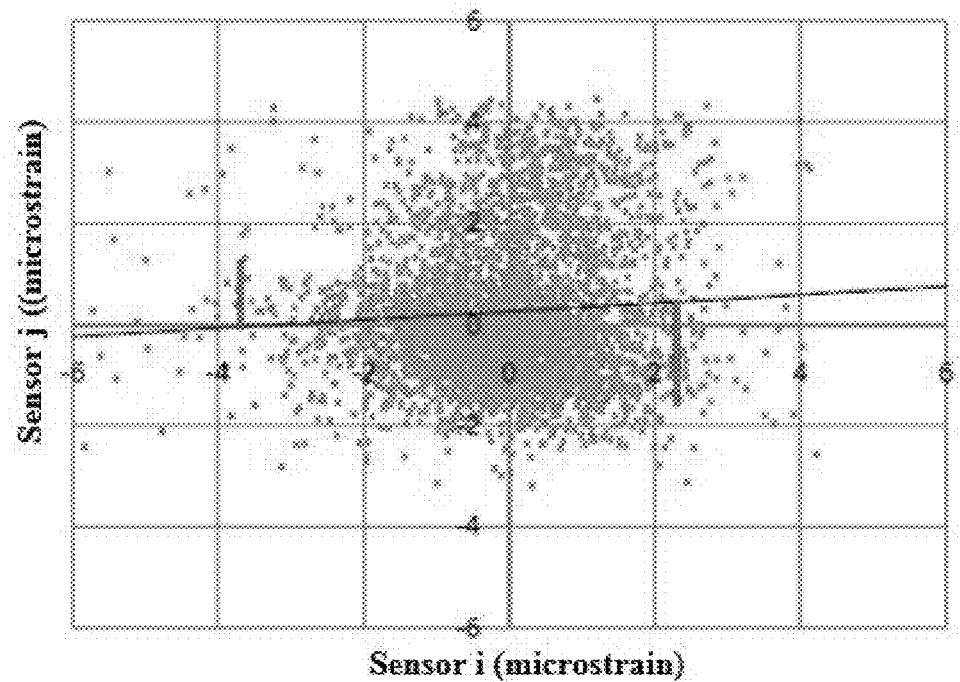
FIGS. 10A-B are pictorial representations is a pictorial representation of a standard linear regression and an orthogonal linear regression in accordance with an illustrative embodiment.
Figure 10B:
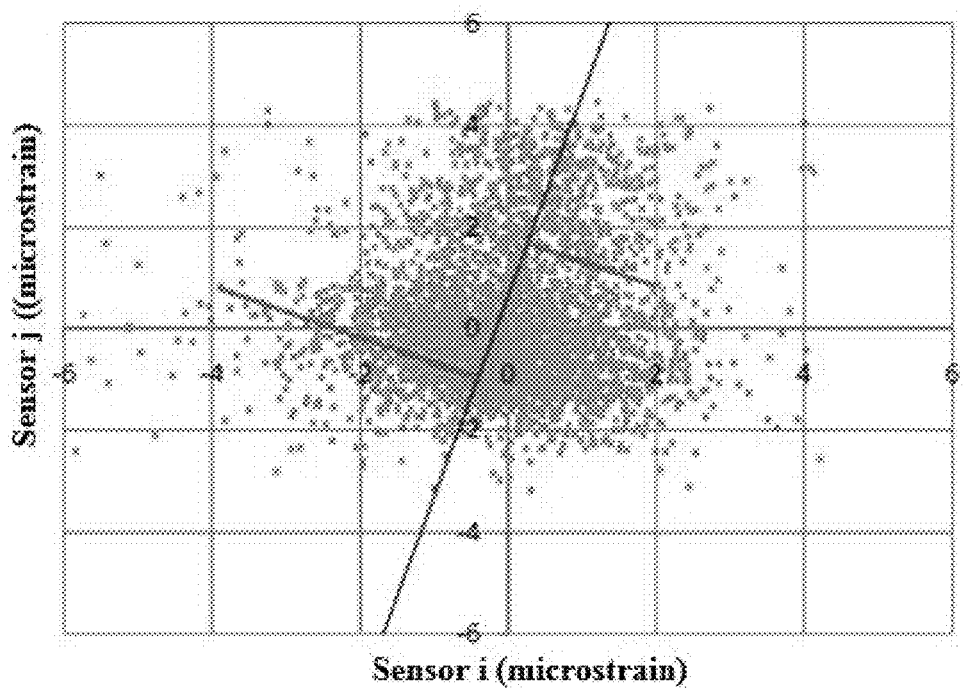

At least one use of orthogonal linear regression compares two measurement systems that both have measurement variations. In other words, the y measurement variation and the x measurement variation are both the same. A standard linear regression assumes that the x variable is fixed (i.e., no variation) and the y variable is a function of x plus some variation. FIGS. 10A-B show samples of standard linear regression and orthogonal linear regression.

The vertical bars in the chart on the left represent the y-residual and the negatively-sloping line in the chart on the right represents the orthogonal residual. As with any linear regression, y and x are related linearly through the following equation:

$$y = b + mx \quad (4)$$

where b is the y-intercept and m is the slope.

The equation for standard linear regression can be developed by minimizing the sum of the square of the y-residual, while the sum of the square of the perpendicular residual is minimized in the orthogonal linear regression.

$$r_i = \frac{y_i - b - mx_1}{\sqrt{m^2 + 1}} \quad (5)$$

Figure 11:
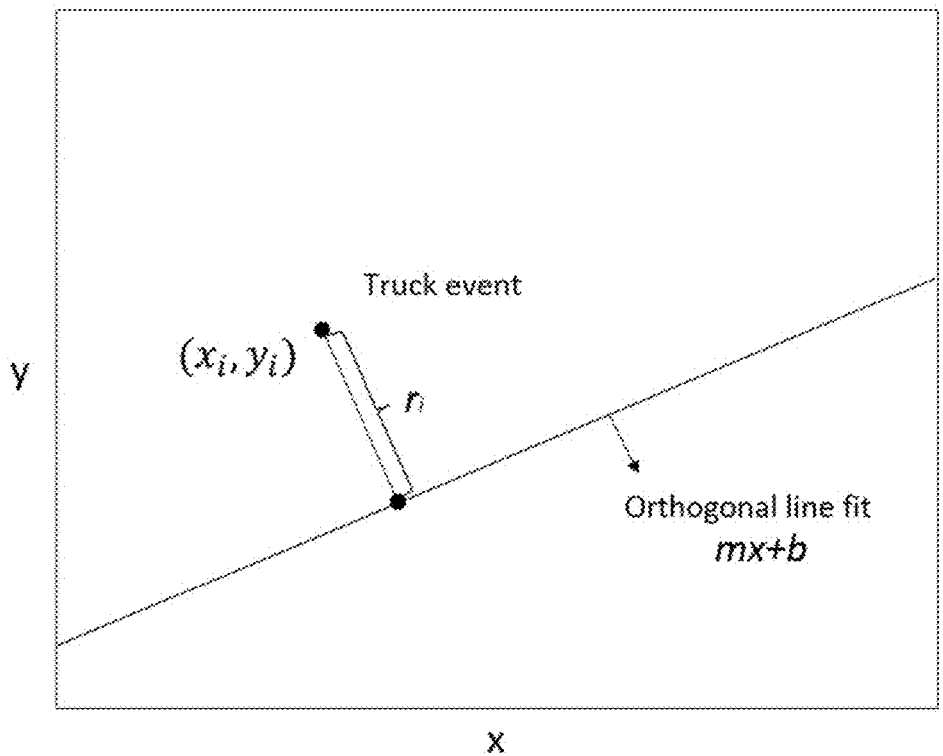
FIG. 11 is a pictorial representation of an orthogonal line fit and an orthogonal residual in accordance with an illustrative embodiment.

When the strain range data are in the first quadrant, an orthogonal residual is defined. An example of an orthogonal line fit and an orthogonal residual is shown in FIG. 11. The sum of square of the perpendicular residuals (SSR) from the data points to the regression line are given by the following:

$$SSR = \sum_{i=1}^{n} r_i^2 \quad (6)$$

Minimizing SSR results in the following:

$$m = \frac{s_x^2 - s_y^2 + [(s_x^2 - s_y^2)^2 + 4s_{xy}^2]^{\frac{1}{2}}}{2s_{xy}} \quad (7)$$

$$b = \bar{y} - m\bar{x} \quad (8)$$

where $s_x^2$ and $s_y^2$ are the variance of the x and y data, respectively and $s_{xy}$ is the covariance of x and y that can be written $p_{xy} s_x s_y$, in which $p_{xy}$ is the correlation coefficient.

Damage Detection Approach with F-test

Figure 12:
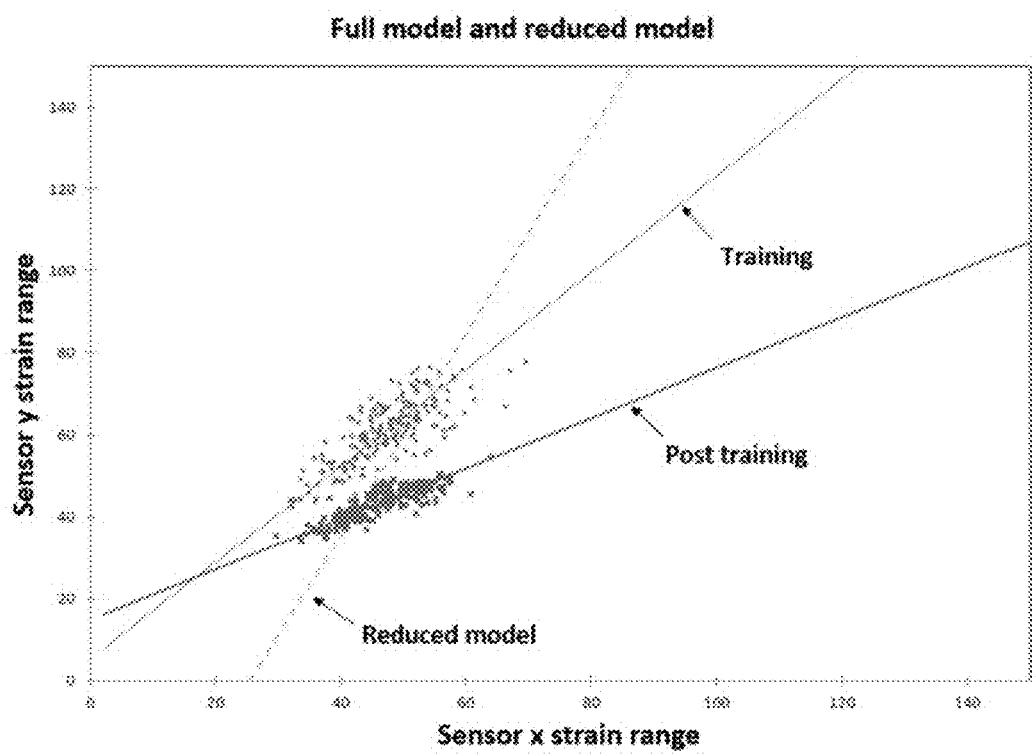
FIG. 12 is a pictorial representation of orthogonal fit lines for full and reduced models in accordance with an illustrative embodiment.
Figure 13A:
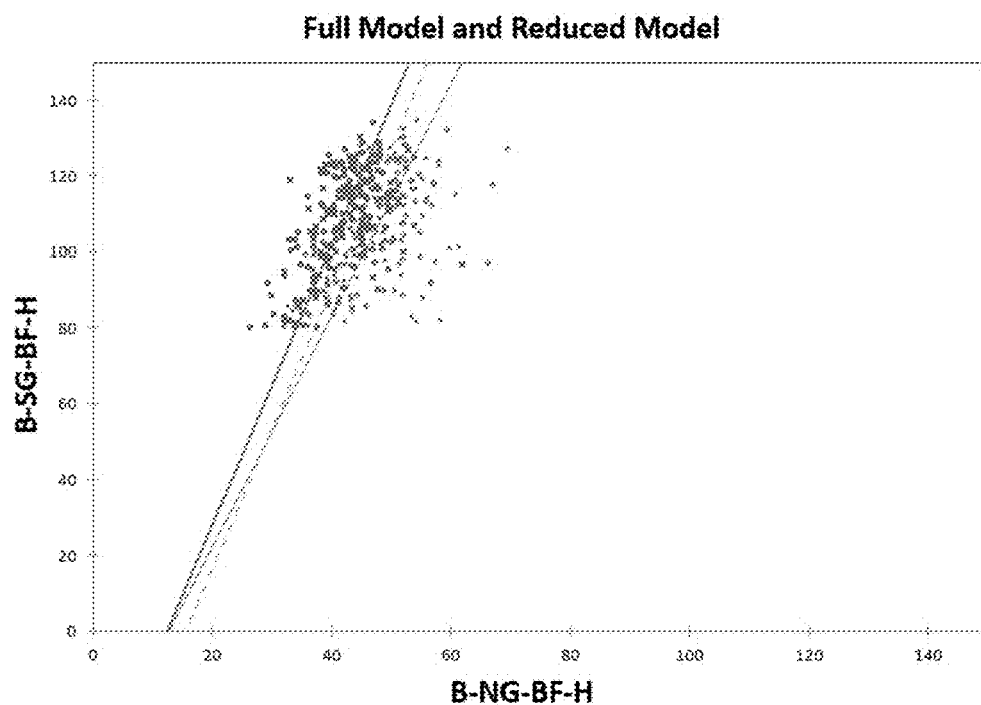
FIGS. 13A-B are pictorial representations of rejecting $H_O$, no damage (left) and failing to reject $H_O$, damage (right) in accordance with an illustrative embodiment.
Figure 13B:
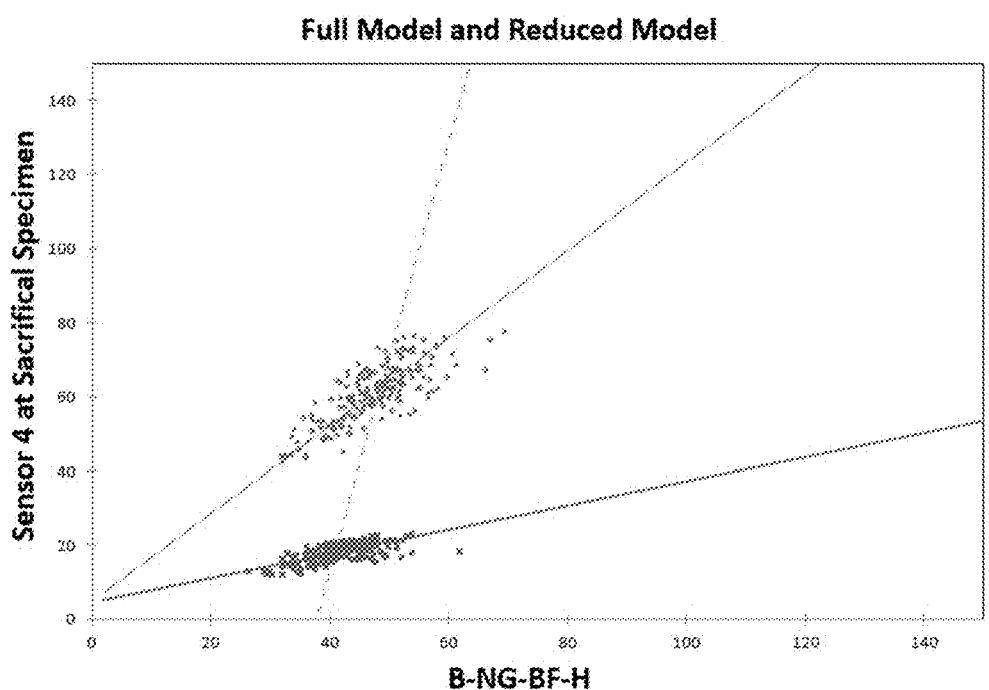

The F-test is typically used to evaluate the relationship between two different data sets. Generally, the purpose of the F-test is to quantify the amount of model improvement achieved by including additional variables in the prediction model by comparing the sum of the square of the residual (SSR) of a reduced and a full model with respect to each one's degree(s) of freedom. The full model (the more complex one), which contains more variables than the reduced model (the simpler one) was developed with a Z factor, which is an indicator variable and taken in to be as follows:

$$y=(\alpha_1+\alpha_3 x)+Z(\alpha_2+\alpha_4 x) \quad (9)$$

when Z is equal to zero, $\alpha_1$ and $\alpha_3$ are parameters from an orthogonal linear regression through the training data and, similarly, when Z is equal to $\alpha_1$ one, $\alpha_2$ plus and $\alpha_3$ plus $\alpha_4$ are the parameters from orthogonal linear regression through the post-training date. Z in this case indicates whether the data were from a training period or following the training period. One requirement for using the F-test is that the reduced model must be nested within the full model. Here the reduced model is taken as follows:

$$y=\alpha_5+\alpha_6 x \quad (10)$$

where $\alpha_5$ and $\alpha_6$ are parameters from an orthogonal linear regression through all the data (training and post training). An example of orthogonal fit lines for the full and reduced models are shown in FIG. 12. With the given full and reduced model, the similarity hypothesis may be tested:

$H_O$ (Null hypothesis): $\alpha_2=\alpha_4=0$ $H_A$ (Alternative hypothesis): $\alpha_4=\alpha_4 \neq 0$ If $H_O$ is true, the reduced model is statistically the same as the full model as shown graphically in FIG. 13A and it can be concluded that there is no damage at those two sensor locations. On the other hand, if $H_O$ is rejected, which is graphically illustrated in FIG. 13B, the reduced model is significantly different from the full model and it may be an indication of damage.

To quantify these results, the F-test is conducted with the null hypothesis ($\alpha_2=\alpha_4=0$) showing that the reduced model is able to fit the data set statistically as well as the full model. In general, the F statistic is defined as follows:

$$F = \frac{SSRreduced - SSRfull}{dfreduced - dffull} \div \frac{SSRfull}{dffull} \quad (11)$$

where $SSR_{reduced}$ is the sum of the square of the residual of the reduced model and is the sum of the square of the residual of the full model as given in Equation 6. df is the degrees of freedom associated with an SSR; $df_{reduced}$ and $df_{full}$ are the degrees of freedom of the reduced and full models, respectively. For the case of the models in Equation 12:

$$df_{reduced}=n-2$$

$$df_{full}=n-4 \quad (12)$$

because the reduced model has two terms and the full model has four terms and n represents the number of truck events, that is as follows. Note that $SSR_{full}$ is the sum of the squares of the residuals for both training and post-training data.

$$n=n_{training}+n_{post\ training} \quad (13)$$

$n_{training}$=number of trucks in the training data $\quad (14)$ $n_{post\ training}$=number of trucks in the post training data $\quad (15)$ Damage Detection Methodolgies In this chapter, various enhancements to the previously-investigated damage-detection methodologies using control charts are presented and investigated with actual data. The ability of the methodologies to detect damage and the rate at which damage is identified falsely are discussed.

Overall Methodology

Figure 14:
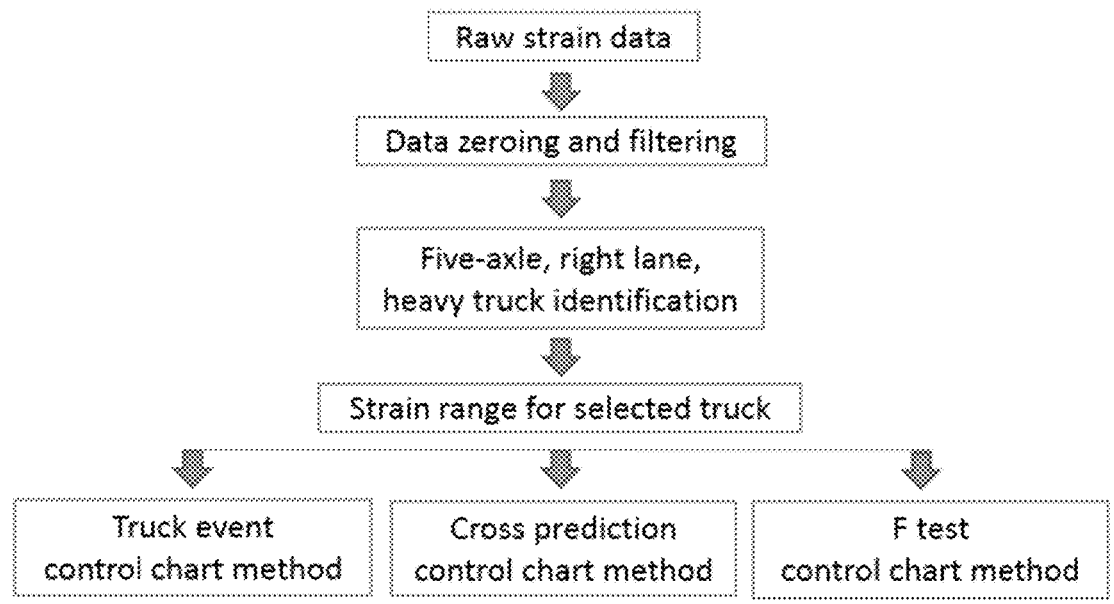
FIG. 14 is a pictorial representation of a damage detection method in accordance with an illustrative embodiment.

As introduced previously, the strain data reduction, which includes data zeroing for removing temperature effects and filtering to obtain a quasi-static response of the bridge. As part of the overall process, truck parameters may also determine such that only selected five-axle, right-lane trucks are used in the damage-detection approach. In addition, the time-domain data may be converted to strain ranges for each truck event. With the strain range data, four control-chart-based damage-detection methods may be implemented as shown in the flow chart in FIG. 14: 1) strain range for a single truck event, 2) strain range for grouped truck events, 3) cross prediction model, and 4) F-test. Details for each of the damage-detection processes are presented in this chapter.

Generally, control charts are used for dealing with measurements and exercising control over the average quality of a process as well as its variability. For the damage-detection approach developed here, control charts are divided into three regions: training, testing and evaluation.

The training period, where strain range data are obtained from truck events from the presumed undamaged structure, is used to establish important parameters such as the mean and standard deviation of the measurements, as discussed above, to define the normal operation of the system.

Following the training period, a testing period is utilized to evaluate the efficacy of the training period.

The evaluation period is generally for monitoring the bridge for change in structural performance (e.g., possible damage). Accordingly, evaluation data are further subdivided into the following regions: Evaluation 1, Evaluation 2, Evaluation 3, and Evaluation 4.

For reference, the training period may consist of 2,000 truck events and the testing period may consist of 1,000 truck events. The four evaluation periods represented times when there were varying levels of damage present in a sacrificial specimen. During Evaluation 1, no damage was present. During Evaluation 2, a crack size of 1.25 in. was present. During Evaluation 3, a crack size of 1.50 in. was present. During Evaluation 4, a crack size of 1.75 in. was present. When implemented, the system operates continuously during the evaluation period with notifications of suspected damage sent in near real-time.

In another embodiment of the control-chart-based damage-detection methodologies, only a single check was used to define when a change in structural behavior had occurred (when data were greater than three standard deviations from the mean). Some process changes may be missed by only this single rule. Therefore, additional rules are investigated, formulated, and evaluated. Table 1 summarizes six rules considered during methodology finalization and evaluation.

TABLE 1

Control chart rules and number of rule checks

| Control chart rules | Number of rule checks |
|---|---|
| #1 - One point beyond ±3 s | n |
| #2 - Two successive points out of three points beyond ±2 s | n-3 |
| #3 - Four successive points out of five points ±1 s | n-5 |
| #4 - Eight consecutive points on one side of the mean | n-8 |

TABLE 1-continued

Control chart rules and number of rule checks

| Control chart rules | Number of rule checks |
|---|---|
| #5 - Six consecutive points trending up or down | n-6 |
| #6 - Fourteen consecutive points alternating up or down | n-14 |

Each of these rules represents a different type of change in process control. In the context of damage detection, the violation of any rule could be an indicator of a change in structural condition.

Figure 15:
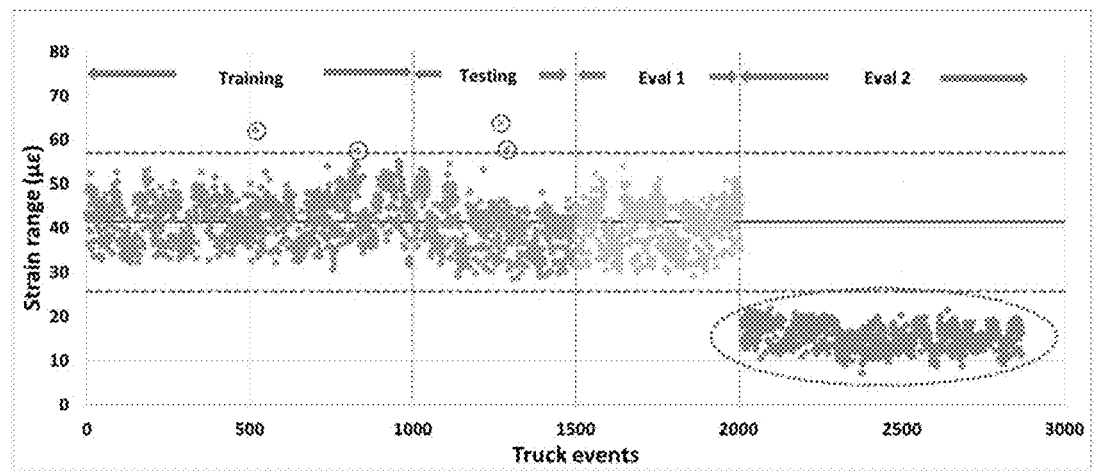
FIG. 15 is a pictorial representation of a control chart in accordance with an illustrative embodiment.
Figure 16A:
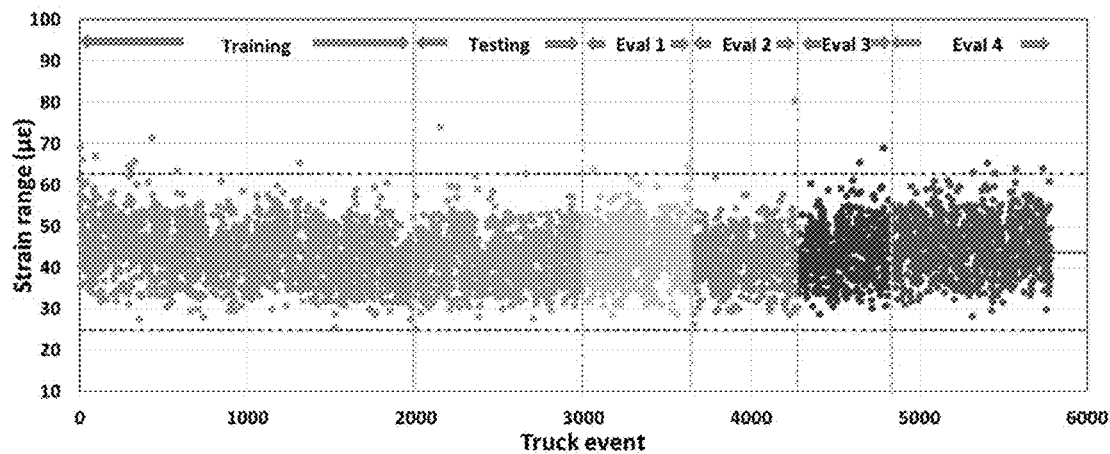
FIGS. 16A-H are pictorial representations of control charts for a one-truck event in accordance with an illustrative embodiment.
Figure 16B:
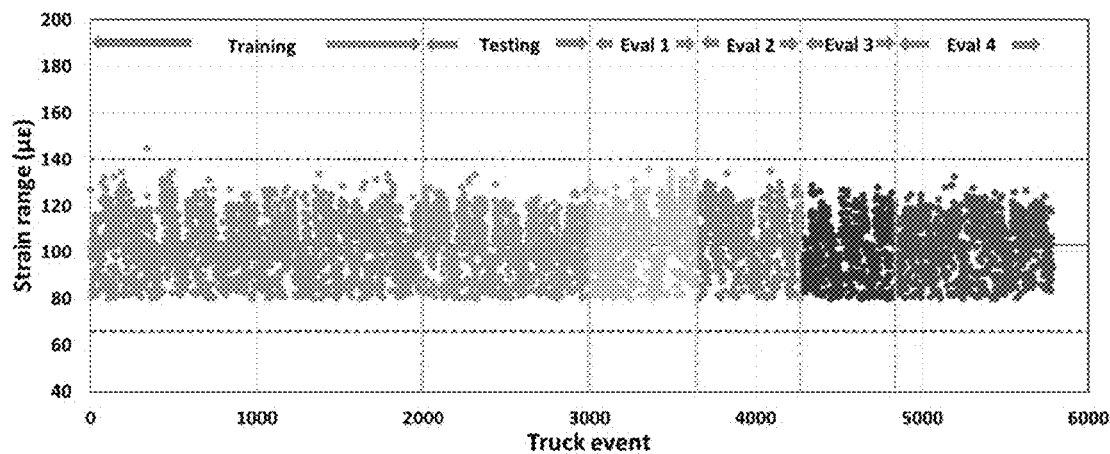
Figure 16C:
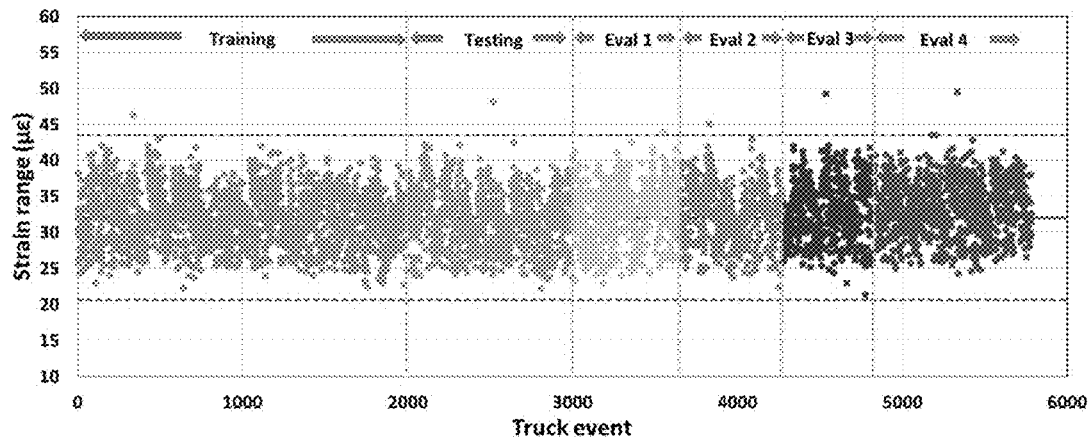
Figure 16D:
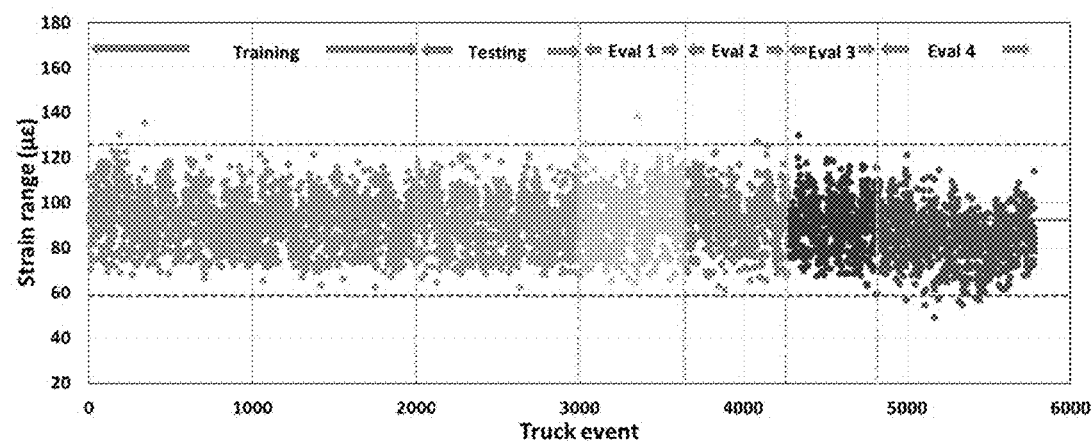
Figure 16E:
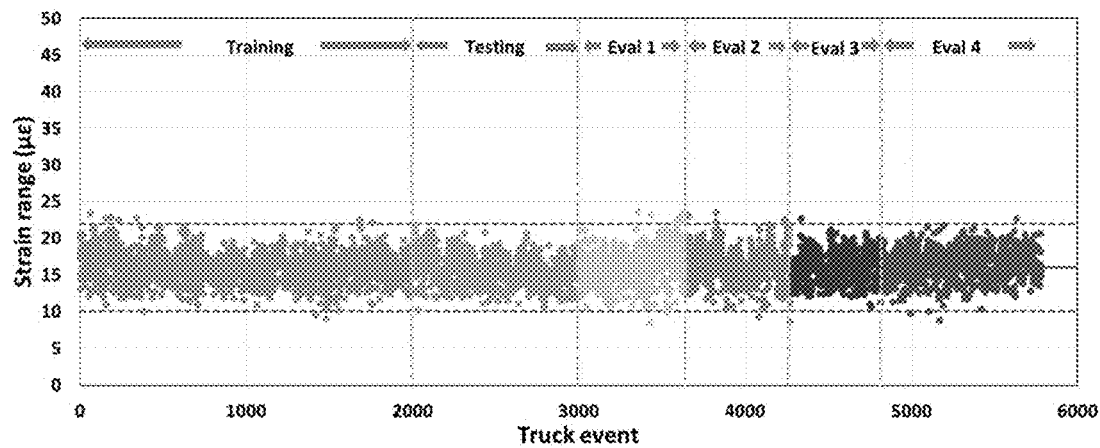
Figure 16F:
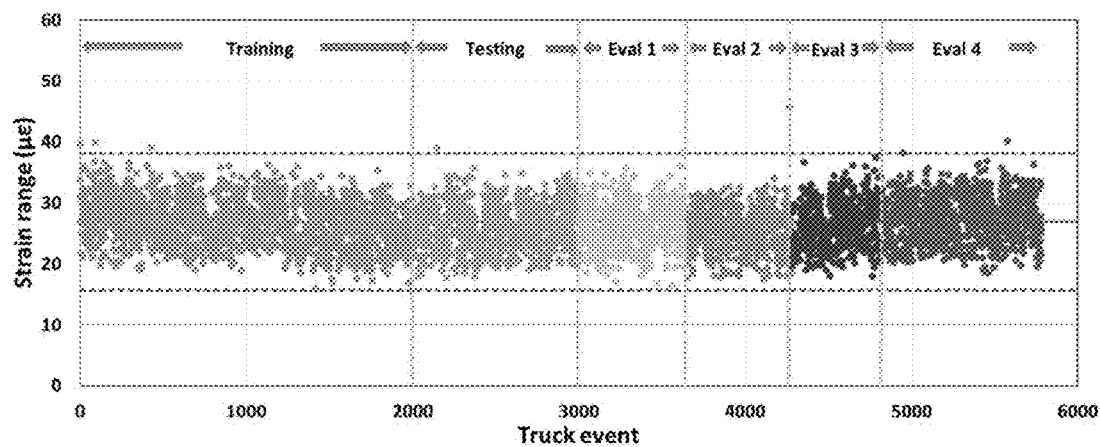
Figure 16G:
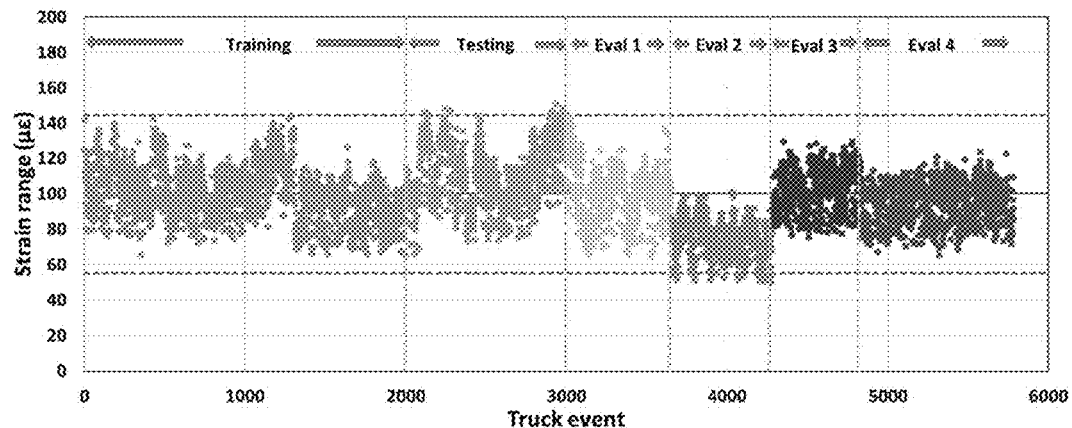
Figure 16H:
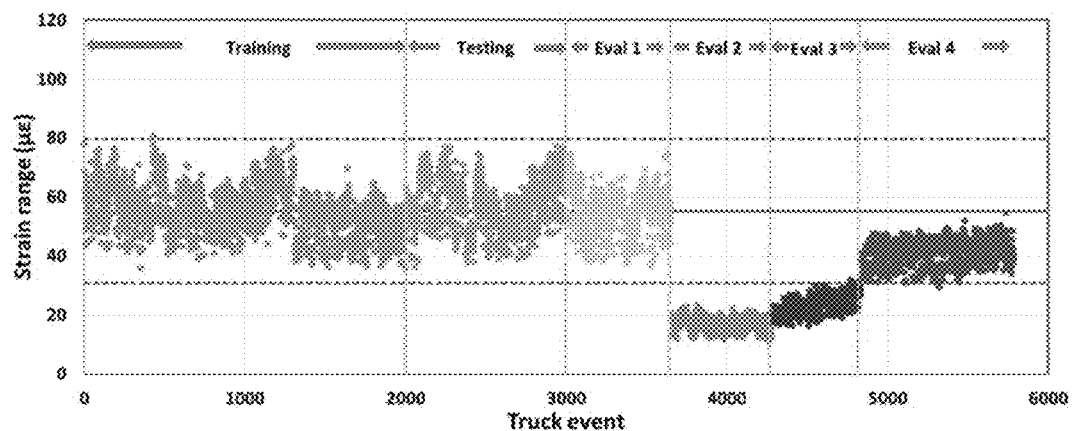
Figure 17A:
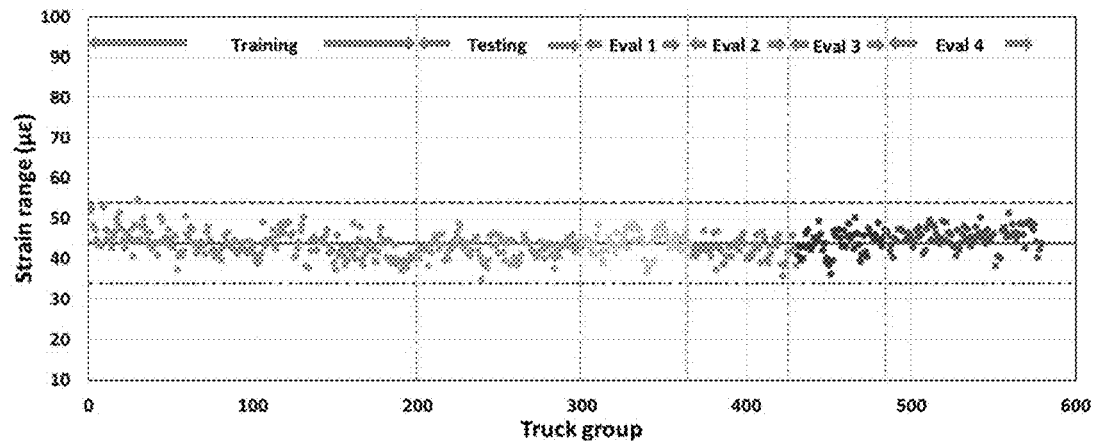
FIGS. 17A-H are pictorial representations of control charts for truck events grouped by ten in accordance with an illustrative embodiment.
Figure 17B:
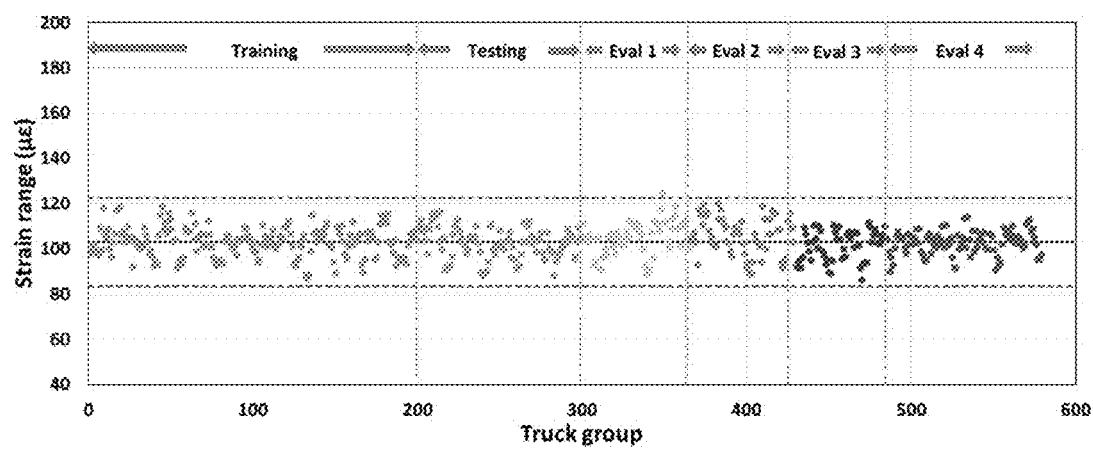
Figure 17C:
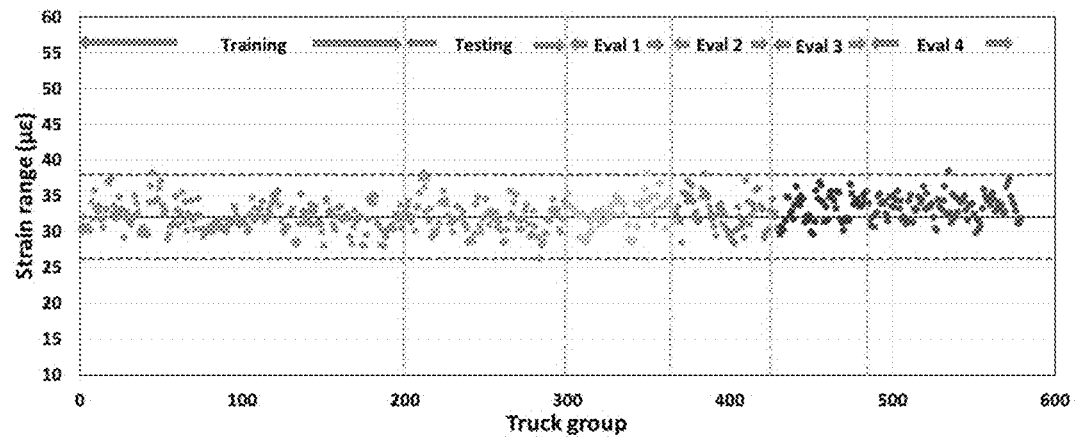
Figure 17D:
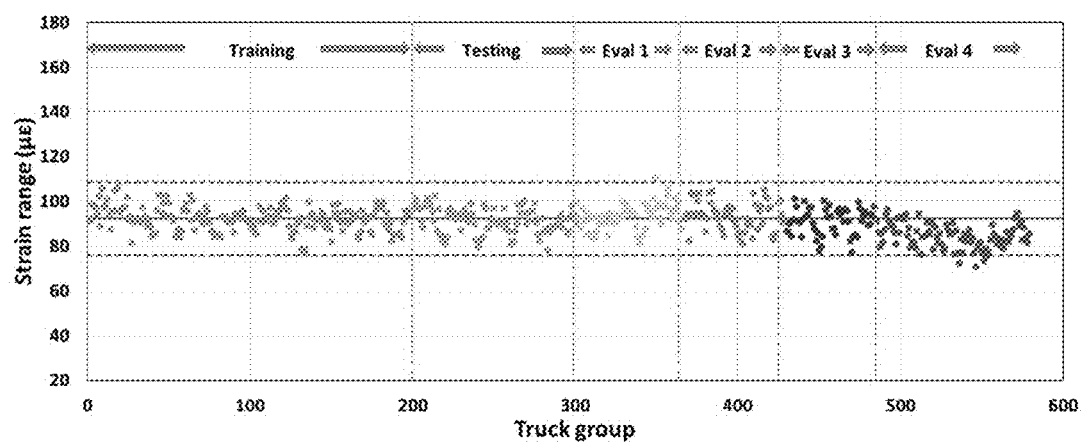
Figure 17E:
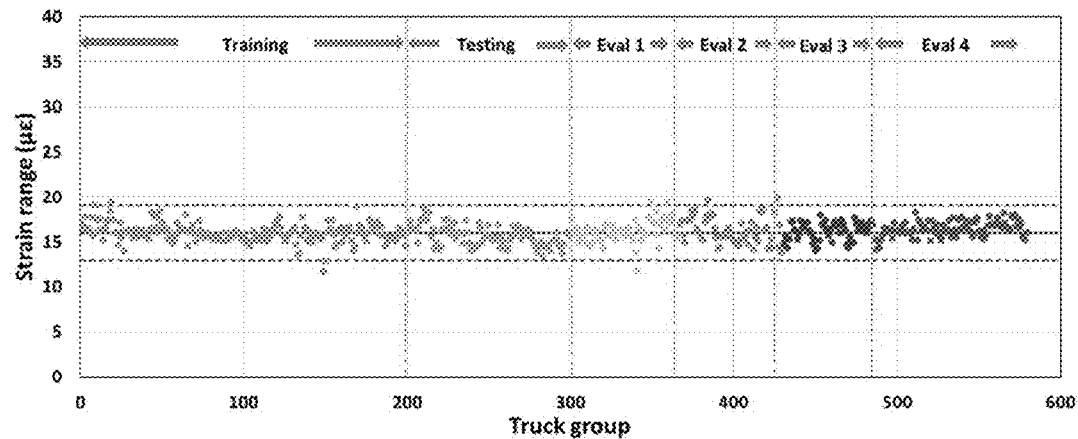
Figure 17F:
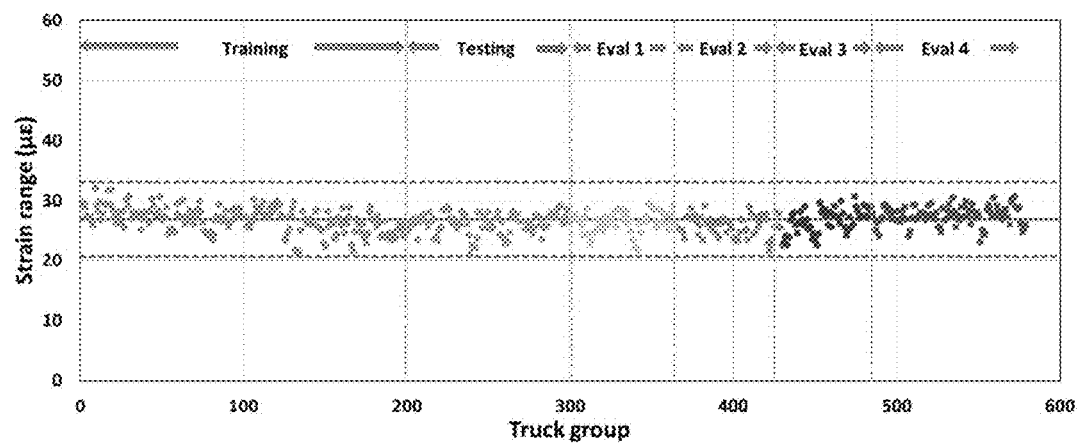
Figure 17G:
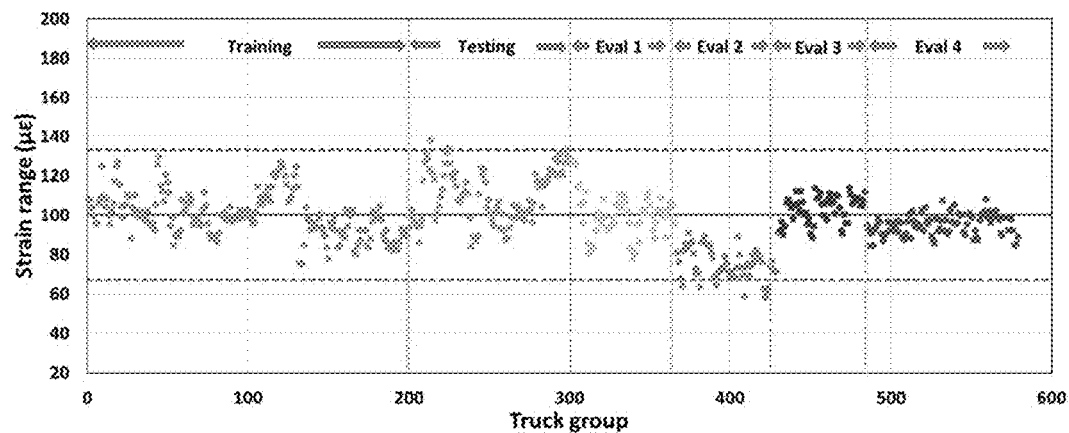
Figure 17H:
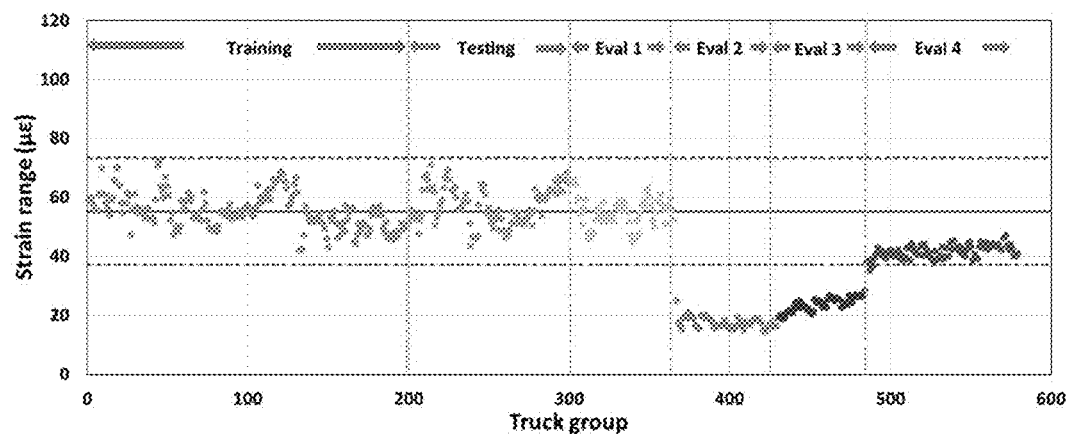

From one perspective, a false indication of damage occurs if one of the control chart rules is violated but there is no damage (the incorrect rejection of a true null hypothesis and sometimes called a type I error). For example, the circled points in FIG. 15 are false indications; that is, they are points outside the control limits but, for this particular case, there is no known structural damage.

A true indication is defined as data points beyond the limits when there is truly damage. An example of true indication, in the dashed ellipse (lower right of the chart), is shown in FIG. 15. After each specific damage-detection methodology is presented, the methodology is applied to cases of no damage and actual damage and evaluated with respect to damage-detection capability and with respect to false-indication rates.

Truck Event Control Chart Methods
  One-Truck Event Method
  With the collected, filtered, and zeroed strain range data described above, control charts may be constructed directly using the strain range for each truck event for each sensor without further processing (i.e., one point on the control chart represents the strain range for a single truck event). Control charts may therefore represent the response data in its most basic form. In addition, in this form, a graphical representation may be interpreted easily with fundamental structural engineering concepts. Control charts and associated limits may be constructed using the mean and standard deviation of all trucks in the training period.
Truck Events Grouped by Ten Method
  Group size can be an important parameter in constructing a control chart because it affects the control limits and the sensitivity of the false-indication rate. For example, the larger the group size, the narrower the control limits; therefore, slight damage could be detected from small variations. However, at the same time, larger group sizes may increase the time that it takes for damage to be identified.

An optimal group size may be 10. Similar to the one-truck event approach, the mean of the means and standard deviations from data for 10 trucks (one group) are used as the chart variables. As before, the mean and standard deviations of the grouped strain range data during the training period may be used to construct the control charts.

Select Results
  The sensors listed in Table 2 may be used to illustrate the application of the truck event control chart methods for one-truck event and truck events grouped by ten below. These sensors were selected because they are typical of all results and they represent diverse sensor locations that include sensors on the bridge and on the sacrificial specimen.

TABLE 2

List of select sensors used to create sample control charts
Sensor Name

B-NG-BF-H
B-SG-BF-H
C-SG-BF-H
C-SG-CB(5)-V
C-SG-CB(4)-V
C-NG-BF-H
Sensor 1 on sacrificial specimen
Sensor 4 on sacrificial specimen One-Truck Event Control Chart
  Examples of one-truck event control charts for at test specimen for the selected sensors are shown in FIGS. 16A-H. To establish the control limits for the various rules described above, the mean and standard deviation may be calculated to be as shown in Table 3.

TABLE 3

Mean and standard deviations of select sensors for one-truck event method

| Sensor name | Mean | Standard deviation |
|---|---|---|
| B-NG-BF-H | 44 | 6 |
| B-SG-BF-H | 103 | 12 |
| C-SG-BF-H | 32 | 4 |
| C-SG-CB(5)-V | 92 | 11 |
| C-SG-CB(4)-V | 16 | 2 |
| C-NG-BF-H | 27 | 4 |
| Sensor 1 on sacrificial specimen | 100 | 15 |
| Sensor 4 on sacrificial specimen | 55 | 8 |

To summarize the propensity for violating the rules in Table 1, a table was developed to summarize the number of times that each rule was violated during each monitoring period. The rule violations for the one-truck event control chart method for select sensor are summarized in Table 4.

TABLE 4

Rule violations for one-truck event method

| Sensor | Period | Rule 1 | Rule 2 | Rule 3 | Rule 4 | Rule 5 | Rule 6 | Total |
|---|---|---|---|---|---|---|---|---|
| B-NG-BF-H | Training | 9 | 15 | 93 | 148 | 7 | 15 | 287 |
| | Testing | 2 | 2 | 42 | 82 | 5 | 7 | 140 |
| | Evaluation 1 | 2 | | 15 | 44 | 1 | | 62 |
| | Evaluation 2 | 1 | 4 | 35 | 62 | 2 | 1 | 105 |
| | Evaluation 3 | 2 | 3 | 19 | 42 | 1 | 1 | 68 |
| | Evaluation 4 | 5 | 6 | 22 | 45 | 3 | 2 | 83 |
| | Total | 21 | 30 | 226 | 423 | 19 | 26 | 745 |
| | Rate (%) | 0.4 | 0.5 | 3.9 | 7.3 | 0.3 | 0.5 | 2.1 |
| B-SG-BF-H | Training | 1 | 2 | 147 | 239 | 5 | 8 | 402 |
| | Testing | | | 88 | 172 | 2 | 5 | 267 |

TABLE 4-continued

| Rule violations for one-truck event method | | | | | | | | |
|---|---|---|---|---|---|---|---|---|
| Sensor | Period | Rule 1 | Rule 2 | Rule 3 | Rule 4 | Rule 5 | Rule 6 | Total |
| | Evaluation 1 | | 5 | 52 | 62 | 2 | 9 | 130 |
| | Evaluation 2 | | 2 | 88 | 133 | 4 | | 227 |
| | Evaluation 3 | | | 41 | 87 | 1 | | 129 |
| | Evaluation 4 | | | 40 | 79 | 5 | 5 | 129 |
| | Total | 1 | 9 | 456 | 772 | 19 | 27 | 1284 |
| | Rate (%) | 0.2 | 0.2 | 7.9 | 13.4 | 0.3 | 0.5 | 3.7 |
| C-SG-BF-H | Training | 1 | 17 | 123 | 138 | 5 | 11 | 295 |
| | Testing | 1 | 6 | 90 | 143 | 5 | 1 | 246 |
| | Evaluation 1 | 1 | 3 | 38 | 78 | | 6 | 126 |
| | Evaluation 2 | 1 | 7 | 50 | 133 | 4 | | 195 |
| | Evaluation 3 | 1 | 9 | 56 | 40 | 6 | 3 | 115 |
| | Evaluation 4 | 3 | | 68 | 58 | 1 | | 130 |
| | Total | 8 | 42 | 425 | 590 | 21 | 21 | 1107 |
| | Rate (%) | 0.1 | 0.7 | 7.4 | 10.2 | 0.4 | 0.4 | 3.2 |
| C-SG-CB(5)-V | Training | 2 | 15 | 76 | 129 | 2 | 16 | 240 |
| | Testing | | 5 | 70 | 103 | 2 | 2 | 182 |
| | Evaluation 1 | 2 | 8 | 18 | 47 | | 7 | 82 |
| | Evaluation 2 | 1 | 3 | 34 | 72 | 2 | 3 | 115 |
| | Evaluation 3 | 1 | 4 | 42 | 43 | 1 | | 91 |
| | Evaluation 4 | 8 | 37 | 120 | 198 | 2 | 1 | 366 |
| | Total | 14 | 72 | 360 | 592 | 9 | 29 | 1076 |
| | Rate (%) | 0.2 | 1.2 | 6.2 | 10.3 | 0.2 | 0.5 | 3.10 |
| C-SG-CB(4)-V | Training | 11 | 33 | 108 | 141 | 8 | 18 | 319 |
| | Testing | | 12 | 77 | 189 | 2 | | 280 |
| | Evaluation 1 | 8 | 37 | 55 | 60 | 7 | | 167 |
| | Evaluation 2 | 9 | 33 | 96 | 111 | 9 | | 258 |
| | Evaluation 3 | 1 | 4 | 19 | 53 | 1 | 1 | 79 |
| | Evaluation 4 | 4 | 4 | 50 | 89 | 1 | 2 | 150 |
| | Total | 33 | 123 | 405 | 643 | 28 | 21 | 1253 |
| | Rate (%) | 0.6 | 2.1 | 7.0 | 11.1 | 0.5 | 0.4 | 3.62 |
| C-NG-BF-H | Training | 4 | 18 | 137 | 242 | 9 | 3 | 413 |
| | Testing | 1 | 1 | 68 | 123 | 1 | 6 | 200 |
| | Evaluation 1 | 1 | | 39 | 47 | 1 | | 88 |
| | Evaluation 2 | 1 | 8 | 48 | 88 | 1 | | 146 |
| | Evaluation 3 | | | 37 | 69 | 3 | 3 | 112 |
| | Evaluation 4 | 2 | 1 | 26 | 64 | 1 | | 94 |
| | Total | 9 | 28 | 355 | 633 | 16 | 12 | 1053 |
| | Rate (%) | 0.2 | 0.5 | 6.2 | 11.0 | 0.3 | 0.2 | 3.0 |
| Sensor 1 on sacrificial specimen | Training | | 46 | 311 | 451 | 8 | 8 | 824 |
| | Testing | 17 | 129 | 289 | 322 | 3 | 4 | 764 |
| | Evaluation 1 | | 23 | 100 | 161 | 2 | 4 | 290 |
| | Evaluation 2 | 30 | 174 | 467 | 608 | 1 | | 1280 |
| | Evaluation 3 | | | 24 | 73 | 1 | 3 | 101 |
| | Evaluation 4 | | 1 | 43 | 103 | 1 | 1 | 149 |
| | Total | 47 | 373 | 1234 | 1718 | 16 | 20 | 3408 |
| | Rate (%) | 0.8 | 65 | 21.4 | 29.8 | 0.3 | 0.4 | 9.8 |
| Sensor 4 on sacrificial specimen | Training | 1 | 38 | 300 | 440 | 8 | 8 | 795 |
| | Testing | | 25 | 207 | 193 | 4 | 1 | 430 |
| | Evaluation 1 | | 2 | 54 | 104 | 1 | 4 | 165 |
| | Evaluation 2 | 627 | 625 | 623 | 620 | | | 2495 |
| | Evaluation 3 | 549 | 549 | 547 | 544 | 1 | 3 | 2193 |
| | Evaluation 4 | 1 | 181 | 821 | 945 | 3 | 8 | 1959 |
| | Total | 1178 | 1420 | 2552 | 2846 | 17 | 24 | 8037 |
| | Rate (%) | 20.4 | 24.6 | 44.2 | 49.3 | 0.3 | 0.4 | 23.2 |

FIGS. 16A-H and Table 4 show that during the training, testing, and Evaluation 1 periods (when there was no damage), there were a number of rule violations and the majority of those violations resulted from either Rule 3 or Rule 4. The rule violation rate for all sensors on the bridge were similar during all phases of monitoring indicating that the system was operating in a stable manner (also observable in Table 4.5). Once damage was introduced, the sensors on the specimen were collectively able to identify the damage with multiple rule violations of multiple types.

For each control chart region and each sensor, the number of rule violations and rate with respect to the six rules may be counted and calculated and are summarized in Table 4. The relatively high number of rule violations from Rule 3 and 4 significantly affect the overall false-indication rate. Table 5 shows the number of false indications for sensors on the bridge (non-damaged).

TABLE 5

Number of false indications for sensors on bridge (non-damaged) for one-truck event method

| Sensor with no damage | False indications (Training, Testing, Evaluation 1, 2, 3, and 4) | False indication rate (%) |
|---|---|---|
| B-NG-BF-H | 745 | 2.2 |
| B-SG-BF-H | 1284 | 3.7 |
| C-SG-BF-H | 1107 | 3.2 |
| C-SG-CB(5)-V | 1076 | 3.1 |
| C-SG-CB(4)-V | 1253 | 3.6 |
| C-NG-BF-H | 1053 | 3.0 |

When there was real damage near the sensors on the sacrificial specimen, the true-indication rate may be investigated by considering the Evaluation 2, 3, and 4 regions, which are summarized in Table 6. Note that, as expected, the true-indication rate is higher for Sensor 4 placed near the crack than for Sensor 1 placed away from the crack.

TABLE 6

Number of false and true indications for sensors on sacrificial specimen (near damage) for one-truck event method

| Sensor near damage | False indications (Training, Testing, Evaluation 1) | False indication rate (%) | True indications (Evaluation 2, 3, and 4) | True indication rate (%) |
|---|---|---|---|---|
| Sensor 1 | 1878 | 8.6 | 1530 | 12.0 |
| Sensor 4 | 1390 | 6.4 | 6647 | 52.2 |

Truck Events Grouped by Ten Control Chart

Examples of truck events grouped by ten control charts for a test specimen for select sensors are shown in FIGS. 17A-H. The mean and standard deviation were calculated to establish the control limits for the various rules and are shown in Table 7. The mean values are approximately the same as the one-truck event method but the standard deviation is notably narrower because of the grouping process.

TABLE 7

Mean and standard deviations of select sensors ($\mu\varepsilon$) for truck events grouped by ten method

| Sensor name | Mean | Standard deviation |
|---|---|---|
| B-NG-BF-H | 44 | 3 |
| B-SG-BF-H | 103 | 7 |
| C-SG-BF-H | 32 | 2 |
| C-SG-CB(5)-V | 92 | 6 |
| C-SG-CB(4)-V | 16 | 1 |
| C-NG-BF-H | 27 | 2 |
| Sensor 1 on sacrificial specimen | 100 | 11 |
| Sensor 4 on sacrificial specimen | 56 | 6 |

As with the one-truck event methodology, a table was constructed to summarize the tendency for violating the control chart rules. From FIGS. 17A-H and Table 8, it is observed that during the training, testing, and Evaluation 1 periods (when there was no damage), there were a number of rule violations and that the majority of those resulted from either Rule 3 or Rule 4.

From FIGS. 17A-H, sensors on the bridge (non-damaged) follow control chart Rule 1 well. It was also found that sensors near damage (i.e., Sensor 4) show violations of Rule 1 in the Evaluation 2, 3, and 4 regions. In Table 8, the methodology found significantly high numbers of rule violations from Rule 3 and Rule 4 and those violations affect the overall false-indication rate significantly.

TABLE 8

Rule violations for truck events grouped by ten method

| Sensor | Period | Rule 1 | Rule 2 | Rule 3 | Rule 4 | Rule 5 | Rule 6 | Total |
|---|---|---|---|---|---|---|---|---|
| B-NG-BF-H | Training | 1 | 1 | 21 | 18 | 4 | | 45 |
| | Testing | | | 12 | 10 | 3 | | 25 |
| | Evaluation 1 | | | 9 | 3 | 2 | | 14 |
| | Evaluation 2 | | 2 | 6 | 1 | | | 9 |
| | Evaluation 3 | | | 6 | 6 | | | 12 |
| | Evaluation 4 | | | 6 | 13 | | | 19 |
| | Total | 1 | 3 | 60 | 51 | 9 | 0 | 124 |
| | Rate (%) | 0.2 | 0.5 | 10.5 | 9.0 | 1.5 | 0 | 3.61 |
| B-SO-BF-H | Training | | 6 | 36 | 7 | 4 | | 53 |
| | Testing | | 3 | 22 | 5 | 11 | | 41 |
| | Evaluation 1 | 1 | 2 | 12 | 6 | 2 | | 23 |

TABLE 8-continued

Rule violations for truck events grouped by ten method

| Sensor | Period | Rule 1 | Rule 2 | Rule 3 | Rule 4 | Rule 5 | Rule 6 | Total |
|---|---|---|---|---|---|---|---|---|
| | Evaluation 2 | | 6 | 17 | 3 | 3 | | 29 |
| | Evaluation 3 | | 2 | 14 | | 3 | | 19 |
| | Evaluation 4 | | | 9 | | | | 9 |
| | Total | 1 | 19 | 110 | 21 | 23 | 0 | 174 |
| | Rate (%) | 0.2 | 3.3 | 19.2 | 3.7 | 4.0 | 0 | 5.07 |
| C-SG-BF-H | Training | 1 | 9 | 19 | 22 | 4 | | 55 |
| | Testing | 1 | 6 | 21 | 5 | 3 | | 36 |
| | Evaluation 1 | 1 | 2 | 12 | 6 | 3 | | 24 |
| | Evaluation 2 | 2 | 4 | 13 | 3 | 1 | | 23 |
| | Evaluation 3 | | 2 | 12 | 7 | 1 | | 22 |
| | Evaluation 4 | 1 | 4 | 13 | 22 | 2 | | 42 |
| | Total | 6 | 27 | 90 | 65 | 14 | 0 | 202 |
| | Rate (%) | 1.0 | 4.7 | 15.7 | 11.4 | 2.5 | 0 | 5.89 |
| C-SG-CB(5)-V | Training | | 6 | 29 | 12 | 6 | | 53 |
| | Testing | | 2 | 17 | 5 | | | 24 |
| | Evaluation 1 | 1 | | 6 | 6 | | | 13 |
| | Evaluation 2 | | | 14 | 6 | 3 | | 23 |
| | Evaluation 3 | | 4 | 10 | | | | 14 |
| | Evaluation 4 | 4 | 23 | 53 | 51 | 3 | | 134 |
| | Total | 5 | 35 | 129 | 80 | 12 | 0 | 261 |
| | Rate (%) | 0.9 | 6.1 | 22.5 | 14.0 | 2.1 | 0 | 7.60 |
| C-SG-CB(4)-V | Training | 4 | 6 | 9 | 16 | 4 | | 39 |
| | Testing | | 2 | 34 | 10 | 1 | | 47 |
| | Evaluation 1 | 3 | 2 | 9 | 2 | | | 16 |
| | Evaluation 2 | 4 | 10 | 10 | 2 | 2 | | 28 |
| | Evaluation 3 | | | 2 | | | | 2 |
| | Evaluation 4 | | | 1 | 17 | | | 18 |
| | Total | 11 | 20 | 65 | 47 | 7 | 0 | 150 |
| | Rate (%) | 1.9 | 3.5 | 11.3 | 8.3 | 1.2 | 0 | 4.37 |
| C-NG-BF-H | Training | | 6 | 29 | 31 | 7 | 3 | 76 |
| | Testing | | 4 | 14 | 4 | 1 | | 23 |
| | Evaluation 1 | | 3 | 8 | 4 | 2 | | 17 |
| | Evaluation 2 | | 2 | 10 | 5 | | | 17 |
| | Evaluation 3 | | | 9 | 1 | | | 10 |
| | Evaluation 4 | | | 1 | 9 | | | 10 |
| | Total | 0 | 15 | 71 | 54 | 10 | 3 | 153 |
| | Rate (%) | 0 | 2.6 | 12.4 | 9.8 | 1.8 | 0.5 | 4.46 |
| Sensor 1 on | Training | | 11 | 35 | 48 | 5 | | 99 |
| sacrificial | Testing | 2 | 20 | 41 | 31 | 7 | | 101 |
| specimen | Evaluation 1 | | 3 | 11 | 2 | 2 | | 18 |
| | Evaluation 2 | 7 | 39 | 56 | 55 | 1 | | 158 |
| | Evaluation 3 | | | | 10 | | | 10 |
| | Evaluation 4 | | | 3 | 29 | | | 32 |
| | Total | 9 | 73 | 146 | 175 | 15 | 0 | 418 |
| | Rate (%) | 1.6 | 12.7 | 25.5 | 30.7 | 2.6 | 0 | 12.18 |
| Sensor 4 on | Training | | 10 | 30 | 67 | 5 | | 112 |
| sacrificial | Testing | | 2 | 33 | 33 | 7 | | 75 |
| specimen | Evaluation 1 | | | 9 | 2 | 1 | | 12 |
| | Evaluation 2 | 62 | 60 | 58 | 55 | 2 | | 237 |
| | Evaluation 3 | 55 | 53 | 51 | 48 | | | 207 |
| | Evaluation 4 | 2 | 72 | 91 | 88 | | | 253 |
| | Total | 119 | 197 | 272 | 293 | 15 | 0 | 896 |
| | Rate (%) | 20.6 | 34.3 | 47.5 | 51.4 | 2.6 | 0 | 26.1 |

Tables 9 and 10 summarize the number of false indications for sensors on the bridge (non-damaged) and the number of false and true indications for sensors on the specimen (near damage). The true-indication rate appears similar to the one-truck event method.

TABLE 9

Number of false indications for sensors on bridge (non-damaged) for truck events grouped by ten method

| Sensor with no damage | False indications (Training, Testing, Evaluation 1, 2, 3, and 4) | False indication rate (%) |
| --- | --- | --- |
| B-NG-BF-H | 124 | 3.6 |
| B-SG-BF-H | 174 | 5.1 |
| C-SG-BF-H | 202 | 5.9 |
| C-SG-CB(5)-V | 261 | 7.9 |
| C-SG-CB(4)-V | 150 | 4.4 |
| C-NG-BF-H | 153 | 4.5 |

TABLE 10

Number of false and true indications for sensors on sacrificial specimen (near damage) for truck events grouped by ten method

| Sensor near damage | False indications (Training, Testing, Evaluation 1) | False indication rate (%) | True indications (Evaluation 2, 3, and 4) | True indication rate (%) |
| --- | --- | --- | --- | --- |
| Sensor 1 | 218 | 10.4 | 200 | 16.1 |
| Sensor 4 | 199 | 9.2 | 697 | 56.1 |

Cross Prediction Control Chart Method

Methodology

Figure 18:
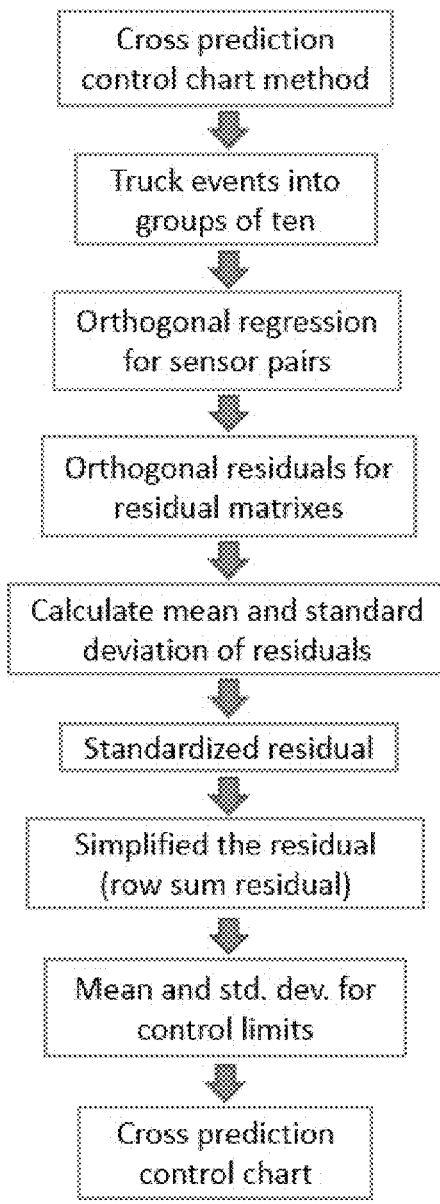
FIG. 18 is a pictorial representation of a cross prediction control chart in accordance with an illustrative embodiment.
Figure 19A:
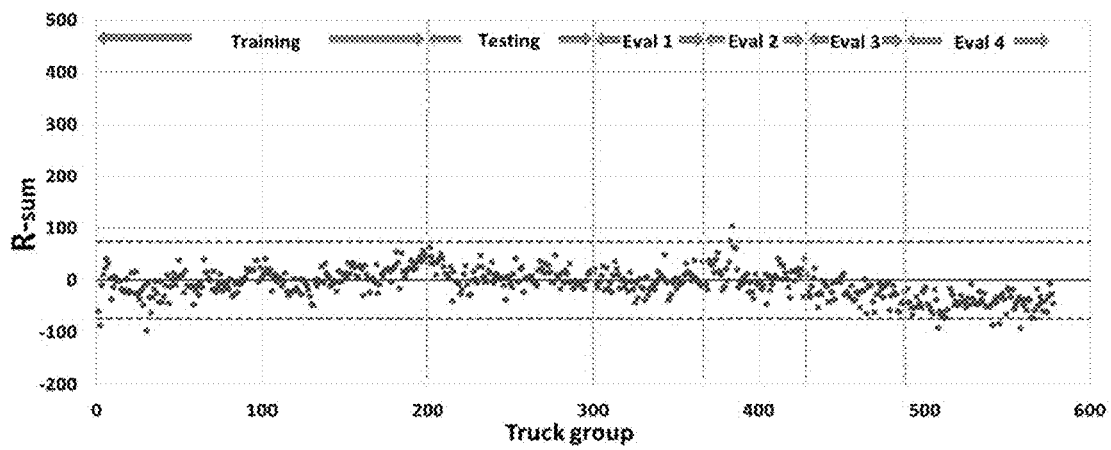
FIGS. 19A-H are pictorial representations of additional cross prediction control charts in accordance with an illustrative embodiment.
Figure 19B:
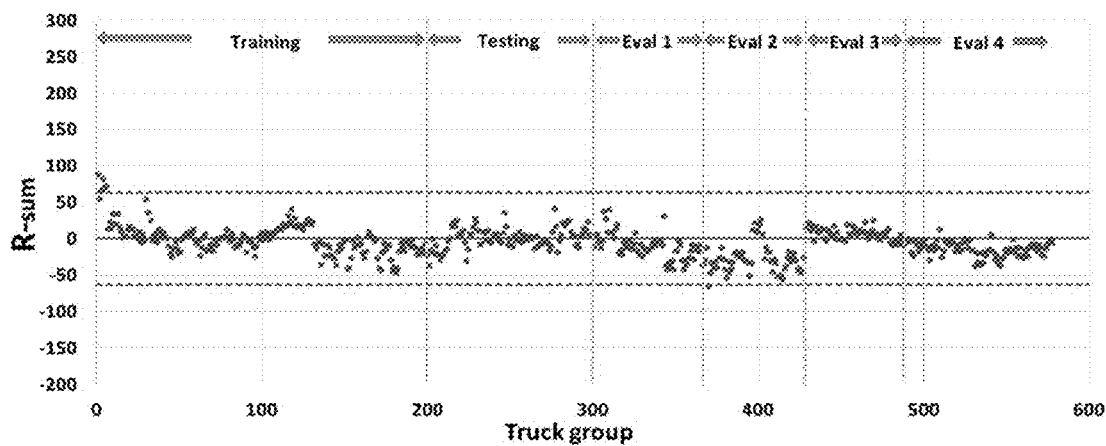
Figure 19C:
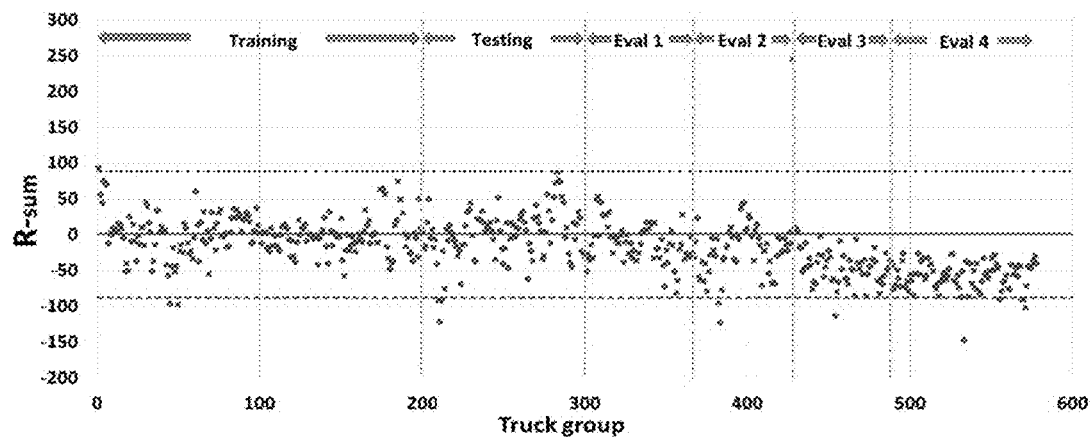
Figure 19D:
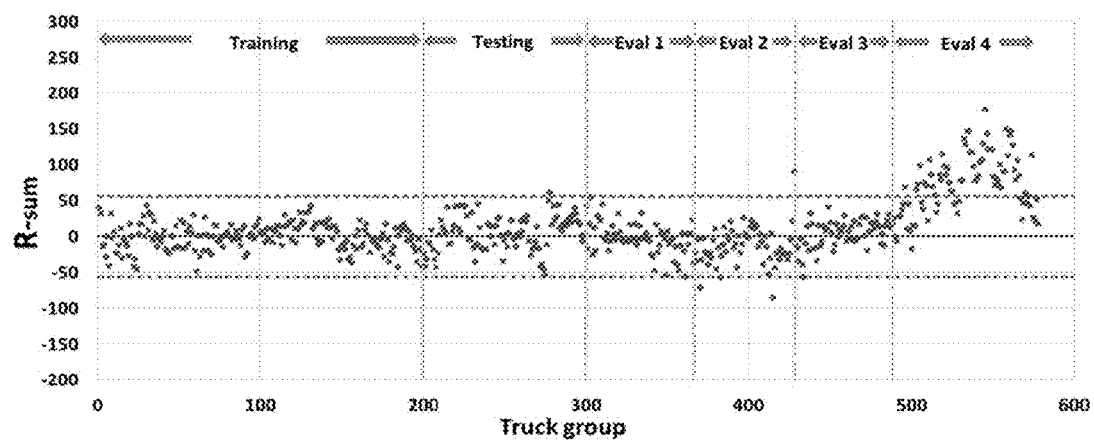
Figure 19E:
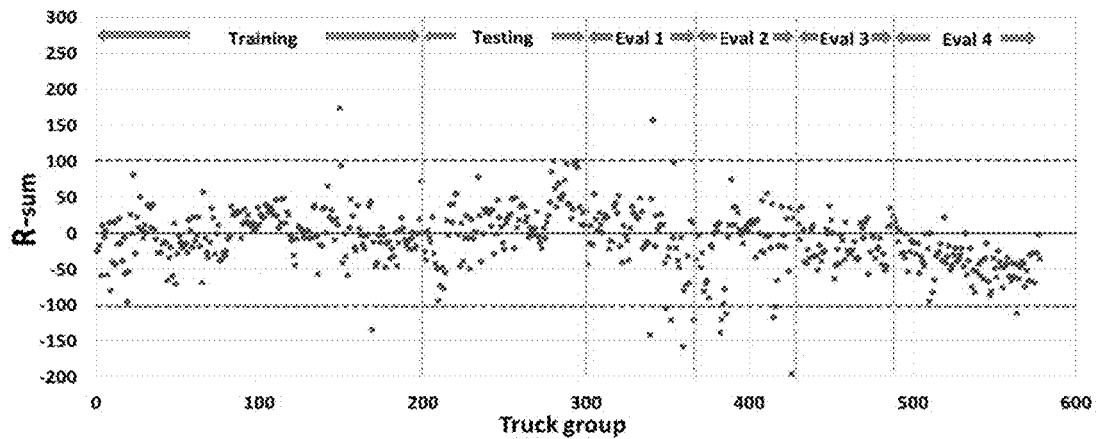
Figure 19F:
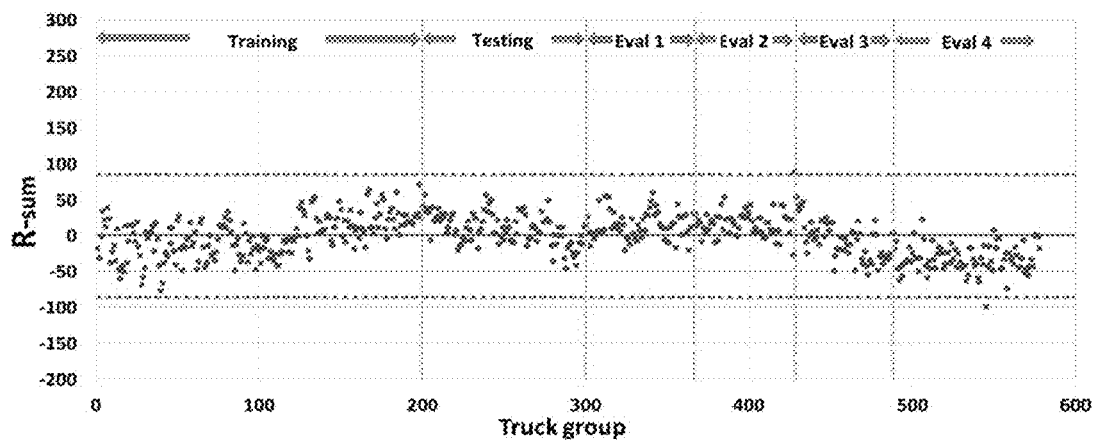
Figure 19G:
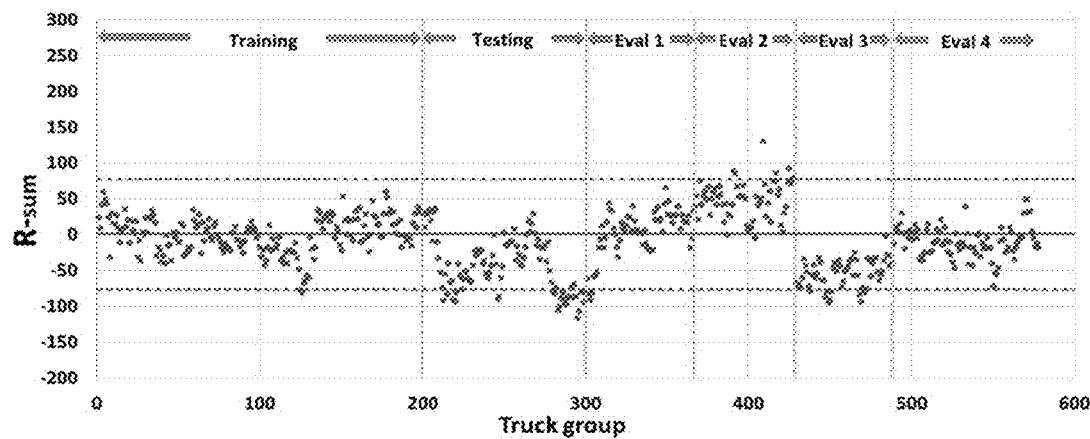
Figure 19H:
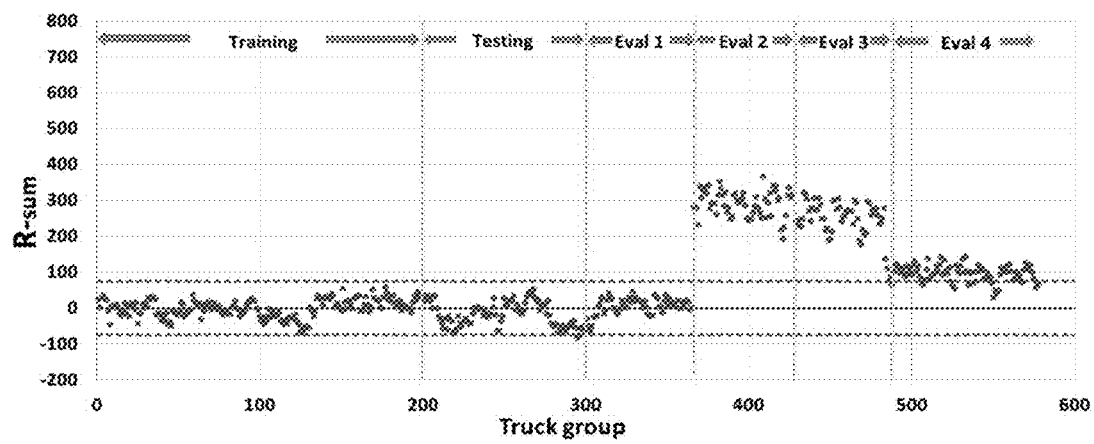

Fundamentally, the cross prediction method presented here is an adaptation of the method described above. The primary differences in the methodology are the use of orthogonal regression and the simplification approach. Like the method presented above, truck events are grouped into a group size of 10. A general flow chart for the method is shown in FIG. 18.

During training, orthogonal regression as described above may be performed for every combination of sensor pairs, $\varepsilon_i$ and $\varepsilon_j$, where i and j range from 1 to q (number of sensors). Because orthogonal regression is used, the relationship between $\varepsilon_i$ and $\varepsilon_j$ is the inverse of the relationship between $\varepsilon_j$ and $\varepsilon_i$. Orthogonal residuals may then be calculated as previously discussed and assembled into residual matrixes (q by q) for each truck group with p (number of groups) of these matrices.

$$[r_g] = \begin{bmatrix} r_{11} & \cdots & r_{1q} \\ \vdots & r_{ij} & \vdots \\ r_{q1} & \cdots & r_{qq} \end{bmatrix} \quad (16)$$

Standardizing the residuals are helpful to normalize the residual values that vary over a large range of values. The process for standardizing the residual for all sensor pairs for each truck group is given in Equations 17 and 18:

$$z_{ij} = \frac{r_{ij} - \bar{r}_{ij}}{s_{ij}} \quad (17)$$

$$[\bar{r}] = \begin{bmatrix} \bar{r}_{11} & \cdots & \bar{r}_{1q} \\ \vdots & \bar{r}_{ij} & \vdots \\ \bar{r}_{q1} & \cdots & \bar{r}_{qq} \end{bmatrix} \quad [s] = \begin{bmatrix} s_{11} & \cdots & s_{1q} \\ \vdots & s_{ij} & \vdots \\ s_{q1} & \cdots & s_{qq} \end{bmatrix} \quad (18)$$

where $\bar{r}_{ij}$ is the average of $r_{ij}$ for all the groups and $s_{ij}$ is the standard deviation. This process results in another set of q by q standardized-residual matrices and there are p of these, with one for each group.

$$[z_g] = \begin{bmatrix} z_{11} & \cdots & z_{1q} \\ \vdots & z_{ij} & \vdots \\ z_{q1} & \cdots & z_{qq} \end{bmatrix} \quad (19)$$

To further simply the standardized-residual data to a single control chart for each sensor, the standardized residual matrix $[Z_g]$ is reduced to a set of p simplified residual vectors $[R]$ by summing each row.

$$R_i = \text{row } sum_i = \sum_{j=1}^{q} z_{ij} \quad (20)$$

$$[R] = \begin{bmatrix} R_1 \\ \vdots \\ R_i \\ \vdots \\ R_q \end{bmatrix} \quad (21)$$

The mean and standard deviation of the [R] residuals for all training truck groups are calculated and then used to set control limits.

$$[\bar{R}] = \begin{bmatrix} \bar{R}_1 \\ \vdots \\ \bar{R}_i \\ \vdots \\ \bar{R}_q \end{bmatrix} \quad [S] = \begin{bmatrix} S_1 \\ \vdots \\ S_i \\ \vdots \\ S_q \end{bmatrix} \quad (22)$$

For each group of 10 truck events occurring during subsequent monitoring, an orthogonal residual matrix is obtained by using the orthogonal regression from the training period (Equation 16). The mean and standard deviation of the standardized residual (Equation 17) from the training period are again used to calculate the standardized residuals (Equation 19) and, after the residual-simplification process, a point $R_i$ for this group is plotted on each control chart.

Select Results

With the cross prediction method, the average of the standardized residuals are always equal to zero due to the standardization process. As was mentioned previously, the standard deviations are used to establish control limits that are applied to the various rules. Table 11 shows the mean and standard deviations of select sensors. As can be seen in Table 11, there is a fair amount of consistency in the standard deviations indicating that the standardization process was effective at reducing large ranges of residual values.

TABLE 11

Mean and standard deviations of selected sensors ($\mu\varepsilon$) for cross prediction method

| Sensor name | Mean | Standard deviation |
|---|---|---|
| B-NG-BF-H | 0 | 25 |
| B-SG-BF-H | 0 | 21 |
| C-SG-BF-H | 0 | 29 |
| C-SG-CB(5)-V | 0 | 19 |
| C-SG-CB(4)-V | 0 | 34 |
| C-NG-BF-H | 0 | 28 |
| Sensor 1 on sacrificial specimen | 0 | 26 |
| Sensor 4 on sacrificial specimen | 0 | 25 |

In FIGS. 19A-H, R-sum values for global response sensors on the bridge (non-damaged) follow Rule 1 well, as data points are generally within the plus/minus three standard deviation limits. However, there are a large number of false indications (Rule 1) for sensors placed in the web cut-back region of the bridge (Sensors C-SG-CB(5)-V and C-SG-CB(4)-V). In FIGS. 19A-H, for example, it would be inferred that there is damage because the R-sum values exceed the limits for Rule 1 in the Evaluation 2, 3, and 4 regions.

The number of rule violations and rate with respect to all rules were determined and are shown in Table 12. A large number of rule violations are found for Rule 3 or Rule 4 as was the case with the strain range methods.

TABLE 12

Rule violations for cross prediction method

| Sensor | Period | Rule 1 | Rule 2 | Rule 3 | Rule 4 | Rule 5 | Rule 6 | Total |
|---|---|---|---|---|---|---|---|---|
| B-NG-BF-H | Training | 2 | 3 | 14 | 31 | 2 | | 52 |
| | Testing | | | 8 | 11 | 1 | | 20 |
| | Evaluation 1 | | | 2 | | | | 2 |
| | Evaluation 2 | 2 | 4 | 5 | 3 | | | 14 |
| | Evaluation 3 | | | 4 | 22 | | | 26 |
| | Evaluation 4 | 4 | 24 | 70 | 88 | | | 186 |
| | Total | 8 | 31 | 103 | 155 | 3 | 0 | 300 |
| | Rate (%) | 1.4 | 5.4 | 18.0 | 27.2 | 0.5 | 0.0 | 8.7 |
| B-SG-BF-H | Training | 5 | 6 | 21 | 87 | 5 | | 124 |
| | Testing | | | 5 | 13 | 5 | | 23 |
| | Evaluation 1 | | | 10 | 29 | | | 39 |
| | Evaluation 2 | 1 | 10 | 36 | 42 | | | 89 |
| | Evaluation 3 | | | | 6 | | | 6 |
| | Evaluation 4 | | | 7 | 69 | | | 76 |
| | Total | 6 | 16 | 79 | 246 | 10 | 0 | 357 |
| | Rate (%) | 1.0 | 2.8 | 13.8 | 43.2 | 1.8 | 0.0 | 10.4 |
| C-SG-BF-H | Training | 3 | 6 | 22 | 13 | 2 | | 46 |
| | Testing | 3 | 8 | 11 | 6 | 4 | | 32 |
| | Evaluation 1 | | 2 | 3 | 6 | 2 | | 13 |
| | Evaluation 2 | 3 | 10 | 20 | 24 | 3 | | 60 |
| | Evaluation 3 | 1 | 14 | 37 | 45 | 1 | | 98 |
| | Evaluation 4 | 5 | 41 | 85 | 88 | | | 219 |
| | Total | 15 | 81 | 178 | 182 | 12 | 0 | 468 |
| | Rate (%) | 2.6 | 14.1 | 31.1 | 31.9 | 21 | 0.0 | 13.6 |
| C-SG-CB(5)-V | Training | | 1 | 12 | 11 | | | 24 |
| | Testing | 1 | 12 | 19 | 17 | 2 | | 51 |
| | Evaluation 1 | | 2 | 4 | 1 | 1 | | 8 |
| | Evaluation 2 | 4 | 3 | 17 | 11 | | | 35 |
| | Evaluation 3 | 1 | 2 | | | | | 3 |
| | Evaluation 4 | 59 | 76 | 77 | 72 | 2 | | 286 |
| | Total | 65 | 96 | 129 | 112 | 5 | 0 | 407 |
| | Rate (%) | 11.3 | 16.7 | 22.5 | 19.7 | 0.9 | 0.0 | 11.9 |
| C-SG-CB(4)-V | Training | 2 | 2 | 5 | 27 | 1 | | 37 |
| | Testing | | 10 | 25 | 20 | 2 | | 57 |
| | Evaluation 1 | 5 | 4 | 2 | 5 | | | 16 |
| | Evaluation 2 | 8 | 10 | 12 | 5 | 1 | | 36 |
| | Evaluation 3 | | | 2 | 5 | | | 7 |
| | Evaluation 4 | 1 | 4 | 34 | 55 | 1 | | 95 |
| | Total | 16 | 30 | 80 | 117 | 5 | 0 | 248 |
| | Rate (%) | 2.8 | 5.2 | 14.0 | 20.5 | 0.9 | 0.00 | 7.2 |
| C-NG-BF-H | Training | | 6 | 16 | 41 | 1 | | 64 |
| | Testing | | | 11 | 18 | 1 | | 30 |
| | Evaluation 1 | | | 9 | 16 | 1 | | 26 |
| | Evaluation 2 | 1 | | | 12 | 1 | | 14 |
| | Evaluation 3 | | | 7 | 4 | | | 11 |
| | Evaluation 4 | 1 | 2 | 37 | 58 | | | 98 |
| | Total | 2 | 8 | 80 | 149 | 4 | 0 | 243 |
| | Rate (%) | 0.4 | 1.4 | 14.0 | 26.1 | 0.7 | 0.0 | 7.08 |

TABLE 12-continued

Rule violations for cross prediction method

| Sensor | Period | Rule 1 | Rule 2 | Rule 3 | Rule 4 | Rule 5 | Rule 6 | Total |
|---|---|---|---|---|---|---|---|---|
| Sensor 1 on sacrificial specimen | Training | 2 | 6 | 21 | 32 | 1 | 1 | 63 |
| | Testing | 25 | 47 | 59 | 58 | 1 | | 190 |
| | Evaluation 1 | 3 | 6 | 15 | 23 | 5 | | 52 |
| | Evaluation 2 | 7 | 30 | 42 | 39 | | | 118 |
| | Evaluation 3 | 9 | 31 | 50 | 48 | 2 | | 140 |
| | Evaluation 4 | | 3 | 16 | 6 | | | 25 |
| | Total | 46 | 123 | 203 | 206 | 9 | 1 | 588 |
| | Rate (%) | 8.0 | 21.4 | 35.4 | 36.1 | 1.6 | 0.2 | 17.1 |
| Sensor 4 on sacrificial specimen | Training | | 6 | 31 | 47 | 6 | 1 | 91 |
| | Testing | 2 | 23 | 43 | 35 | 2 | | 105 |
| | Evaluation 1 | | 3 | 5 | 12 | 2 | | 22 |
| | Evaluation 2 | 63 | 61 | 59 | 55 | 1 | | 239 |
| | Evaluation 3 | 55 | 53 | 51 | 48 | | | 207 |
| | Evaluation 4 | 79 | 89 | 91 | 88 | | | 347 |
| | Total | 199 | 235 | 280 | 285 | 11 | 1 | 1011 |
| | Rate (%) | 34.4 | 40.9 | 48.9 | 50.0 | 1.9 | 0.2 | 29.5 |

Tables 13 and 14 show the number of false indications for sensors on the bridge (non-damaged) and on the sacrificial specimen (near damage), respectively. It was also found that the cross prediction method had a higher true-indication rate than either of the strain range methods.

TABLE 13

Number of false indications for sensors on bridge (non-damaged) for cross prediction method

| Sensor with no damage | False indications (Training, Testing, Evaluation 1, 2, 3, and 4) | False indication rate (%) |
|---|---|---|
| B-NG-BF-H | 300 | 8.7 |
| B-SG-BF-H | 357 | 10.4 |
| C-SG-BF-H | 468 | 13.6 |
| C-SG-CB(5)-V | 407 | 11.9 |
| C-SG-CB(4)-V | 248 | 7.2 |
| C-NG-BF-H | 243 | 7.1 |

TABLE 14

Number of false and true indications for sensors on sacrificial specimen (near damage) for cross prediction method

| Sensor near damage | False indications (Training, Testing, Evaluation 1) | False indication rate (%) | True indications (Evaluation 2, 3, and 4) | True indication rate (%) |
|---|---|---|---|---|
| Sensor 1 | 305 | 14.2 | 283 | 22.8 |
| Sensor 4 | 218 | 10.1 | 793 | 63.9 |

F-Test Control Chart Method $F_{shm}$ Method

Figure 20:
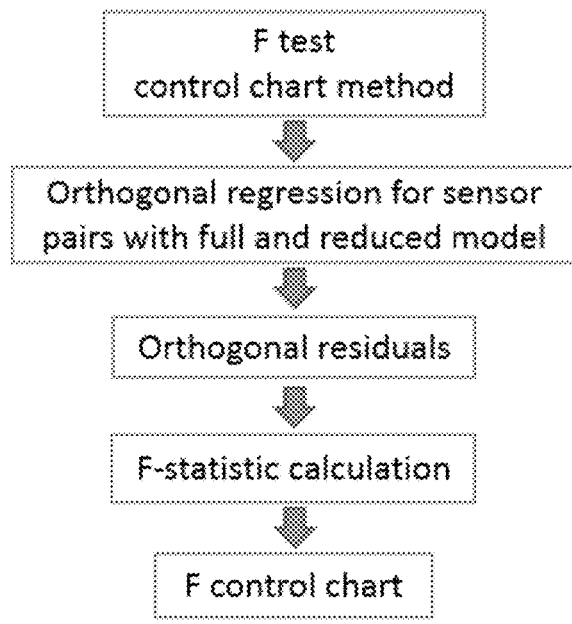
FIG. 20 is a pictorial representation of a flow chart for an $F_{shm}$ method in accordance with an illustrative embodiment.
Figure 21A:
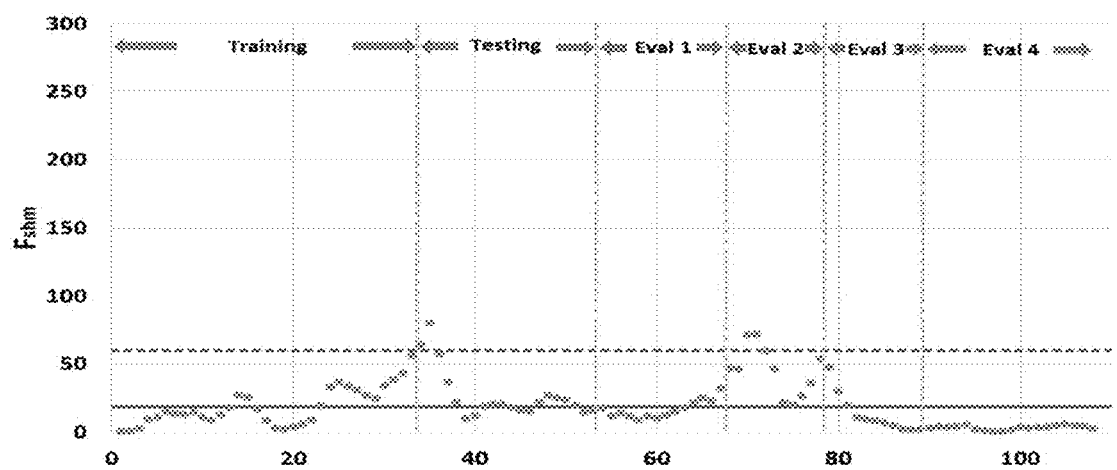
FIGS. 21A-L are pictorial representations of an $F_{shm}$ control chart in accordance with an illustrative embodiment.
Figure 21B:
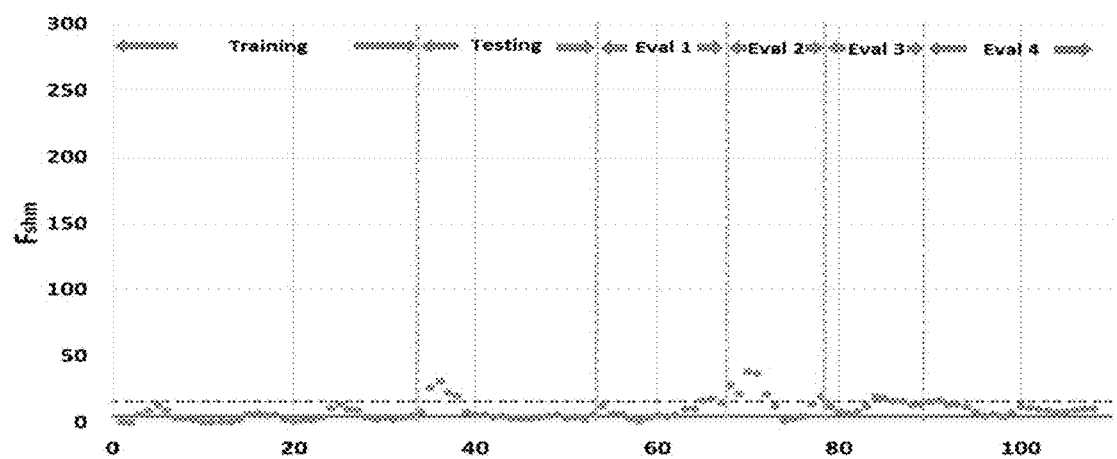
Figure 21C:
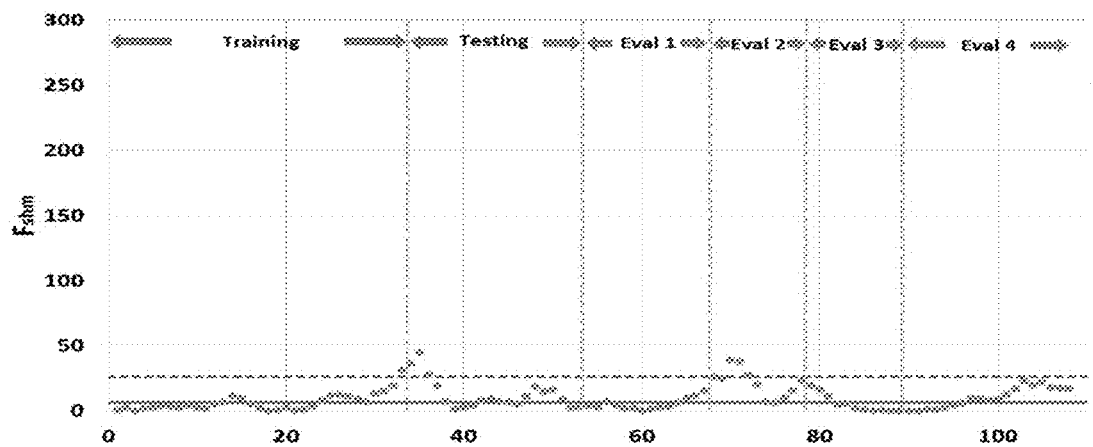
Figure 21D:
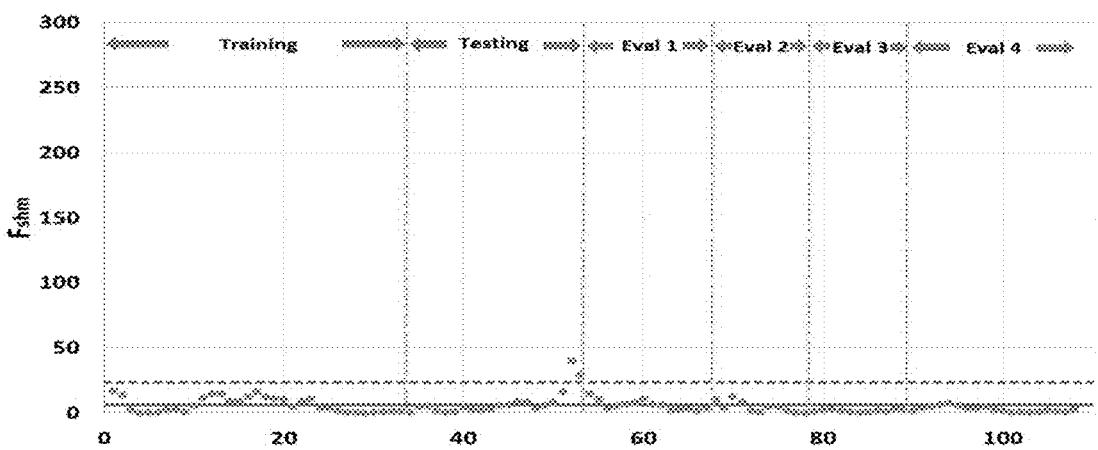
Figure 21E:
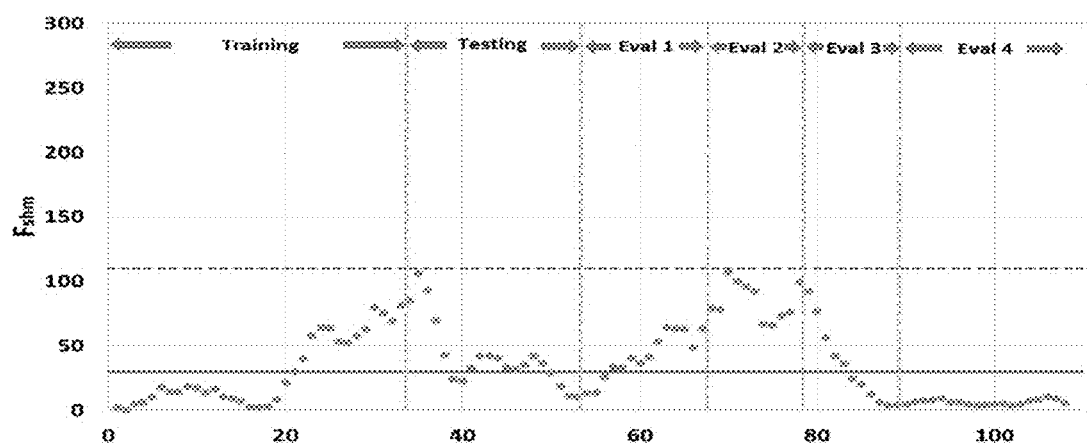
Figure 21F:
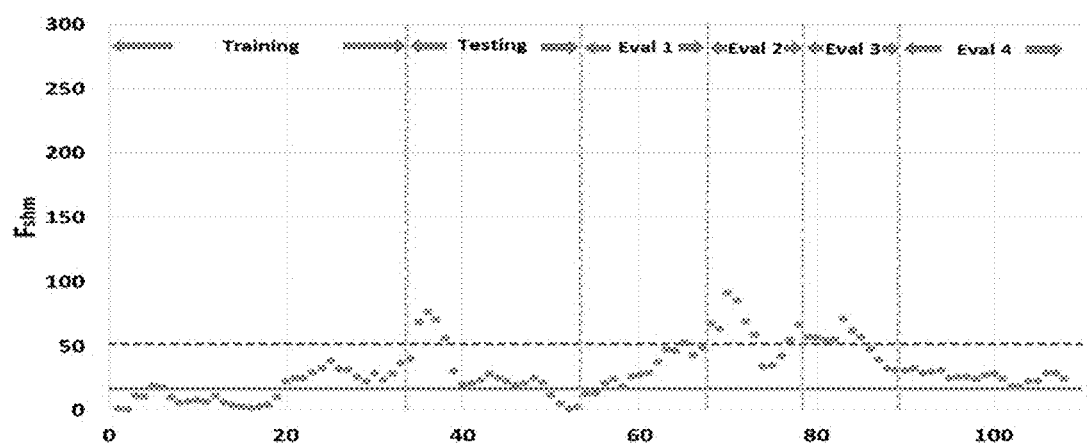
Figure 21G:
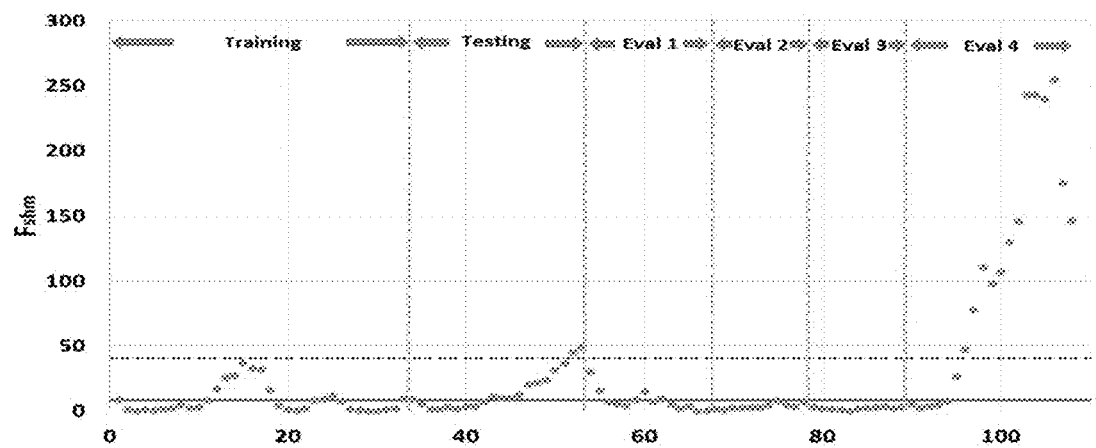
Figure 21H:
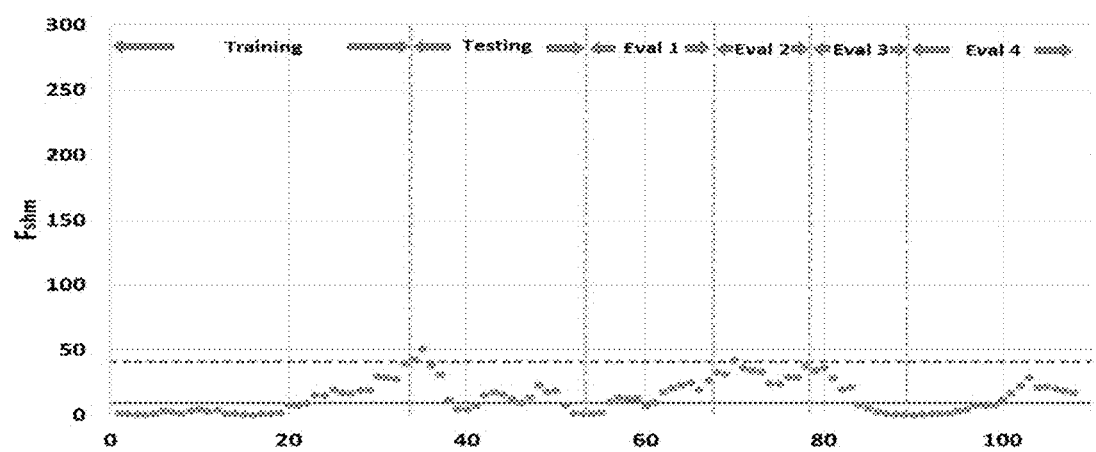
Figure 21I:
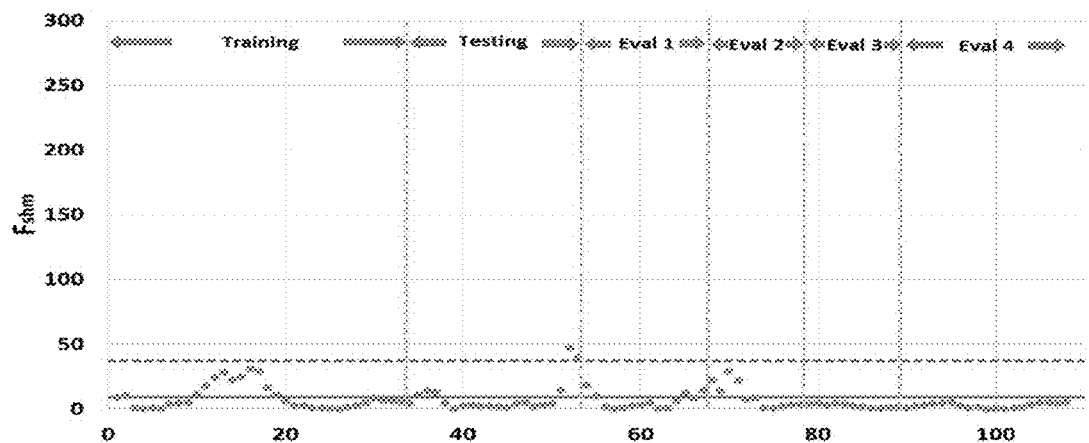
Figure 21J:
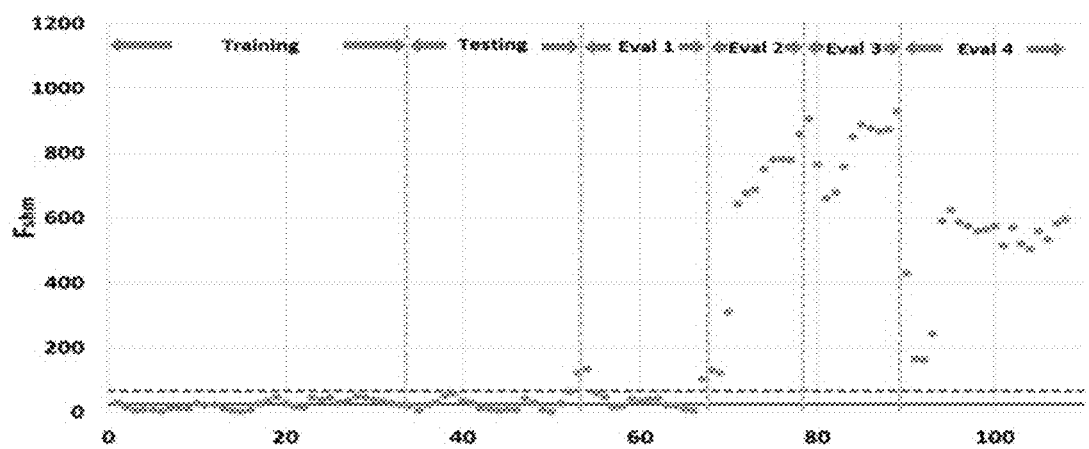
Figure 21K:
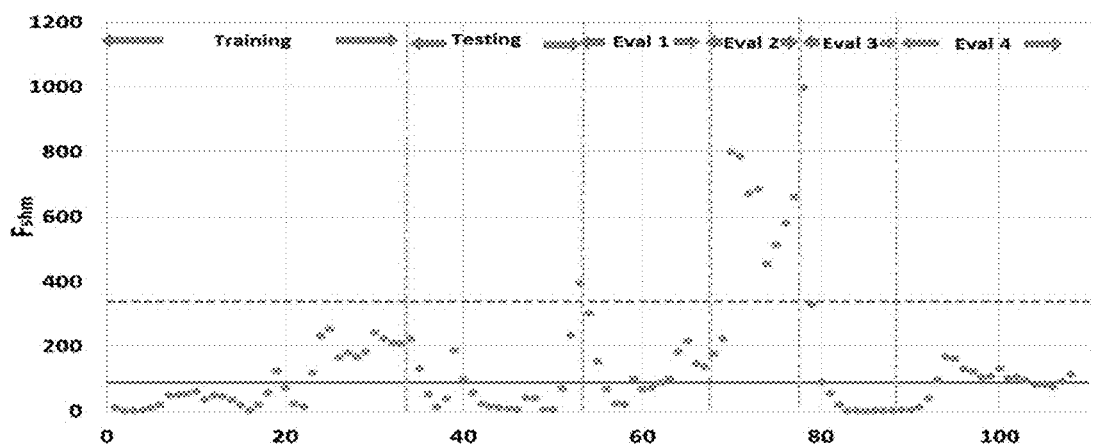
Figure 21L:
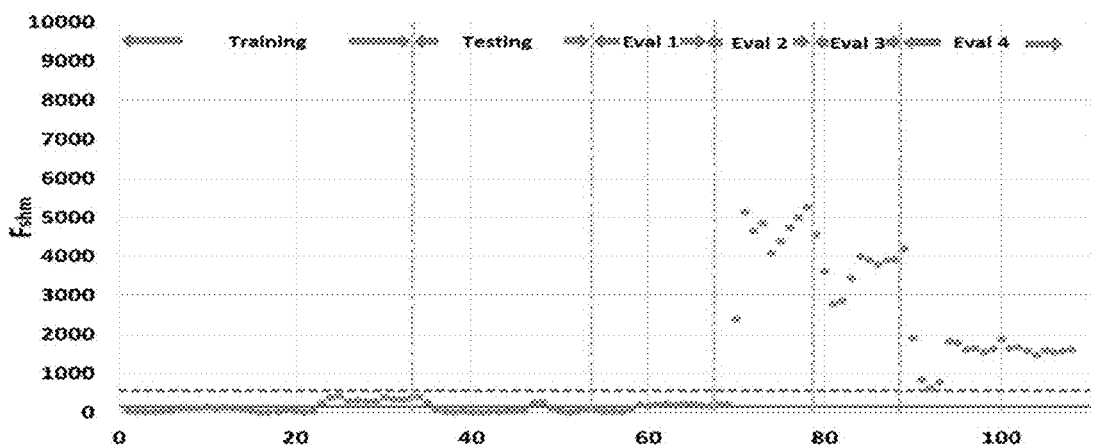

A statistical test known as the F-test is described above. Here, a damage detection approach known as the $F_{shm}$ method is presented in FIG. 20 and discussed. The $F_{shm}$ method is loosely based on F-test concepts. The primary difference between the F-test and $F_{shm}$ method is that the F-test may require that traditional linear regression be used. The $F_{shm}$ approach utilizes the more appropriate orthogonal regression described previously. The F-test has been further expanded by the $F_{shm}$ approach to include control chart concepts such that condition can be tracked with time.

$$Fshm = \frac{SSRreduced - SSRfull}{dfreduced - dffull} \div \frac{SSRfull}{dffull} \quad (23)$$

In constructing an $F_{shm}$ control chart, the first 200 truck events recorded during training are designated as the baseline data. These data are the point of comparison for all subsequent evaluation.

For trucks from 201 through 2,000, groups of 200 trucks (with 150 trucks overlapping between groups) are compared against the baseline data using the $F_{shm}$ equation. This ensures that all $F_{shm}$ values have the same sample size (200 are from the baseline data and another 200 are for comparison). Collectively, this series of $F_{shm}$ values may then be used to establish the mean and standard deviations for all such evaluations made during the training period (up through truck number 2,000). The means and standard deviations may then be used to establish the control chart limits by which the various tests may be evaluated.

With this approach, the data may be evaluated via sensor pairings. However, unlike the cross prediction method, no simplification is made and, therefore, $(n^2-n)/2$ evaluations are made. This results in a very large number of evaluations being made after each successive passage of 50 trucks.

Select Results

For the $F_{shm}$ approach, 12 sensor pairs were selected and the mean and standard deviation from the training period were calculated (listed in Table 15) as described in the previous section. As expected, high $F_{shm}$ values resulted for sensor pairs that included a sensor on the sacrificial specimen during the Evaluation 2, 3, and 4 periods indicating that damage was readily detected.

TABLE 15

Mean and standard deviations of select sensors (µε) for $F_{shm}$ method

| Sensor pairs | Mean | Standard deviation |
|---|---|---|
| B-NG-BF-H vs. B-SG-BF-H | 18 | 13 |
| B-NG-BF-H vs. C-SG-BF-H | 4 | 3 |
| B-NG-BF-H vs. C-SG-CB(5)-V | 6 | 6 |
| B-NG-BF-H vs. C-SG-CB(4)-V | 6 | 6 |

TABLE 15-continued

Mean and standard deviations of select sensors (µε) for $F_{shm}$ method

| Sensor pairs | Mean | Standard deviation |
|---|---|---|
| B-SG-BF-H vs. C-NG-BF-H | 30 | 27 |
| C-SG-BF-H vs. C-NG-BF-H | 17 | 12 |
| C-SG-CB(5)-V vs. C-SG-CB(4)-V | 8 | 11 |
| C-SG-CS(5)-V vs. C-NG-BF-H | 9 | 11 |
| C-SG-CB(4)-V vs. C-NG-BF-H | 9 | 9 |
| B-NG-BF-H vs. Sensor 4 | 23 | 14 |
| B-SG-BF-H vs. Sensor 1 | 89 | 84 |
| B-SG-BF-H vs. Sensor 4 | 149 | 136 |

As Table 16 shows, no rule violations were found for Rules 6 or 3 and Rule 4 had many rule violations as was observed for the other methodologies.

TABLE 16

Rule violations for $F_{shm}$ control chart

| Sensor pairs | Period | Rule 1 | Rule 2 | Rule 3 | Rule 4 | Rule 5 | Rule 6 | Total |
|---|---|---|---|---|---|---|---|---|
| B-NG-BF-H vs. B-SG-BF-H | Training | | 2 | 9 | 14 | 4 | | 29 |
| | Testing | 2 | 2 | 1 | 5 | 2 | | 12 |
| | Evaluation 1 | | 1 | 1 | 5 | 1 | | 8 |
| | Evaluation 2 | 2 | 7 | 3 | 8 | | | 20 |
| | Evaluation 3 | | | 4 | 4 | 6 | | 14 |
| | Evaluation 4 | | | | 11 | 19 | | 30 |
| | Total | 4 | 12 | 29 | 55 | 13 | 0 | 113 |
| | Rate (%) | 3.7 | 11.4 | 28.2 | 55.0 | 12.8 | 0.0 | 18.5 |
| B-NG-BF-H vs. C-SG-BF-H | Training | | | 3 | 1 | 2 | | 6 |
| | Testing | 4 | 4 | 2 | 2 | 2 | | 14 |
| | Evaluation 1 | 2 | 4 | 6 | 1 | 1 | | 14 |
| | Evaluation 2 | 6 | 8 | 3 | 6 | | | 23 |
| | Evaluation 3 | 4 | 8 | 9 | 7 | | | 28 |
| | Evaluation 4 | 2 | 3 | 4 | 19 | | | 28 |
| | Total | 18 | 27 | 27 | 36 | 5 | 0 | 113 |
| | Rate (%) | 16.7 | 25.7 | 26.2 | 36.0 | 4.9 | 0.0 | 18.5 |
| B-NG-BF-H vs. C-SG-CB(5)-H | Training | 1 | 2 | 5 | 13 | 1 | | 22 |
| | Testing | 3 | 2 | 1 | 5 | 2 | | 13 |
| | Evaluation 1 | | 1 | 2 | 1 | 3 | | 7 |
| | Evaluation 2 | 3 | 7 | 5 | 3 | 2 | | 20 |
| | Evaluation 3 | | | | 1 | 2 | | 3 |
| | Evaluation 4 | | 1 | 4 | 12 | 2 | | 19 |
| | Total | 7 | 13 | 17 | 35 | 12 | 0 | 84 |
| | Rate (%) | 6.5 | 12.4 | 16.5 | 35.0 | 11.8 | 0.0 | 13.7 |
| B-NG-BF-H vs. C-SG-CB(4)-V | Training | | | 6 | 7 | 23 | | 36 |
| | Testing | 2 | 2 | 2 | 11 | 1 | | 18 |
| | Evaluation 1 | | | 1 | | | | 1 |
| | Evaluation 2 | | | | 11 | | | 11 |
| | Evaluation 3 | | | | | | | 0 |
| | Evaluation 4 | | | | 10 | | | 10 |
| | Total | 2 | 2 | 9 | 39 | 24 | 0 | 76 |
| | Rate (%) | 1.9 | 1.9 | 8.7 | 39.0 | 23.5 | 0.0 | 12.4 |
| B-SG-BF-H vs. C-NG-BF-H | Training | | 1 | 10 | 4 | | | 15 |
| | Testing | 2 | 1 | 7 | 2 | | | 12 |
| | Evaluation 1 | | | 5 | 4 | | | 9 |
| | Evaluation 2 | | 6 | 10 | 11 | 1 | | 28 |
| | Evaluation 3 | | | | 5 | 6 | | 11 |
| | Evaluation 4 | | | | 18 | 2 | | 20 |
| | Total | 2 | 8 | 32 | 44 | 9 | 0 | 95 |
| | Rate (%) | 1.9 | 7.6 | 31.1 | 44.0 | 8.8 | 0.0 | 15.52 |
| C-SG-BF-H vs. C-NG-BF-H | Training | | | 13 | 14 | 5 | | 32 |
| | Testing | 4 | 4 | 4 | 16 | 1 | | 29 |
| | Evaluation 1 | 1 | 6 | 8 | 5 | 2 | | 22 |
| | Evaluation 2 | 8 | 9 | 11 | 11 | | | 39 |
| | Evaluation 3 | 7 | 7 | 11 | 11 | 2 | | 38 |
| | Evaluation 4 | | | 3 | 19 | 1 | | 23 |
| | Total | 20 | 26 | 50 | 76 | 11 | 0 | 183 |
| | Rate (%) | 18.5 | 24.8 | 48.5 | 76.0 | 10.8 | 0.0 | 29.9 |

TABLE 16-continued

Rule violations for $F_{shm}$ control chart

| Sensor pairs | Period | Rule 1 | Rule 2 | Rule 3 | Rule 4 | Rule 5 | Rule 6 | Total |
|---|---|---|---|---|---|---|---|---|
| C-SG-CB(5)-V vs. C-SG-CB(4)-V | Training | | 3 | 3 | 3 | 4 | | 13 |
| | Testing | 1 | 5 | 6 | 5 | 4 | | 21 |
| | Evaluation 1 | | | | 2 | 1 | | 3 |
| | Evaluation 2 | | | | 9 | | | 9 |
| | Evaluation 3 | | | | 11 | 1 | | 12 |
| | Evaluation 4 | 13 | 12 | 11 | 12 | 3 | | 51 |
| | Total | 14 | 20 | 20 | 42 | 13 | 0 | 109 |
| | Rate (%) | 13.0 | 19.1 | 19.4 | 42.0 | 12.8 | 0.0 | 17.8 |
| C-SG-CB(5)-V vs. C-NG-BF-H | Training | | 2 | 5 | 23 | | | 30 |
| | Testing | 2 | 3 | 1 | 7 | 1 | | 14 |
| | Evaluation 1 | | 1 | 5 | | 1 | | 7 |
| | Evaluation 2 | 1 | 7 | 11 | 11 | 1 | | 31 |
| | Evaluation 3 | | 1 | 1 | 5 | 2 | | 9 |
| | Evaluation 4 | | | 3 | 11 | 5 | | 19 |
| | Total | 3 | 14 | 26 | 57 | 10 | 0 | 110 |
| | Rate (%) | 2.8 | 13.3 | 25.2 | 57.0 | 9.8 | 0.0 | 18.0 |
| C-SG-CB(4)-V vs. C-NG-BF-H | Training | | 2 | 4 | 10 | 5 | | 21 |
| | Testing | 2 | 2 | | 7 | | | 11 |
| | Evaluation 1 | | | | 2 | 1 | | 3 |
| | Evaluation 2 | | | | | | | 0 |
| | Evaluation 3 | | | | 11 | 1 | | 12 |
| | Evaluation 4 | | | | 19 | 2 | | 21 |
| | Total | 2 | 4 | 4 | 49 | 9 | 0 | 68 |
| | Rate (%) | 1.9 | 3.8 | 3.9 | 49.0 | 8.8 | 0.0 | 11.1 |
| B-NG-BF-H vs. Sensor 1 on sacrificial specimen | Training | | | 6 | 5 | 1 | | 12 |
| | Testing | 1 | 3 | 7 | | 3 | | 14 |
| | Evaluation 1 | 2 | 3 | 2 | | | | 7 |
| | Evaluation 2 | 11 | 11 | 11 | 5 | 3 | | 41 |
| | Evaluation 3 | 11 | 11 | 11 | 11 | | | 44 |
| | Evaluation 4 | 19 | 17 | 15 | 19 | | | 70 |
| | Total | 44 | 45 | 52 | 40 | 7 | 0 | 188 |
| | Rate (%) | 40.7 | 42.9 | 50.5 | 40.0 | 6.9 | 0.0 | 30.7 |
| B-SG-BF-H vs. Sensor 1 on sacrificial specimen | Training | | | 7 | 19 | 3 | | 29 |
| | Testing | 1 | 2 | 6 | | 3 | | 12 |
| | Evaluation 1 | | | 1 | | 2 | | 3 |
| | Evaluation 2 | 9 | 10 | 9 | 9 | | | 37 |
| | Evaluation 3 | | | 8 | 4 | 3 | | 15 |
| | Evaluation 4 | | | | 7 | | | 7 |
| | Total | 10 | 12 | 31 | 39 | 11 | 0 | 103 |
| | Rate (%) | 9.3 | 11.4 | 30.1 | 39.0 | 10.8 | 0.0 | 16.8 |
| B-SG-BF-H vs. Sensor 4 on sacrificial specimen | Training | | | 9 | 23 | 1 | | 33 |
| | Testing | | | 1 | 6 | 4 | | 11 |
| | Evaluation 1 | | | | 4 | | | 4 |
| | Evaluation 2 | 9 | 10 | 10 | 11 | | | 40 |
| | Evaluation 3 | 11 | 11 | 11 | 11 | | | 44 |
| | Evaluation 4 | 19 | 17 | 15 | 19 | | | 70 |
| | Total | 39 | 38 | 46 | 74 | 5 | 0 | 202 |
| | Rate (%) | 36.1 | 36.2 | 44.7 | 74.0 | 4.9 | 0.0 | 15.9 |

In FIGS. 21A-L, $F_{shm}$ values for global response sensors on the bridge (non-damaged) follow Rule 1 well, as data points are generally within the plus/minus three standard deviation limits. However, as with the cross prediction method, there are a large number of false indications (Rule 1) for sensors placed in the web cut-back region of the bridge (Sensors C-SG-CB(5)-V and C-SG-CB(4)-V).

The number of rule violations and rates with respect to all rules were determined and are shown in Table 16. A number of rule violations are found for Rule 3 or Rule 4, as was the case with the strain range methods and the cross prediction method.

Tables 17 and 18 show the number of false indications for sensors on the bridge (non-damaged) and on the sacrificial specimen (near damage), respectively. The $F_{shm}$ method had a higher true-indication rate than the strain range methods, as did the cross prediction method.

TABLE 17

Number of false indications for sensors on bridge (non-damaged) for $F_{shm}$ control chart

| Sensor pairs | False indications (Training, Testing, Evaluation 1, 2, 3, and 4) | False indication rate (%) |
|---|---|---|
| B-NG-BF-H vs. B-SG-BF-H | 113 | 18.5 |
| B-NG-BF-H vs. C-SG-BF-H | 113 | 18.5 |
| B-NG-BF-H vs. C-SG-CB(5)-V | 84 | 13.7 |
| B-NG-BF-H vs. C-SG-CB(4)-V | 76 | 12.4 |
| B-SG-BF-H vs. C-NG-BF-H | 95 | 15.5 |
| C-SG-BF-H vs. C-NG-BF-H | 183 | 29.9 |
| C-SG-CB(5)-V vs. C-SG-CB(4)-V | 109 | 17.8 |

TABLE 17-continued

Number of false indications for sensors on
bridge (non-damaged) for $F_{shm}$ control chart

| Sensor pairs | False indications (Training, Testing, Evaluation 1, 2, 3, and 4) | False indication rate (%) |
|---|---|---|
| C-SG-CB(5)-V vs. C-NG-BF-H | 110 | 18.0 |
| C-SG-CB(4)-V vs. C-NG-BF-H | 68 | 11.1 |

TABLE 18

Number of false indications for sensors on sacrificial
specimen (near damage) for $F_{shm}$ control chart

| Sensor pairs near damage | False indications (Training, Testing, Evaluation 1) | False indication rate (%) | True indications (Evaluation 2, 3, and 4) | True indication rate (%) |
|---|---|---|---|---|
| B-NG-BF-H vs. Sensor 4 | 33 | 9.0 | 155 | 73.8 |
| B-SG-BF-H vs. Sensor 1 | 44 | 12.0 | 59 | 28.1 |
| B-SG-BF-H vs. Sensor 4 | 48 | 13.1 | 154 | 73.3 |

Discussion

An aspect of the current disclosure develops a damage-detection methodology that minimizes the false-detection rate and maximizes the true damage-detection rate. Control chart Rule 1 seems to best characterize the damage-detection ability for all four methodologies. The other rules have generally high false-indication rates and add little to the true-detection rate.

Figure 22:
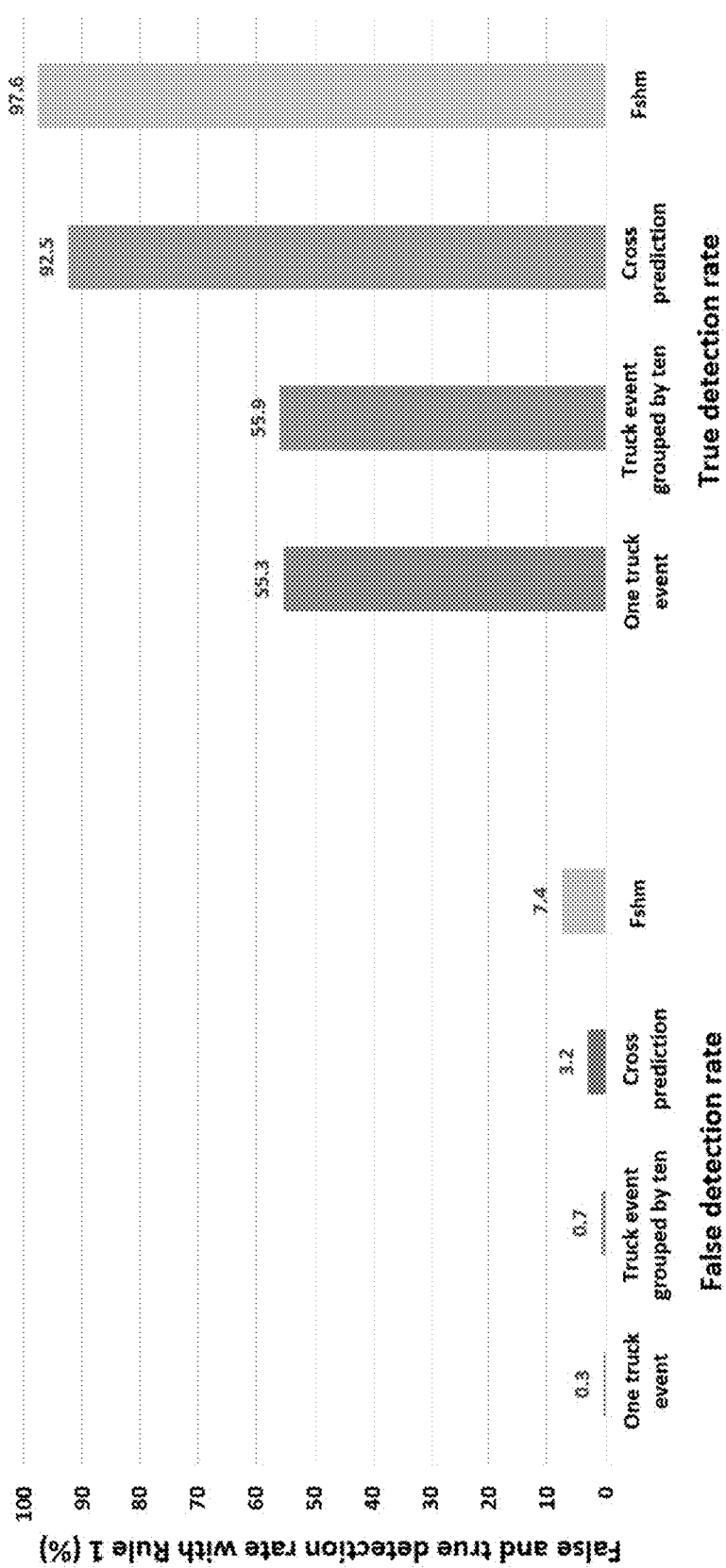
FIG. 22 is a pictorial representation of detection rates using one rule in accordance with an illustrative embodiment.

The proposed and developed four methodologies are shown to detect damage. FIG. 22 presents a comparison of the false- and true-detection rates. The false-indication rates are calculated for sensors placed on the bridge where no damage was presumed to have occurred and the true-detection rates are calculated from Sensor 4 near the crack in the sacrificial specimen.

The one-truck methodology, which is the simplest to apply and possibly the most intuitive, has the low false-indication rate but also the low true-detection rate. The truck events grouped by ten is similar. The two methods (cross prediction and Fshm) that pair sensors together with orthogonal regression straight-line fits yield significant improvements in the true-detection rate, but show an increase in the false-indication rate.

The present invention is not to be limited to the particular embodiments described herein. In particular, the present invention contemplates numerous variations in the type of ways in which embodiments of the invention may be applied to bridges of all types and other structures subjected to characterizable and transient loadings. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

REFERENCES

All the references as listed below are herein incorporated by reference in their entirety.
1. Wipf T J, Phares B M, Doornink J D. Monitoring the Structural Condition of Fracture-Critical Bridges Using Fiber Optic Technology. Ames, Iowa: Center for Transportation Research and Education, Iowa State University; 2007.
2. Vis J M. Evaluation of a Structural Health Monitoring System for Steel Girder Bridges. Creative Component Report. Ames, Iowa: Iowa State University; 2007.
3. Lu P. A Statistical Based Damage Detection Approach for Highway Bridge Structural Health Monitoring. Ames, Iowa: Iowa State University; 2008. Doctoral dissertation.
4. Phares B M, Wipf T J, Lu P, Greimann L, Pohlkamp M. An Experimental Validation of a Statistical-Based Damage-Detection Approach. Ames, Iowa: Bridge Engineering Center, Iowa State University; 2011.
5. Chintalapudi K, et al. Monitoring Civil Structures with a Wireless Sensor Network. IEEE Internet Computing 2006; 10(2): 26-34.
6. Guan, Hong, Vistasp M Karbhari, and Charles S Sikorsky. "Long-Term Structural Health Monitoring System for a FRP Composite Highway Bridge Structure." Journal of Intelligent Material Systems and Structures, 2007: 809-823.
7. Olund, Josh, and John DeWolf. "Passive Structural Health Monitoring of Connecticut's Bridge Infrastructure." Journal of Infrastructure Systems, 2007: 330-339.
8. Yuan, Shenfang, Xiaosong Lai, Xia Zhao, Xin Xu, and Liang Zhang. "Distributed Structural Health Monitoring System Based On Smart Wireless Sensor and Multi-Agent Technology." Smart Materials and Structures, 2005: 1-8.
9. Wang, Shanshan, Qingwen Ren, and Pizhong Qiao. "Structural Damage Detection Using Local Damage Factor." Journal of Vibration and Control, 2006: 955-973.
10. Panigrahi, S K, S Chakraverty, and B K Mishra. "Vibration Based Damage Detection in a Uniform Strength Beam Using Genetic Algorithm." Springer Online, 2009.
11. Crow E L, Davis F A, Maxfield M W. Statistics Manual. United Kingdom: Constable and Company; 1960.
12. MathWorks. Statistics Toolbox: Fitting an Orthogonal Regression Using Principal Components Analysis. 2010. http://www.mathworks.com/products/statistics/demos.html?file=/products/demos/shipping/stats/orthoregdemo.html (accessed 4 Nov. 2010).
13. Carroll, R J, Ruppert D. The Use and Misuse of Orthogonal Regression Estimation in Linear Errors-In-Variables Models. The American Statistician 1996; 50:1-6.
14. Caragea, P C. The F-Test as a Comparison of Full and Reduced Models. Fall 2007. http://www.public.iastate.edu/~pcaragea/S401F07/Handouts/Full_vs_Reduced.pdf (accessed 6 Feb. 2012).
15. Doornink, J. D. Monitoring the Structural Condition of Fracture-Critical Bridges Using Fiber Optic Technology. PhD dissertation. Iowa State University, Ames, Iowa. 2006.

16. Fuller, W. A. Measurement Error Models. New York: John Wiley & Sons, Inc., 1987.
17. Lu, P., Phares, B. M., Greimann L., Wipf, T. J. "Bridge structural health-monitoring system using statistical control chart analysis," Journal of the Transportation Research Board. No. 2172, pp. 123-131, 2010.
18. Mendenhall, William, and Terry Sincich. A Second Course in Statistics: Regression Analysis. Seventh Edition. Boston, Mass.: Prentice Hall/Pearson Education, Inc. 2012.
19. Miller, I., and J. E. Freund. Probability and Statistics for Engineers. Second Edition. Englewood Cliffs, N.J.: Prentice-Hall, Inc. 1977.
20. Montogomery, D.C. Introduction to Statistical Quality Control. Third Edition. New York: John Wiley & Sons, Inc. 1996.

What is claimed is:

1. A computer-implemented method for determining bridge damage from strain sensor data, comprising:
    collecting a batch of strain data from one or more sensor pairs;
    after collecting the batch of strain data, segmenting the batch of strain data to remove temperature variations in said batch of strain data to zero the batch of strain data, wherein said removal of temperature variations includes determining a temperate baseline for the data set and subtracting said temperate baseline from the segmented batch of strain data;
    removing bridge component responses from the batch of strain data to acquire a quasi-static response;
    extracting from the batch of strain data one or more sets of strain data comprising the quasi-static response of the bridge under ambient traffic loads;
    establishing a relationship between the one or more sets of strain data extracted from the one or more sensor pairs by orthogonal regression; and
    detecting bridge damage by generally isolating a damage indicator between the one or more sensor pairs using a statistical $F_{shm}$ value, wherein the damage indicator comprises a change in the one or more $F_{shm}$ values for a control chart.

2. The computer-implemented method of claim 1 wherein zeroing the batch of strain data does not remove random noise or dynamic induced behaviors.

3. The computer-implemented method of claim 1 further comprising:
    developing a control chart for each sensor in the one or more sensor pairs for tracking change in the statistical $F_{shm}$ value.

4. The computer-implemented method of claim 1 wherein isolating the damage indicator comprises limiting false-positives resulting from residuals in sensor pairs proximate bridge damage.

5. The computer-implemented method of claim 1 further comprising:
    performing at least one training protocol for characterizing a baseline behavior for the one or more sensor pairs.

6. A computer-implemented system for determining bridge damage from strain sensor data, comprising:
    a database having a batch of strain data collected from one or more sensor pairs, said batch of strain data zeroed after collection by segmenting the batch of strain data to remove temperature variations, and wherein said removal of temperature variations includes determining a temperate baseline for the data set and subtracting said temperate baseline from the segmented batch of strain data;
    one or more sets of strain data from the batch of strain data comprising a quasi-static response of the bridge under ambient traffic loads;
    an orthogonal regression relationship between the one or more sets of strain data; and
    a bridge damage indicator between the one or more sensor pairs detected by an isolation protocol using a statistical $F_{shm}$ value;
    wherein the quasi-static response of the bridge is independent of bridge component responses from the batch of strain by removing the bridge component responses from the batch of strain to acquire a quasi-static response; and
    wherein the damage indicator comprises a change in the one or more $F_{shm}$ values for a control chart.

7. The computer-implemented system of claim 6 wherein zeroing the batch of strain data does not remove random noise or dynamic induced behaviors.

8. The computer-implemented system of claim 6 further comprising:
    a control chart for each sensor in the one or more sensor pairs, wherein the control chart is based at least in part on the statistical $F_{shm}$ value.

9. The computer-implemented system of claim 6 wherein the bridge damage indicator comprises a limited false-positives from residuals in sensor pairs proximate bridge damage.

10. The computer-implemented system of claim 6 further comprising:
    at least one training protocol for characterizing a baseline behavior for the one or more sensor pairs.

11. A computer-implemented method for determining bridge damage from strain sensor data under ambient traffic loads, comprising:
    collecting a batch of strain data from one or more sensor pairs attached to a bridge support structure;
    segmenting the batch of strain data into time segments to remove the influence of any temperature variations to the batch of strain data, wherein said removal of the influence of temperature variations includes determining a temperate baseline for the data set and subtracting said temperate baseline from the segmented batch of strain data;
    extracting from the batch of strain data one or more sets of strain data comprising a quasi-static response of the bridge independent of bridge component responses, wherein the bridge component responses is removed from the batch of strain to acquire the quasi-static response;
    identifying vehicular events based on a statistical and structural evaluation of the quasi-static response relative to a location of the one or more sensor pairs;
    establishing an orthogonal regression relationship between the one or more sets of strain data extracted from the one or more sensor pairs;
    isolating a bridge damage indicator between the one or more sensor pairs using a statistical $F_{shm}$ value from a control chart, wherein the damage indicator comprises a change in the one or more $F_{shm}$ values for a control chart; and
    detecting bridge damage from the bridge damage indicator independent of the bridge component responses.

12. The computer-implemented method of claim 11 further comprising:
    developing the control chart for each sensor in the one or more sensor pairs based at least on part on the statistical $F_{shm}$ value.

13. The computer-implemented method of claim 11 further comprising:
performing at least one training protocol for characterizing a baseline behavior for the one or more sensor pairs.

14. The computer-implemented method of claim 11 further comprising:
monitoring the control chart for tracking how the statistical $F_{shm}$ value changes over time.

15. The computer-implemented method of claim 11 wherein isolating the bridge damage indicator comprises limiting false-positives resulting from residuals in sensor pairs proximate bridge damage.

* * * * *